United States Patent [19]
Fan et al.

[11] Patent Number: 6,005,838
[45] Date of Patent: Dec. 21, 1999

[54] MULTI-LAYERS OPTICAL RECORDING MEDIA AND SYSTEM FOR RECORDING AND REPRODUCING INFORMATION DATA

[75] Inventors: Bunsen Fan, Cortlandt Manor; Sadeg M. Faris, Pleasantville, both of N.Y.

[73] Assignee: Reveo, Inc., Elmsford, N.Y.

[21] Appl. No.: 09/141,446

[22] Filed: Aug. 27, 1998

Related U.S. Application Data

[63] Continuation of application No. 08/539,279, Oct. 4, 1995, Pat. No. 5,838,653.

[51] Int. Cl.$^6$ ............................................................. G11B 7/24
[52] U.S. Cl. ............................ 369/275.1; 369/94; 365/108
[58] Field of Search ................................. 369/275.1, 94, 369/109, 110, 103, 102, 14, 273, 272, 280, 281, 284; 365/108

[56] References Cited

U.S. PATENT DOCUMENTS

| | | | |
|---|---|---|---|
| 5,353,247 | 10/1994 | Faris | 365/108 |
| 5,381,401 | 1/1995 | Best et al. | 369/275.1 |
| 5,485,452 | 1/1996 | Maeda | 369/275.1 |
| 5,487,060 | 1/1996 | Rosen et al. | 369/94 |
| 5,526,338 | 6/1996 | Hasman et al. | 369/109 |

*Primary Examiner*—Tan Dinh
*Attorney, Agent, or Firm*—Thomas J. Perkowski, Esq., P.C.

[57] ABSTRACT

An novel optical information storage media having M information storage decks. Each information storage deck has N information storage layers, and each information storage layer has a pair of information storage structures. Each paired information storage structure has a characteristic wavelength and polarization state, and from which recorded information can be read by a laser beam having similar wavelength and polarization-state characteristics. A novel system is provided for reading the optical information storage media of the present invention. In the illustrative embodiment, an optical storage device of the present invention having M×N×2 information storage layers can be read using only N laser lines (i.e. spectral components), thereby providing a 2M-fold increase in information storage capacity over prior art systems. The information storage and retrieval system of the present invention is completely backward compatible to allow for the reading of conventional CD-ROM devices. Various techniques are disclosed for manufacturing and reading the optical storage devices of the present invention.

67 Claims, 47 Drawing Sheets

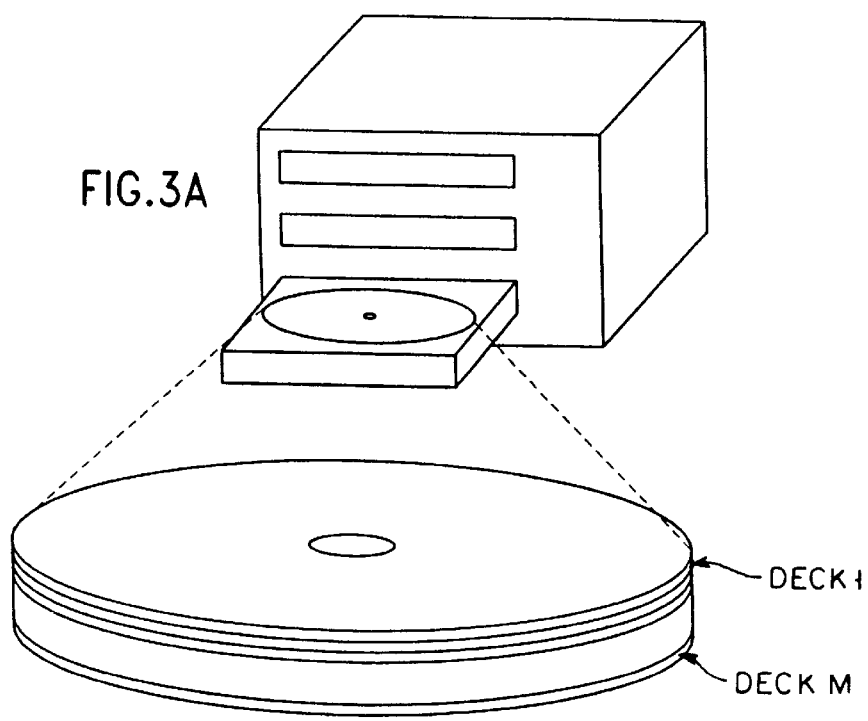
FIG.3A
FIG.3B
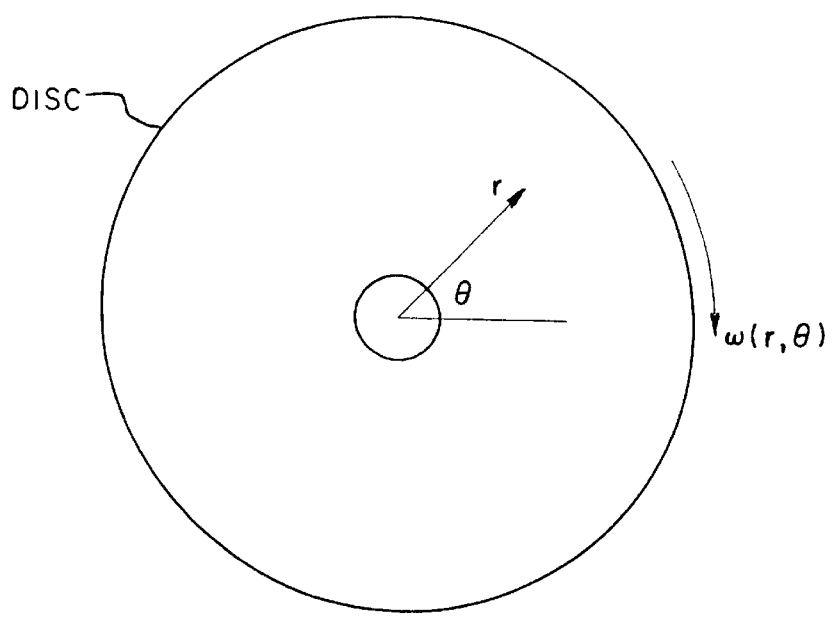
FIG.3C

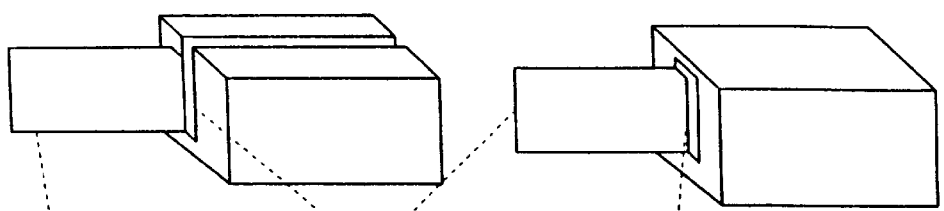
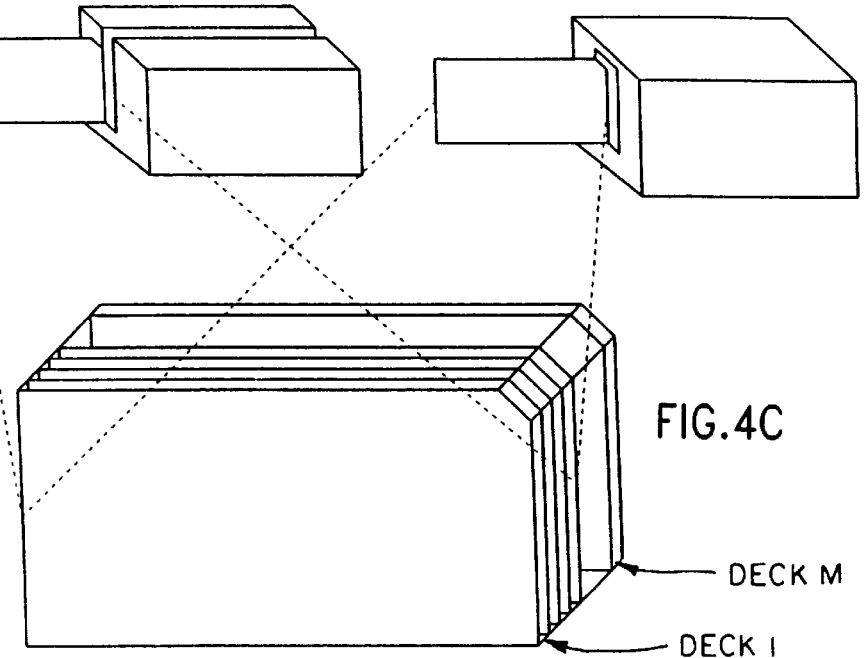
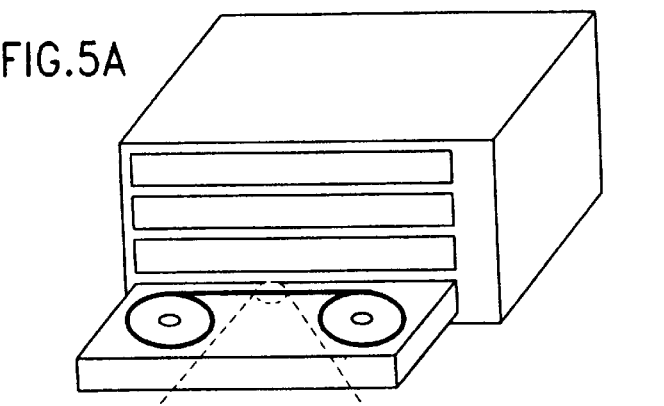
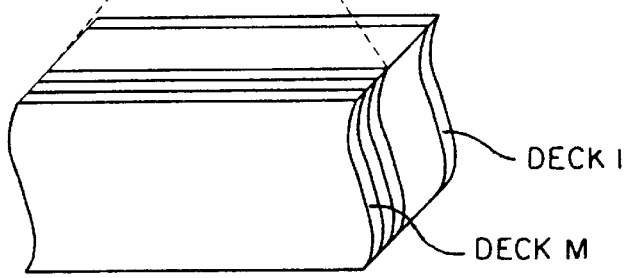

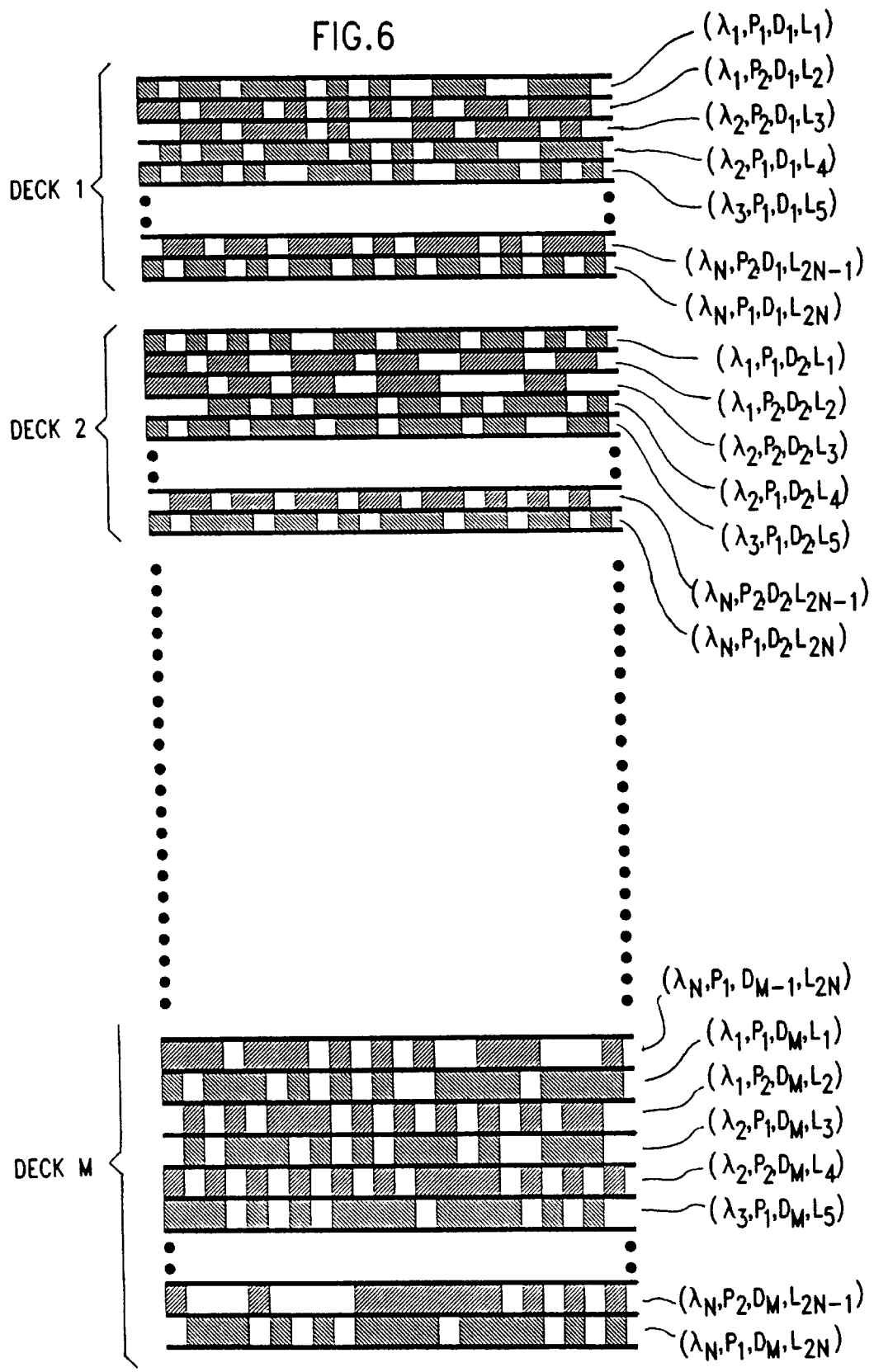

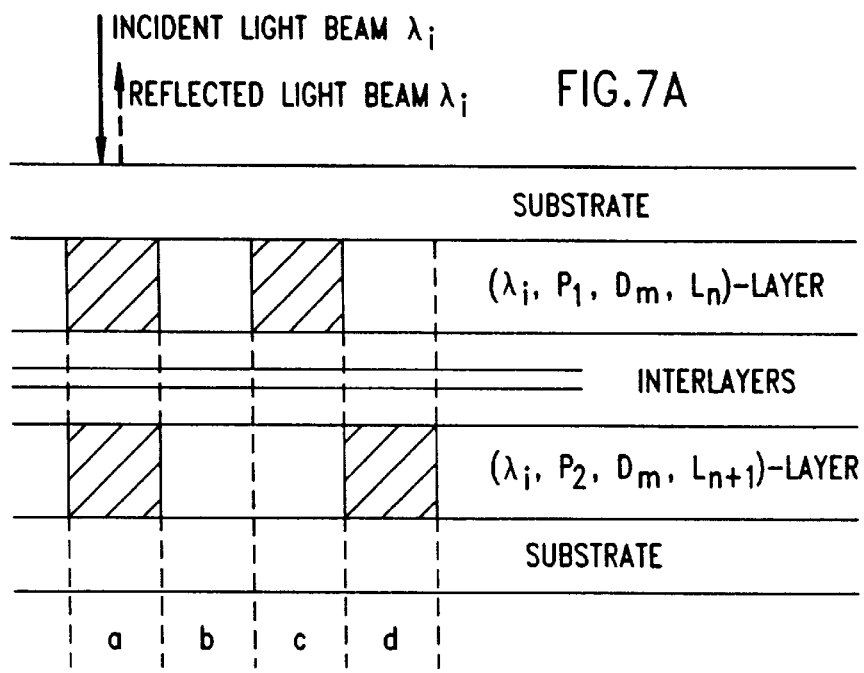
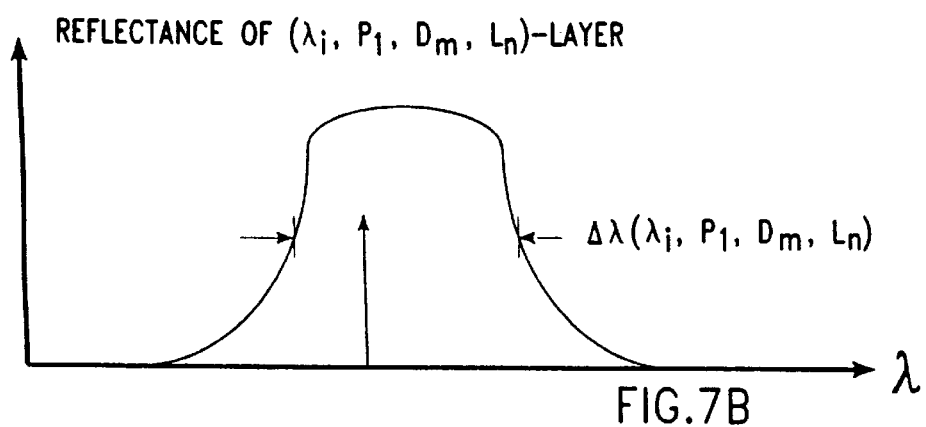
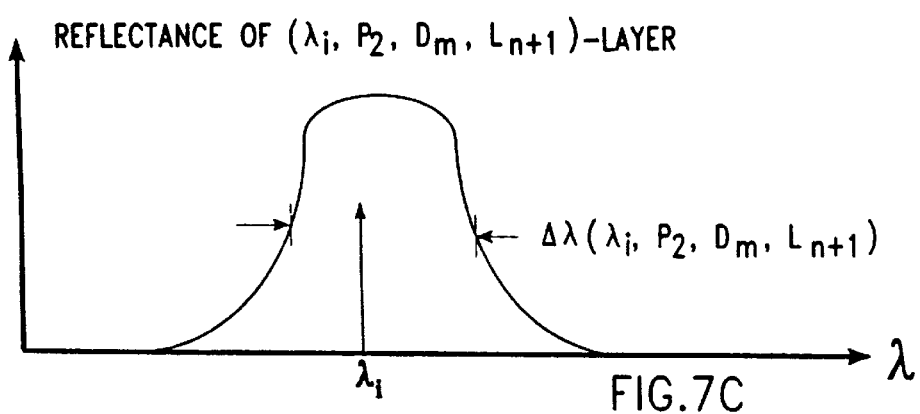

FIG.7D

| LOCATION AT | a | b | c | d |
|---|---|---|---|---|
| POLARIZATION OF REFLECTED BEAM | $P_1$ OR $P_2$ | NONE | $P_1$ ONLY | $P_2$ ONLY |
| LOGICAL STATE AT $(\lambda_i, P_1, D_m, L_n)$-LAYER | 1 | 0 | 1 | 0 |
| LOGICAL STATE AT $(\lambda_i, P_2, D_m, L_{n+1})$-LAYER | 1 | 0 | 0 | 1 |

FIG.8D

| LOCATION AT | a | b | c | d |
|---|---|---|---|---|
| POLARIZATION OF REFLECTED BEAM | $P_1$ OR $P_2$ | NONE | $P_1$ ONLY | $P_2$ ONLY |
| LOGICAL STATE AT $(\lambda_i, P_1, D_m, L_n)$-LAYER | 1 | 0 | 1 | 0 |
| LOGICAL STATE AT $(\lambda_i, P_2, D_m, L_{n+1})$-LAYER | 1 | 0 | 0 | 1 |

FIG.9D

| LOCATION AT | a | b | c | d |
|---|---|---|---|---|
| POLARIZATION OF REFLECTED BEAM | $P_1$ OR $P_2$ | NONE | $P_1$ ONLY | $P_2$ ONLY |
| LOGICAL STATE AT $(\lambda_i, P_1, D_m, L_n)$-LAYER | 1 | 0 | 1 | 0 |
| LOGICAL STATE AT $(\lambda_i, P_2, D_m, L_{n+1})$-LAYER | 1 | 0 | 0 | 1 |

FIG.9H

| LOCATION AT | a | b | c | d |
|---|---|---|---|---|
| POLARIZATION OF REFLECTED BEAM | $P_1$ OR $P_2$ | NONE | $P_1$ ONLY | $P_2$ ONLY |
| LOGICAL STATE AT $(\lambda_i, P_1, D_m, L_n)$-LAYER | 1 | 0 | 1 | 0 |
| LOGICAL STATE AT $(\lambda_i, P_2, D_m, L_{n+1})$-LAYER | 1 | 0 | 0 | 1 |

FIG.13D

| LOCATION AT | a | b | c | d |
|---|---|---|---|---|
| POLARIZATION OF REFLECTED BEAM | RHCP or LHCP | NONE | RHCP only | LHCP only |
| LOGICAL STATE AT ($\lambda_l$, RH, $D_m$, $L_n$)-LAYER | 1 | 0 | 1 | 0 |
| LOGICAL STATE AT ($\lambda_l$, LH, $D_m$, $L_{n+1}$)-LAYER | 1 | 0 | 0 | 1 |

Stamped blank

Deposit chiral reflecting coating

Overcoat to planarize

Stack information storage layers

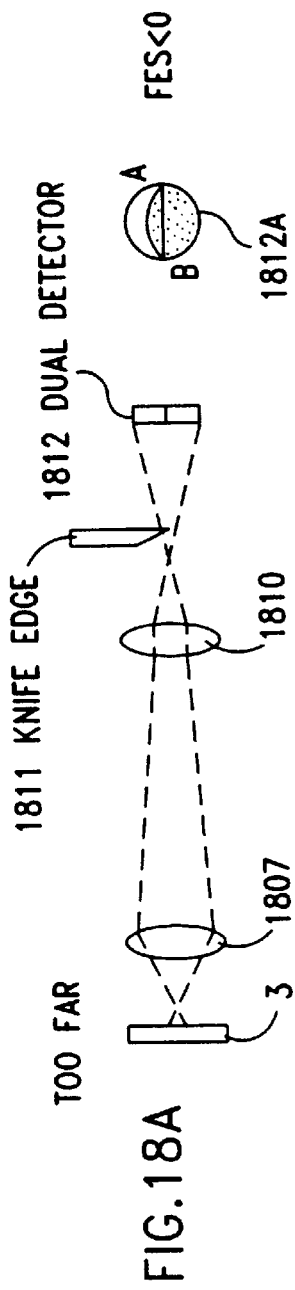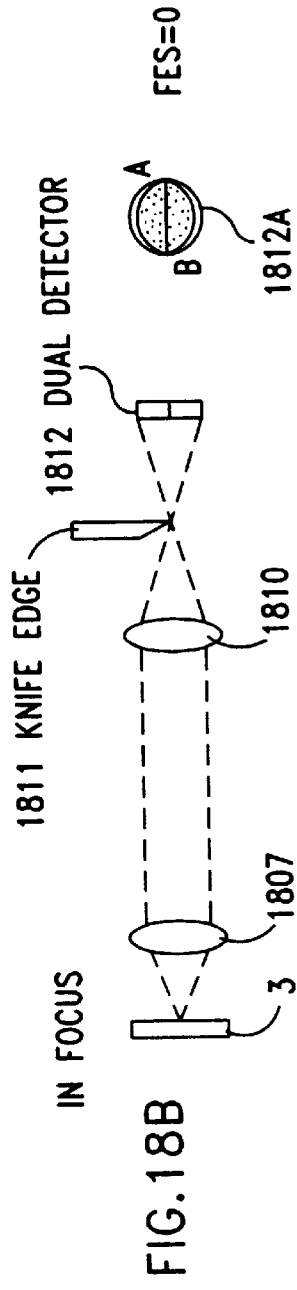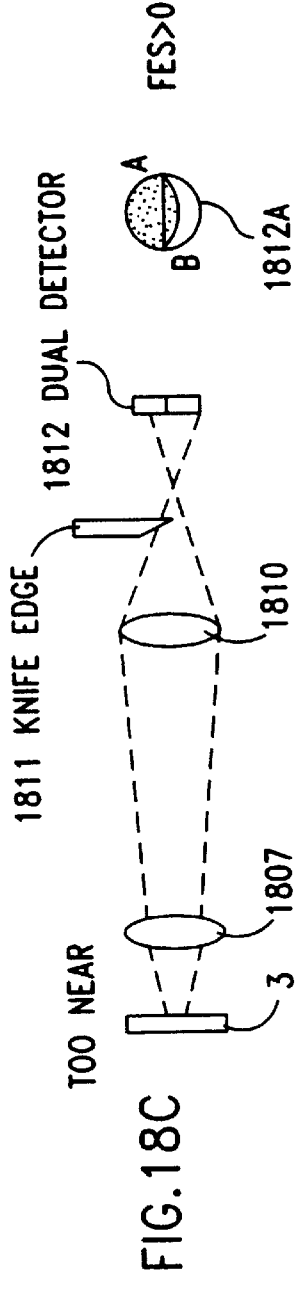

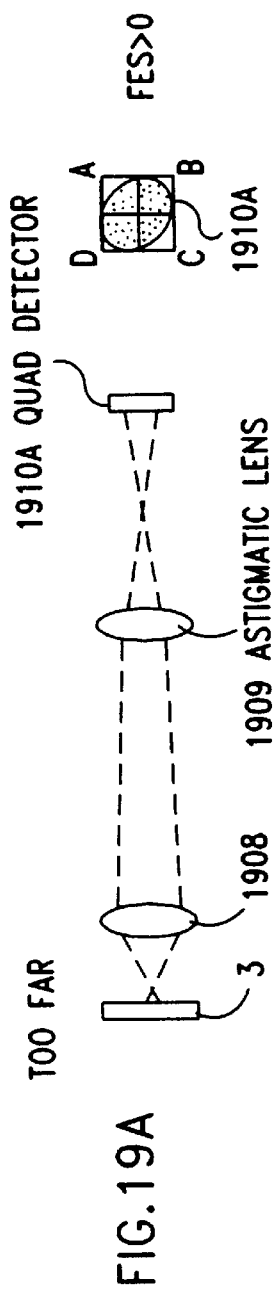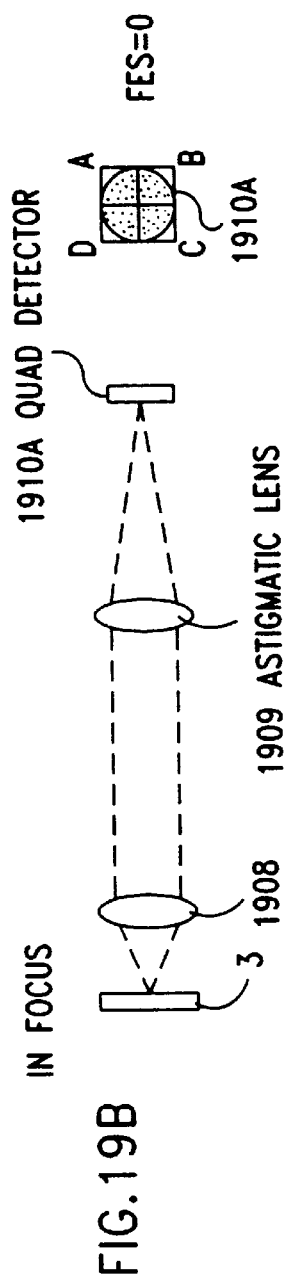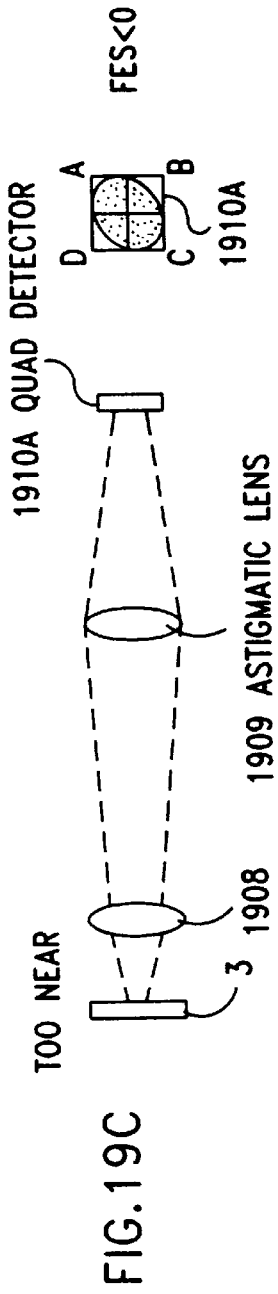

DATA TRACKS

E−F>0

E−F=0

E−F<0

FIG.25A
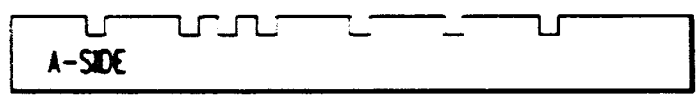
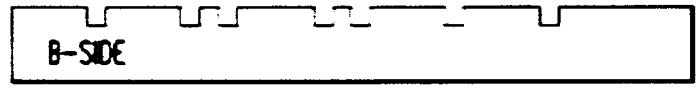
FIG.25B
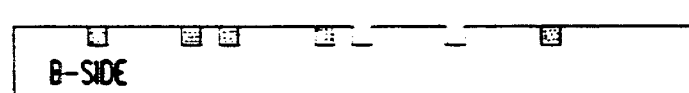
FIG.25C
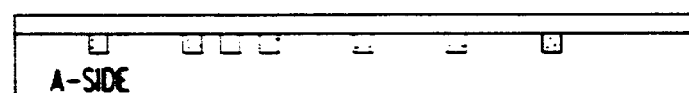
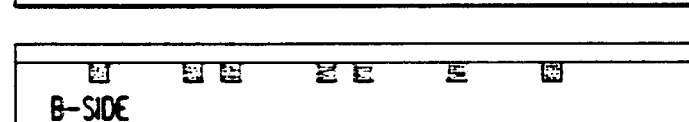
FIG.25D
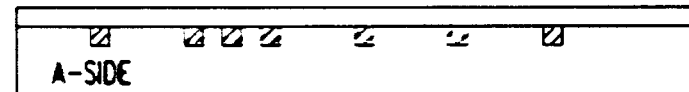
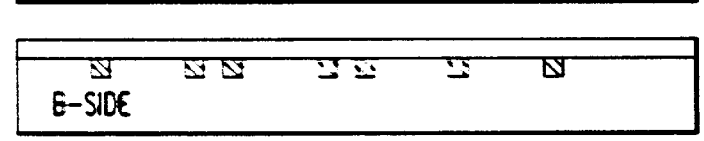
FIG.25E
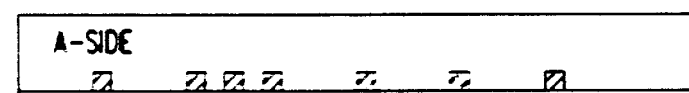
FIG.25F
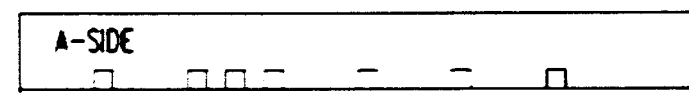
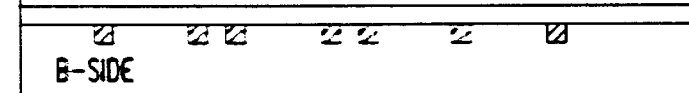
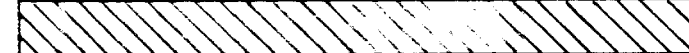

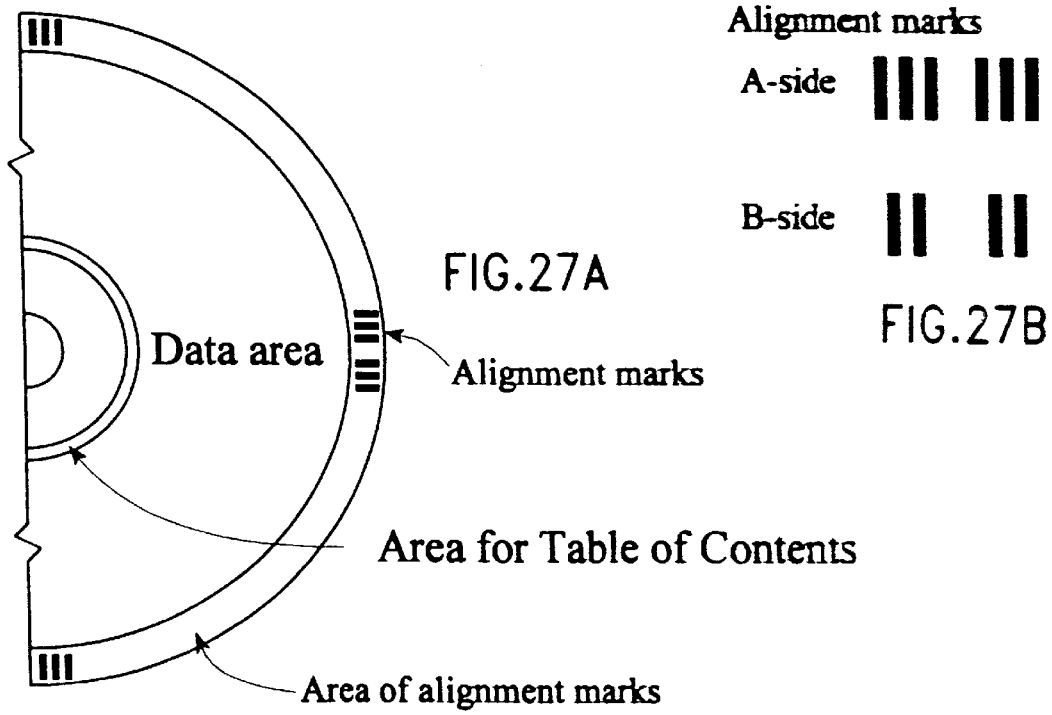
FIG. 27A
FIG. 27B
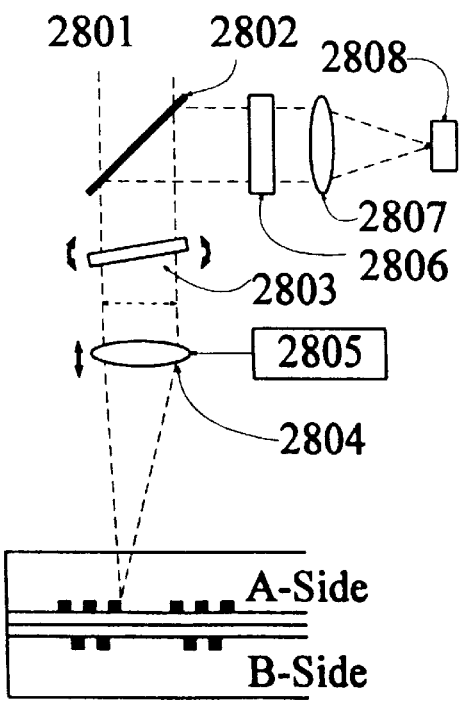
FIG. 27C
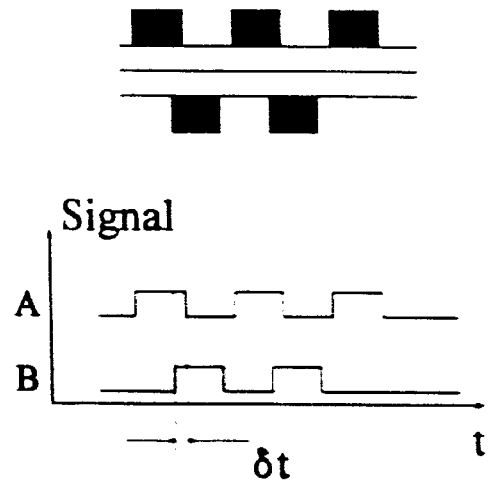
FIG. 27D

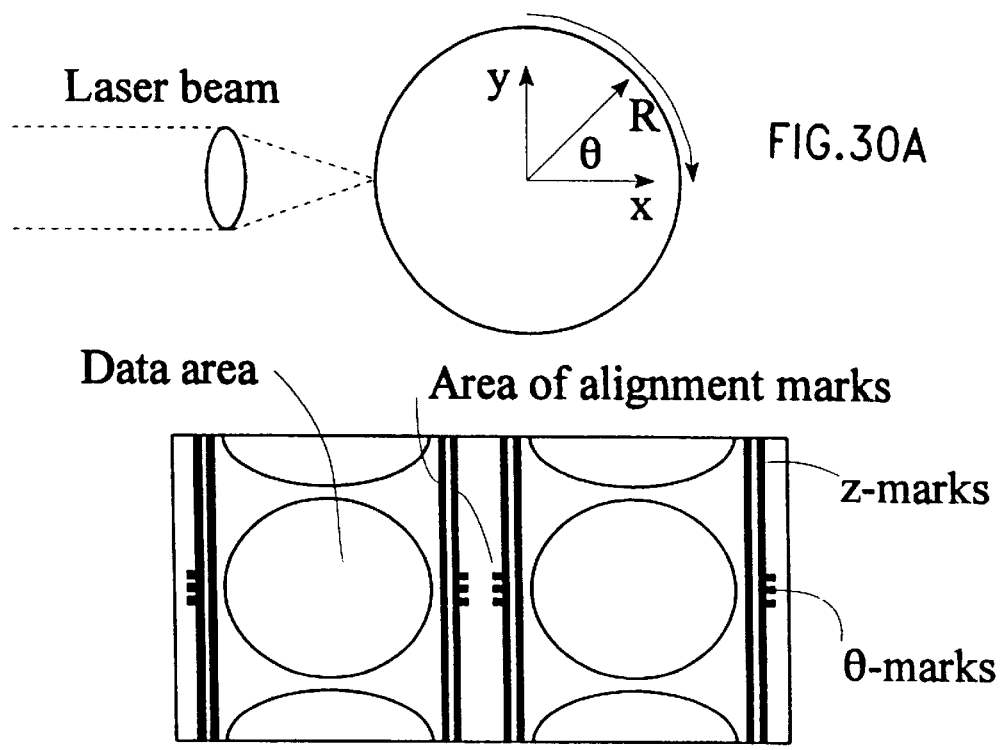
FIG.30A
FIG.30B
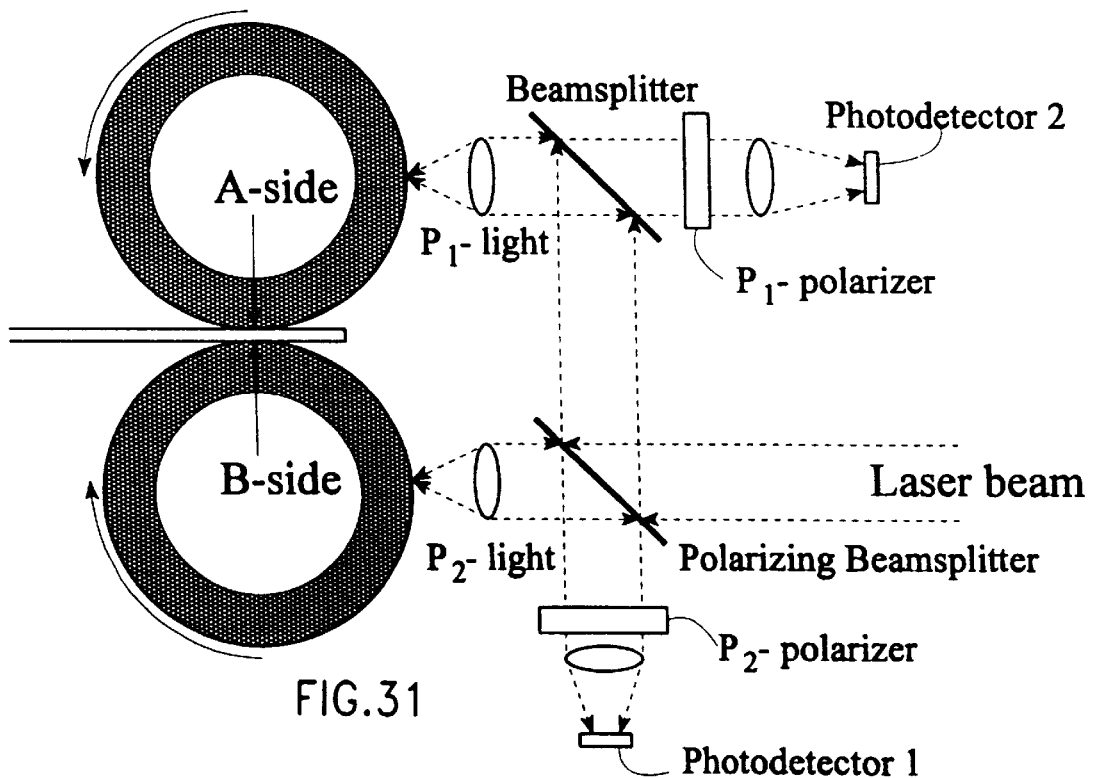
FIG.31

Recorded signal pattern

Detected optical signal

Demodulated signal

MULTI-LAYERS OPTICAL RECORDING MEDIA AND SYSTEM FOR RECORDING AND REPRODUCING INFORMATION DATA

RELATED CASES

This Application is a Continuation of application Ser. No. 08/539,279 entitled "Method And Apparatus For Storing And Retrieving Information Using Optical Data Storage Media", by the inventors Bunsen Fan and Sadeg M. Faris, filed Oct. 4, 1995, now U.S. Pat. No. 5,838,653.

BACKGROUND OF INVENTION

1. Field of the Invention

The present invention relates to an information storage system employing a novel optical-based information storage media having multiple information storage layers each of which have a characteristic wavelength and polarization state, and from which recorded information can be read by a laser beam having similar wavelength and polarization-state characteristics in order to provide a significant improvement in information storage capacity.

2. Brief Description of Prior Art

In the contemporary period, there is a great need for high density information storage media. For decades, magnetic disc and tape have been the dominant information storage media for recording both analog and digital information. In more recent times, the trend has changed to optical storage media because of its higher information storage capacity. In principle, each optical storage media exploits one or more characteristics of light and its interaction with matter in order to store and access information.

In conventional optical CD-ROM technology, digital information in the form of a logical "0" is recorded as a microscopic protrusion formed on the reflective surface of the compact disc along a continuous spiral track, whereas a logical "1" is recorded as a microscopic section of planar surface area the size of about the cross-sectional diameter of the focused laser beam used during information reading operations. When an incident laser beam is reflected off such microscopic protrusions during information reading operations, a reduction in intensity of the reflected laser beam is detected by the photodetector of the CD-ROM drive unit and is converted into a logical signal. In conventional CD-ROM technology, the primary limitation on information storage capacity is determined by protrusion size. Consequently, great efforts are being undertaken to make inexpensive laser diodes that produce laser beams with shorter wavelengths for use in detecting smaller-sized protrusions during information reading operations.

Recently, there have been attempts to increase the information storage capacity of conventional CD-ROM devices. One technique in particular, which has received popular attention, is disclosed in U.S. Pat. No. 5,381,401. In essence, this technique involves stacking up multiple information layers of optically, substantially transmissive material, each realized by an regular CD disc having a thin aluminum film coating with a light reflectance of about 4%. By adjusting the depth of focus of the laser beam used during information reading operations, it is possible to read information from a selected information storage disc. However, a major drawback with this prior art technique is that only a relatively small number of information layers can be stacked up before severe attenuation of the reflected laser beam occurs, thereby resulting in an unacceptable signal-to-noise ratio and thus system performance.

An altogether different approach to optical mass storage has been taught in recently issued U.S. Pat. No. 5,353,247 to Faris, co-applicant of the present application. Rather than using semi-reflective coatings, as taught in U.S. Pat. No. 5,381,401, U.S. Pat. No. 5,353,247 teaches the use of the wavelength-selective property of the Cholesteric Liquid Crystal (CLC) material, and discloses an optical storage media comprising multiple information storage layers made of CLC material. However, a major drawback with this prior art system is that N laser lines (i.e. spectral components) are required to read N number of CLC-based information storage layers. How this shortcoming might be overcome is neither disclosed, taught or suggested by the prior art.

Thus there presently is a great need in the art for an improved method and apparatus for storing and retrieving information in a manner which achieves a substantial improvement in information storage capacity over prior art systems and methodologies.

OBJECTS AND SUMMARY OF THE INVENTION

Accordingly, a primary object of the present invention is to provide a novel optical information storage media which overcomes the shortcomings and drawbacks of prior art apparatus and methodologies.

Another object of the present invention is to provide novel information storage media which exploits both the wavelength-dependent and polarization-dependent reflective properties of particular optical materials.

Another object of the present invention is to provide a novel optical information storage structure which exploits both the wavelength-dependent and polarization-dependent reflective properties of CLC material.

Another object of the present invention is to provide a novel optical information storage structure comprising a pair of information storage layers, each of which exploit both the wavelength-dependent and polarization-dependent reflective properties of CLC material or multilayer dielectric thin-films so that digital information stored therein can be read in either a sequential or parallel manner.

Another object of the present invention is to provide a novel optical information storage system which employs an optical storage media having a single information storage deck with 2×N CLC-based information storage layers which can be read using only N laser lines (i.e. spectral components).

Another object of the present invention is to provide a novel optical information storage system which employs an optical storage medium having M information storage decks, wherein each storage deck has 2N CLC-based information storage layers, and the M×N×2 information storage layers can be read using only N laser lines (i.e. spectral components).

Another object of the present invention is to provide such an optical information storage system, in which an optical pick-up is employed that controls the polarization state of the laser beam as it is incident upon the optical storage medium during information reading operations.

Another object of the present invention is to provide such an optical information storage system, in which an optical pick-up is employed that controls the polarization state of the laser beam after it reflects off the optical storage medium during information reading operations.

Another object of the present invention is to provide a novel optical information storage media which exploits both the wavelength-dependent and polarization-dependent reflective properties of CLC material, and which can be realized in the form of a compact disc, tape, or card.

Another object of the present invention is to provide a novel method of manufacturing multilayered optical-based storage media having wavelength and polarization-state dependent characteristics.

Another object of the present invention is to provide a novel method of manufacturing an optical information storage structure which exploits both the wavelength-dependent and polarization-dependent reflective properties of CLC material.

Another object of the present invention is to provide a novel method of manufacturing a multi-layer information storage structure which exploits both the wavelength-dependent and polarization-dependent reflective properties of multilayer dielectric thin-films.

Another object of the present invention is to provide a novel optical pick-up for reading digital information recorded in a multi-layered information storage structure which exploits both the wavelength-dependent and polarization-dependent reflective properties of CLC material.

Another object of the present invention is to provide a novel optical pick-up for reading digital information recorded in a multi-layered information storage structure which exploits both the wavelength-dependent and polarization-dependent reflective properties of multilayer dielectric thin-films.

Another object of the present invention is to provide a novel optical pick-up for simultaneously reading digital information stored in the information recording tracks of a paired multi-layered information storage structure which exploits both the wavelength-dependent and polarization-dependent reflective properties of either CLC material or multilayer dielectric thin-films.

Another object of the present invention is to provide a novel information storage disc drive unit capable of reading CLC-based information storage discs of the present invention, as well as conventional CD-ROMs, thus providing an easy and inexpensive way to upgrade the information storage and reading capabilities of a computer system, without the need to discard conventional CD-ROMs in the possession of its user.

Another object of the present invention is to provide a novel method and apparatus for precisely aligning the information recording tracks formed in the information storage layers of a paired information storage structure.

These and other objects of the present application will become apparent hereinafter and in the Claims to Invention.

BRIEF DESCRIPTION OF THE DRAWINGS

For a more complete understanding of the Objects of the Present Invention, the following Detailed Description of the Illustrative Embodiments should be read in conjunction with accompanying Drawings, in which:

FIGS. 3A and 3B set forth a perspective view of an information storage and retrieval system of the present invention, particularly adapted for use with optical storage media of the present invention realized in the form of compact disc;

FIG. 3C is a schematic representation of CD optical disc being rotated at an angular velocity which is dependent upon the instantaneous position of the optical reading head of the information reading system;

FIGS. 4A, 4B and 4C set forth a perspective view of an information storage and retrieval system of the present invention, particularly adapted for use with optical storage media of the present invention realized in the form of a compact card;

FIGS. 5A and 5B set forth a perspective view of an information storage and retrieval system of the present invention, particularly adapted for use with the optical storage media of the present invention realized in the form of a compact tape cassette;

FIG. 6 is a schematic representation of the generalized embodiment of the optical storage media of the present invention having up to 2N information-storage layers, and comprising M decks, each of which includes N paired wavelength-selective and polarization-selective information storage structures which are distinguishable from each other, and thus accessible, by the wavelength and polarization state of the optical signals used to read information stored therein;

FIG. 7A is a schematic representation of a first illustrative embodiment of the wavelength-selective and polarization-selective information storage structure of the present invention which can be used to construct the optical storage media hereof, and as shown, comprises (i) a first flat information storage layer which reflects incident light having $P_1$-polarization state and wavelength ($λ_i$ wherever a binary bit '1' is written and transmits incident light wherever a bit '0' is written regardless of wavelength and polarization, and (ii) a second flat information storage layer which reflects light having $P_2$-polarization state and wavelength ($λ_i$ wherever a binary bit '1' is written and transmits incident light wherever a binary bit '0' is written regardless of wavelength and polarization;

FIGS. 7B and 7C set forth a schematic representation of the reflectance spectra of the information storage layers of the information storage structure shown in FIG. 7A;

FIG. 7D is a table setting forth the polarization states of the optical signal retrieved (by reflection) from identified information value storage locations along each accessed information storage layer in the optical storage media realized using the paired wavelength-selective and polarization-selective information storage structure shown in FIG. 7A;

FIG. 8D is a table setting forth the polarization states of the optical signal retrieved (by reflection) from identified information storage locations along each accessed information storage layer in the optical storage media realized using the paired wavelength-selective and polarization-selective information storage structure shown in FIG. 8A;

FIG. 9D is a table setting forth the polarization states of the optical signal reflected (i.e. retrieved) from identified information storage locations along each accessed storage layer in the optical storage media realized using the paired wavelength-selective and polarization-selective storage structure shown in FIG. 9A;

FIG. 9H is a table setting forth the polarization states of the optical signal retrieved (by reflection) from identified information storage locations along each accessed information storage layer in the optical storage media realized using the paired wavelength-selective and polarization-selective information storage structure shown in FIG. 9E;

FIG. 13D is a table setting forth the polarization states of the optical signal retrieved from identified information value storage locations along each accessed information storage layer in the paired wavelength-selective and polarization-selective storage structures shown in FIG. 13A;

FIGS. 18A, 18B and 18C set forth a schematic representation showing different light intensity distributions being focused onto the dual light detector of the system of FIG. 18, for the three different cases of laser beam focusing under servo-control therein;

FIGS. 19A, 19B and 19C set forth a schematic representation showing different light intensity distributions being focused onto the dual light detector of the system of FIG. 19, for the three different cases of laser beam focusing under servo-control therein;

FIGS. 25A to 25F collectively show the process steps for making double-sided CLC-based disks using lamination techniques;

FIG. 27A is a schematic diagram of a double-sided CLC-based information storage disc of the present invention, showing the physical location of alignment marks thereon;

FIG. 27B is a schematic diagram of the alignment marks formed on the first and second sides of the CLC-based information storage disk;

FIG. 27C is a schematic diagram of a first embodiment of an optical subsystem for precisely aligning the alignment marks on the first and second sides of the double-sided CLC discs;

FIG. 27D is a schematic diagram showing the electrical signals produced by the subsystem of FIG. 27C during the alignment process;

FIGS. 30A and 30B set forth a schematic diagram for making an embossing drum for use in manufacturing CLC-based information storage discs using the process of FIG. 29;

FIG. 31 is a schematic diagram of the apparatus and process for aligning the embossing drums used in the manufacturing method of FIG. 29;

DETAILED DESCRIPTION OF THE ILLUSTRATIVE EMBODIMENTS OF THE PRESENT INVENTION

Figure 1:
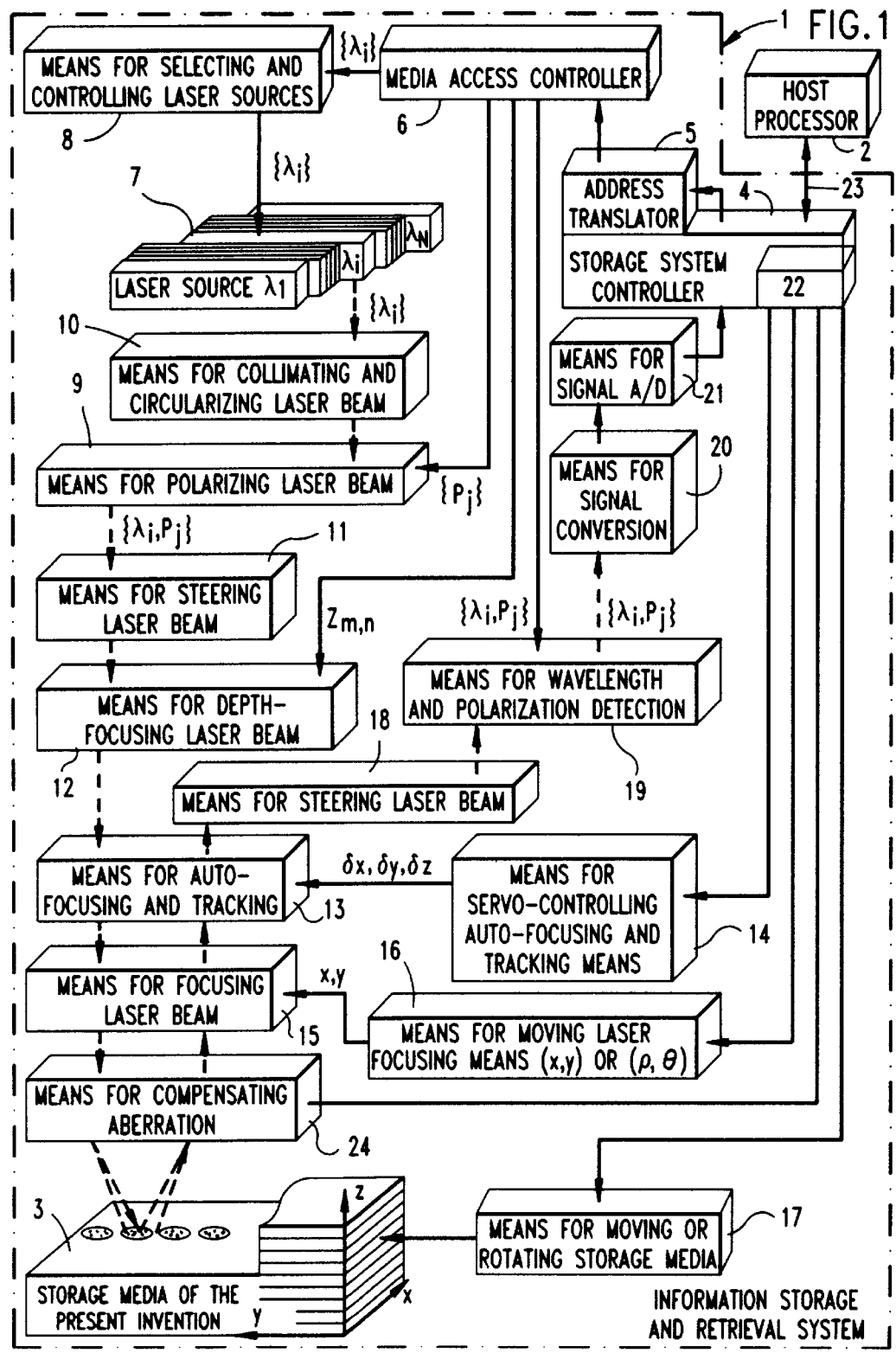
FIG. 1 is a schematic representation of the generalized embodiment of the information storage and retrieval system of the of the present invention.

Referring to the figures set forth in the accompanying Drawings, the illustrative embodiments of the present invention will be described in detail hereinbelow. For clarity of exposition, like figures shown in the accompanying Drawings shall be indicated with like reference numerals.

In FIG. 1, the information storage and retrieval system of the present invention is schematically illustrated. As shown, the information storage and retrieval system 1 is operably connected to a host processor 2 typically associated with a computing system, such as a desktop computer, laptop computer, etc. The system may be constructed as a stand-alone unit external to the computer-based system, or it may be constructed so that it is internally incorporated into the housing of the computer-based system.

In general, the information storage and retrieval system I comprises a number of functional subcomponents, namely: an optical-based information storage device 3 realized in the form of a disc, tape, card or like structure, constructed from the wavelength and polarization selective information recording structure of the present invention; a storage controller 4 and address translator 5 for controlling system operations; a media access controller 6 for controlling the polarization and wavelength characteristics of the laser light beam used during information reading operations; a plurality of laser sources (e.g. laser diodes) 7 for producing a plurality of different laser lines (i.e. spectral components) having characteristic wavelengths ($_1$, . . . , $_N$, respectively, at which peak spectral output occurs; laser source control mechanism 8 for selecting and controlling one or more of the plurality of laser sources in order to produce a composite laser beam with preselected polarization and wavelength characteristics; a light polarizing mechanism 9 for selectively polarizing (e.g. circularly or linearly polarizing) each of the produced laser lines in response to polarizing-state specifications {$P_j$} produced by the media access controller 6; a laser beam collimating/shaping mechanism 10 for collimating and shaping (e.g. circularizing) the collimated beam to form a circularized, composite laser beam for use in reading information prerecorded on the optical storage disc 3 hereof; a first beam steering mechanism 11 for steering across the optical storage device, the incident composite laser beam having wavelength and polarization characteristics {(i, Pj)}; depth focusing mechanism 12 for focusing the depth of the focused composite laser beam according to depth control information Z(m,n); auto-focusing and tracking mechanism 13 for auto-focusing and tracking the composite laser beam as it is being steered across the optical storage disc; a servo-control mechanism 14 for servo-controlling the auto-focusing and tracking mechanism 13; a beam focusing mechanism 15 for focusing the composite laser beam to the specified depth in the optical storage media; first moving mechanism 16 for moving the beam focusing mechanism 15 in a coordinate direction specified by the storage system controller; second moving mechanism 17 for moving or rotating the optical storage media 3 in a coordinate direction specified by the storage system controller; a second beam steering mechanism 18 for steering the composite laser beam along a specified direction as it is reflected from the optical storage device; wavelength and polarization-state detection mechanism 19 for controlling the wavelength and polarization characteristics of the reflected laser beam for subsequent optical signal processing; an optical-electrical signal conversion mechanism 20 for converting the received analog optical signal into a corresponding electrical signal; an analog-to-digital (A/D) signal conversion mechanism 21 for converting the analog electrical signal into a corresponding digital signal; and a digital signal processor 22 (shown contained within controller 4) for processing the digital signals in order to retrieve the digital information encoded therein, produce digital information representative thereof, and then transfer this digital information to the host processor 2, as shown. In general, each of these functional subcomponents may be realized in a number of different ways, depending on the technology available at the time of implementation. However, for purposes for illustration, each these subcomponents will be described in greater detail with respect to the illustrative embodiments of the present invention.

In general, the optical storage device 3 indicated in FIG. 1 can realized as a disc, tape, or card as shown in FIGS. 3A to 5B, respectively. In each embodiment of the present invention, the optical storage device is constructed using a novel information recording structure of composite (i.e. multi-layer) construction realized in a suitable optical medium. Each information recording layer in the multi-layer structure has both a characteristic wavelength and polarization state which imparts thereto light reflective properties which, as described in U.S. Pat. No. 5,353,247, are dependent on both wavelength and polarization-state of the incident light beam. Notably, "characteristic wavelength" is defined as the wavelength of peak reflection of the optical storage layer, whereas the "characteristic polarization state" is defined as the polarization direction in which light at the characteristic wavelength is directed by the optical storage layer. At information recording cell locations where a logical "1" has been recorded, the physical effect of such properties is to cause the information recording layer to reflect any incident laser beam component having a characteristic wavelength and polarization state which is the same as the characteristic wavelength and polarization state of the information recording layer upon which the laser beam is incident. At information recording cell locations where a logical "0" has been recorded, the physical effect of such properties is to cause the information recording layer to transmit any incident laser beam component having a characteristic wavelength and/or a polarization state which is different from the characteristic wavelength and a polarization state of the information recording layer.

In a first illustrative embodiment of the present invention, the composite information recording structure can be constructed so that the characteristic wavelengths of its adjacent pair of information recording layers are identical, and the polarization states of its pair of information recording layers are orthogonal (i.e. in different directions). In an alternative, and perhaps less desirable embodiment of the present invention, the composite information recording structure can be constructed so that the characteristic polarization states of its adjacent pair of information recording layers are identical, and the characteristic wavelengths of its pair of information recording layers are different. As will be described in greater detail hereinafter, the composite information recording structure itself can be stacked in multiple layers up to a layer-depth N, and the stack of N composite information storage structures itself can be stacked in decks up to a deck-depth M. Thus the resulting information structure has a 2M-fold increase in information storage capacity over prior art information storage techniques, including those taught in U.S. Pat. No. 5,353,247.

The function of the plurality of laser diodes is to selectively produce spectral components having output wavelengths $(_1$, where i=1, 2, ..., N. While not essential, it is preferred that $(_1 < \ldots < (_i < \ldots < (_N$. During any information reading operation, any one or more these laser diodes can be simultaneously selected by way of the laser source selection and control mechanism 8, under the control of the media access controller. Preferably, mechanism 8 realized using electronic circuitry.

Figure 1A:
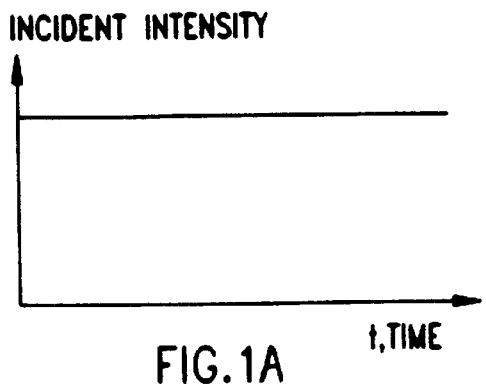
FIGS. 1A, 1B and 1C set forth a set of schematic representations of (i) a constant intensity laser beam (i.e. continuous wave laser beam) directed incident onto an information storage structure of the present invention, (ii) the reflected intensity of the laser beam after reflecting off the information storage structure, and (iii) the logical information signal recovered from the reflected laser beam after detection and processing by the system of the present invention.
Figure 1D:
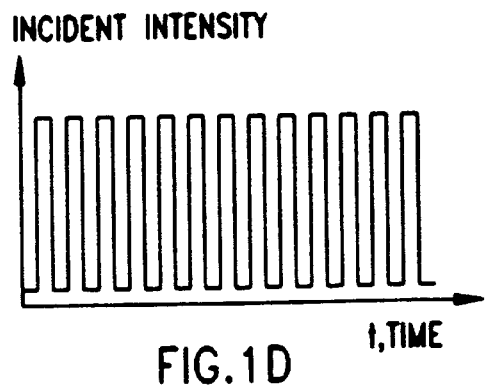
FIGS. 1D, 1E and 1F set forth a set of schematic representations of (i) a high-frequency modulated laser beam (e.g. three times the information recording rate) directed incident onto an information storage structure of the present invention, (ii) the reflected intensity of the laser beam after reflecting off the information storage structure, and (iii) the logical information signal recovered from the reflected laser beam detection and processing by the system of the present invention.
Figure 1B:
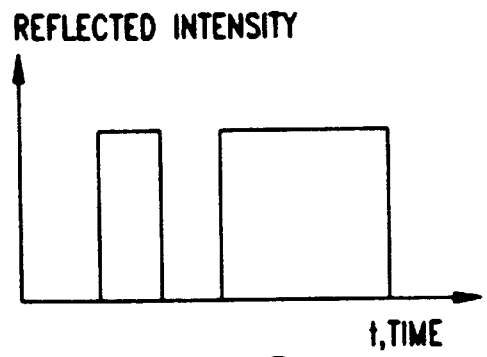
Figure 1E:
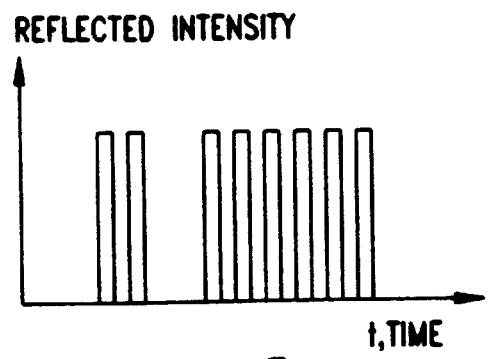
Figure 1C:
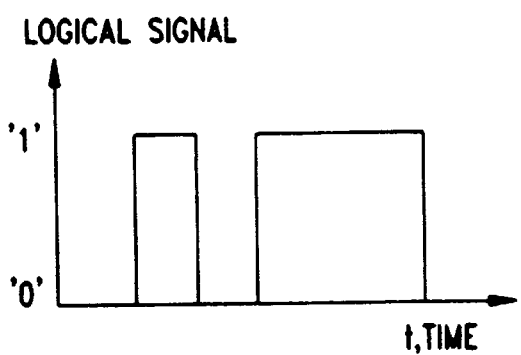
Figure 1F:
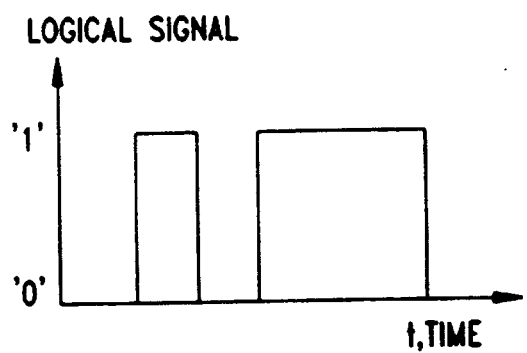

In general, several types of incident laser beams may be used to read information values recorded in the optical media of the present invention. As shown in FIGS. 1A, 1B and 1C, the incident laser beam used during information reading operations may have a constant incident intensity, Alternatively, the incident laser beam may have an incident intensity that is modulated at a high frequency (e.g. at three times of the information recording rate), as shown in FIGS. 1D, 1E and 1F. There are several advantages obtained when using a modulated laser light source, namely: the light beam produced therefrom has a relatively short coherence length and the deleterious effects of optical feedback are reduced. In practice, there are several ways to produce such modulated laser beams. One way is to use a specially designed edge-emitting light emitting diode (ELED), which has a broad-band spectral output. Another way is to use a self-pulsating laser diode, which produces a modulated laser beam. The laser beam produced from a self-pulsating laser diode naturally oscillates at a radio frequency (e.g. $10^9$ Hz) and thus have spectral output wavelengths of 0.78 nanometers, even when driven by a dc excitation voltage. Such lasers are widely used in the optical pick-ups of conventional CD-ROM drives. Another way to produce a modulated laser beam is to directly modulate a generated laser beam using a RF signal in a manner well known in the art.

During information reading operations, the intensity property of each spectral component in the incident laser beam is modulated (i.e., changed) upon reflecting off an information storage layer having wavelength and polarization-state characteristics identically matched with the spectral components of the incident laser beam. In one illustrative embodiment of the information storage and retrieval system, the reflected spectral components in the incident laser beam are intensity-modulated by the planar surface characteristics of the reflecting information storage layer. In another illustrative embodiment, the reflected spectral components in the incident laser beam are intensity-modulated by the stepped (or undulated) surface characteristics of the reflecting information storage layer. Thus it is essential that each of the spectral components, comprising the composite laser beam, be optically separated (i.e. isolated) from other spectral components on the basis of both wavelength and polarization, and thereafter be channeled along a separate optical path for detection and optical signal processing.

Figure 2:
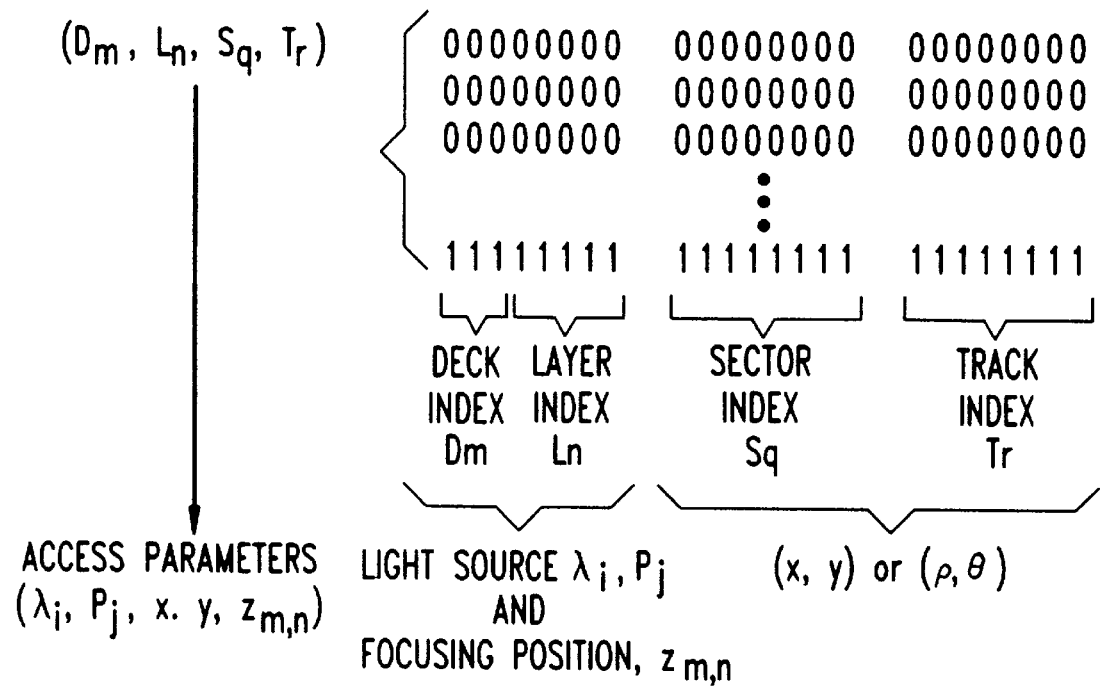
FIG. 2 is a schematic representation of the address translator of the information storage and retrieval system of FIG. 1, illustrating the conversion of logical addresses into physical addresses within the optical storage media of the present invention.

The function of light polarizing mechanism 9 is to impart a polarization state $P_j$ to the incident laser beam according to a logical-to-physical address translation process carried out by address translator 5, shown in FIG. 2. This system function can be carried out using any one of a number of light polarizing mechanism well known in the art.

The function of the laser beam collimating and shaping (i.e. optical) mechanism 10 is to collimate the spectral components produced by the laser diodes and to then shape (i.e. circularize) the cross-sectional diameter of the composite laser beam for information reading operations. This system function can be carried out using one of a number of optical devices well known in the art, including collimating optics and aperture stops commonly used in laser beam profiling.

The collective function of the beam focusing mechanism 15, depth focusing mechanism 12 and the auto-focusing/tracking mechanism 13 is to focus the collimated laser beam to a depth within the multi-layer information storage device specified by depth information produced by the address translator 5 and provided to the associated mechanisms by the media access controller 6. Notably, the cross-sectional dimensions of the focused laser beam must correspond with the physical spatial dimensions of each information storage cell realized in the optical storage device. Typically, these system functions are carried out using a n objective lens that focuses the laser beam to a small spot size on the information storage media, while a mirror and lens subassembly are mounted in a moving coil actuation structure in order to provide focusing and tracking motion. Such mechanisms will be described in greater detail hereinafter with reference to the particular embodiments hereof.

The function of the laser beam moving (i.e. steering) mechanism 11 is to move the focused laser beam relative to the surface of the information recording device during information reading operations. This system function can be carried out using electromechanical and/or electro-optical mechanisms well known in the art for scanning focused laser beams along the coordinate directions of a prespecified coordinate system embedded within the optical storage device hereof.

The function of the storage media moving mechanism 17 is to move the multi-decked/multilayered information storage device 3 relative to the focused laser beam during information reading operations. The manner in which this system function is carried out depends largely on the form in which the optical storage media is realized (e.g. disc, tape, card, etc.).

The function of the wavelength and polarization state detection mechanism 19 is to optically isolate each spectral component in the reflected composite laser beam on the basis of both its wavelength and polarization state. The function of the signal conversion mechanism 20 then is to convert each of the individual spectral components that have been intensity-modulated (upon reflecting off the optical storage media), into a corresponding analog electrical signal for subsequent intensity-detection along a separate optical signal processing channel indexed by both spectral wavelength (and polarization state P. Once the intensity modulation has been detected, it can be converted in a digital value corresponding the information bit(s) recorded in the read information storage cell.

As will be shown in the various illustrative embodiments described hereinbelow, the reflected laser beam is focused onto a small-area detector, having a low capacitance and thus a high detection speed. Optically, the incident beam spot size at the information storage layer of the optical media is on order of the wavelength of the spectral components of the laser beam. Typically, the beam spot is diffraction-limited in order to achieve the highest areal density possible in each particular application. The laser beam reflected from the optical storage medium (i.e. by reflective diffraction due to the reflecting area being comparable to the wavelength of the incident laser beam) is re-collimated by the same objective lens used for focusing, and subsequently imaged by the focusing lens in front of the photodetector. Generally, the imaged reflection is magnified, as the size of the photodetector is typically much larger than the size of the focused beam at the information storage medium.

To properly read information from a composite information storage device of the present invention, it is essential that particular items of information be recorded on a set of prespecified tracks (e.g. called "Table of Contents"). The location of these information tracks can be set by standard, for example, on the top (i.e. uppermost) or bottom (i.e. lowermost) information storage layer of the device. Such information items will typically include: information (i.e., digital code) identifying the optical media; information specifying the physical parameters of the optical media; information specifying a directory of files recorded on the information storage disc; information specifying subdirectories of files recorded on the information storage disc; the number of information storage decks in the device; the number of information storage layers in each of these information storage decks; information regarding the physical arrangement with respect to each other; and information regarding the characteristic wavelength and polarization state of each specified information storage layer in the device.

During an information reading operation, the host computer typically requests that a particular information file (e.g. document) be read from the information storage device hereof, and transmitted to the host computer system by way of system bus 23. In order to carry out this system function, the address translation processor 5 illustrated in FIG. 2 maintains two look-up tables. The data structure organization on the information storage disc is conventional: bits are grouped into bytes; bytes are grouped into sectors; and sectors are grouped into clusters. The first look-up table relates physical address (i.e. track) location of each information storage "cluster" in the device, specified by the vector ($D_m$, $L_n$, $T_r$, $S_q$), to the set of access parameters (($_i$, $P_j$, x, y, $z_{m,n}$) used by the storage system controller 4 to read the corresponding information storage cluster location. The second look-up table relates the set of access parameters (($_i$, $P_j$, x, y, $z_{m,n}$) used by the storage system controller to read each information storage cluster location in the device, to the physical address location of each information storage cluster therein, specified by the vector ($D_m$, $L_n$, $T_r$, $S_q$). In the illustrative embodiment, the information recorded in a composite information storage device hereof can be addressed by the information storage deck number $D_m$, information storage layer number $L_n$ in the deck, track number $T_r$ on the information storage layer, and sector number $S_q$ on the track. Such information items can be stored in the Table of Contents of the device using, for example, a 24-bit long information word. In such an illustrative embodiment, the deck index $D_m$ can be represented by 3 bits, corresponding to one of $2^3$ or 8 decks; the layer index $L_n$ can be represented by 5 bits, corresponding to one of $2^5$ or 32 layers in each deck; the track index $T_r$ can be represented by 8 bits, corresponding to one of $2^8$ or 128 tracks on each sector; and the sector index $S_q$ can be represented by 8 bits, corresponding to one of $2^8$ or 128 sectors on each layer. The data address ($D_m$, $L_n$, $T_r$, $S_q$) provides the physical address which is indicated by the laser wavelength ($_i$ and polarization $P_j$ to retrieve the data on sector $S_q$ along the track $T_r$ on the layer $L_n$ in the deck $D_m$.

The address translator 5 may be realized as a separate hardware device (e.g. using ROM, PROM or like technology), it can be realized as firmware within the storage system controller 4, or it can be realized as software in the program storage system as in the case of a device driver. The data address ($D_m$, $L_n$, $T_r$, $S_q$) produced by the address translator 5 is used by the storage system controller to perform a number of control functions. The first control function is to select a set of laser diodes having the set of characteristic wavelength specified by $\{(_i\}$. The second function is to specify the set of corresponding characteristic polarizationstates specified by $\{P_j\}$ which must be imparted to the produced spectral components by way of polarization mechanism 9. The third function is to provide sufficient control signals to laser moving mechanism 16 and storage media moving mechanism 17 in order that these functional subcomponents of the system can properly control steer the location of the incident composite laser beam to information storage cells specified by either (x, y, $z_{m,n}$) or (r, (, $z_{m,n}$), depending on the reference system used. The fourth function is to control depth focusing mechanism 12, servo-controlling mechanism 14 and auto-focusing/tracking mechanism 13 so that the spectral component of the composite laser beam having characteristic wavelength ($_i$ and polarization-state $P_j$ is focused to the information storage cell located on the ($D_m$, $L_n$) layer. As will be explained in greater detail with reference to FIG. 10, this capacity to simultaneously produce a laser beam with multiple spectral components having different characteristic wavelengths and polarization-states, enables the system hereof to simultaneously read prerecorded information in storage cells located in different information storage layers having corresponding characteristic wavelengths and polarization states.

As shown in FIGS. 3A and 3B, the information storage and accessing system of the present invention can be readily adapted to read information storage devices manufactured in the form of optical discs. The rotation of an optical disc of the present invention will depend on its type (i.e. how it was designed to be rotated and read during information reading operations). Unlike conventional CD ROMs, in which information tracks are formed along a continuous spiral and the optical disc must be rotated at Constant Linear Velocity (CLV), optical storage discs hereof can be rotated at either a Constant Angular Velocity (CAV) or a Constant Linear Velocity. Due to the nature of the spiral track along which information bits are recorded in CLV type optical storage discs hereof, the rotational speed of the disc, (, depends on position (r,( ) of the information bit being read, as shown in FIG. 3C. For CLV type discs, the servo-control information required to vary the angular speed of the rotating disc as a function of information bit position (r, ( ) is encoded within the information bits recorded on the optical disc itself. In contrast, for CAV-type optical storage discs of the present invention, the angular velocity of the optical disc (is maintained constant by a servo-mechanism, independent of the position (r, ( ) of the information bits being read. In order to read both CLV and CAV type optical discs hereof, the information storage and accessing system of FIGS. 3A and 3B includes an autodiscrimination mechanism for automatically determining the type of optical storage disc being read, and suitable mechanism for accommodating the rotational requirements thereof. When an optical storage disc is identified upon insertion into the disc drive mechanism of the system of FIGS. 3A and 3B, prerecorded information about the disc type (e.g. stored on track 1) is automatically read, decoded, and stored with the system controller, in a manner which will be described in greater detail with reference to the logic process diagram of FIG. 23. While servo-control for disc rotation is a complex process, it nevertheless is well known in the art. In general, the CLC and chiral thin-film optical storage discs of the present invention can be realized as either CLV or ZCAV type discs. When realized as CLV-type optical storage discs, the servo-control mechanism used for the conventional CD-ROM devices can be used to controlling the angular velocity of CLV-type optical storage discs. When realized as either ZCAV or CAV type optical discs, the disc velocity control is simpler, as the angular velocity need only be maintained constant at a single speed during information reading operations. The servo-control mechanism for such types of optical storage discs can be constructed by embedding within suitable phase-locked loop (PLL) circuitry, either an optical or magnetic encoder used to encode the rotational position (and thus velocity) of spindle of the motor used to rotate the optical storage disc.

For ZCAV type optical storage discs, the access time is inherently fast. The reason for such performance is due to the fact that the disk rotates at a constant angular velocity and the access time is limited solely by the movement of optical pickup. The ZCAV information storage format exploits the increased information storage capacity of tracks radially outward from the center of disc rotation. This is achieved by dividing (i.e. partitioning) the concentric tracks at the outer radii into more information storage sectors, thereby increasing the information storage capacity of the optical storage disc, while retaining the fast access time of the conventional CAV technique. Because the storage media is rotated at a constant angular velocity, the ZCAV format facilitates multiple optical pickups for data storage and retrieval, thereby increasing the information transfer throughput of the system. While the ZCAV format is preferred for information storage and accessing systems having high data transfer throughput, the CAV format may nevertheless be used with the optical storage media of the present invention and obtain excellent performance results. Unlike CLV-type discs, the ZCAV format allows for the use of multiple optical read pickups.

Figure 3D:
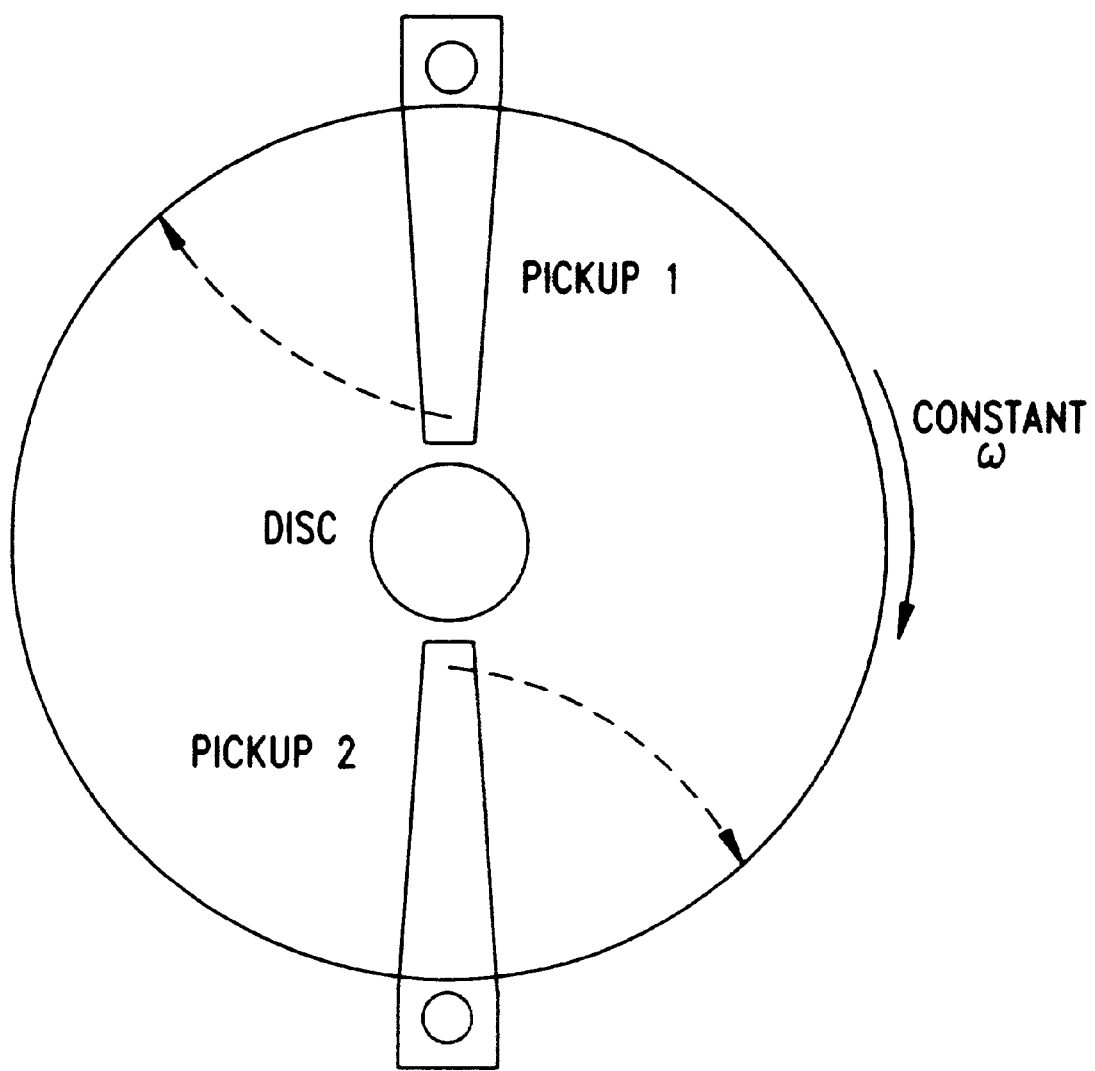
FIG. 3D is a schematic representation of an information storage and reading system constructed in accordance with the present invention, in which dual optical pick-ups are used to simultaneously read different tracks of information prerecorded on an CLC optical disc of the present invention using Zoned Constant Angular Velocity (ZCAV) formatting.

As shown in FIG. 3D, multiple optical pick-ups are assembled about a ZCAV-type optical storage disc of the present invention supported upon a motor driven spindle operated under servo-control. Each optical read pick-up in this pick-up assembly is provided with its own independent servo-controls for tracking and focusing. Using a parallel array of k optical read pick-ups, as shown in FIG. 3D, the information transfer rate can be increased k-fold, where k is the number of the pickups. In a preferred embodiment, the spectral range $\{(_1, \ldots, (_N\}$ is divided into k subranges and each optical pick-up is designed for particular spectral subrange. In the illustrative embodiments, the movement of each optical information pickup is constrained to follow an arc-like path during information reading operations. Alternatively, however, the optical pickups can be designed to move along a radial direction during information reading operations.

As shown in FIGS. 4A, 4B, 4C, 5A and 5B, the information storage and accessing system of the present invention can be readily adapted to read information storage devices manufactured in either the form of optical cards or optical tape. When manufactured in accordance with the present invention, these optical cards and tapes will comprise multiple information storage decks and layers, as generally described above. In the case of optical tape, it is understood that the optical storage media will be flexible to allow it to be transported using conventional tape-transport mechanisms. The major modifications required in practice these alternative embodiments of the present invention include providing suitable means for transporting either composite laser beam relative to the optical storage media or the optical storage media relative to the composite laser beam. In some embodiment, it may be desired to transport both relative to each other. Such technical details are well within the scope of knowledge of those with ordinary skill in the art and thus shall not require further elaboration.

As illustrated in FIG. 6, the optical storage media of the present invention may generally comprise M information storage decks. In turn, each information storage deck may generally comprise N pairs of information storage layers. Thus, the generalized embodiment of the optical storage media of the present invention comprises 2MN information storage layers. Each such information storage pair is realized as an information storage structure having light reflective properties which are dependent on both the wavelength and polarization state of the incident light beam employed during information reading operations. In general, the information storage decks are separated by free space, or by some optically isotropic material presenting no space intervening therebetween.

As will be described in greater detail hereinafter, each information storage cell in which a prespecified information value (e.g. a logical "1") has been recorded, has a characteristic wavelength ($_i$ and polarization state $P_j$ which reflects the spectral component of an incident laser beam having (i) its spectral band centered at a wavelength approximately (i.e. substantially) equal to the characteristic wavelength ($_i$ of the recorded information storage cell, and (ii) its polarization state the same as the polarization state $P_j$ of the recorded information storage cell. These particular properties of the optical storage media of the present invention enable the recording and storage of discrete information states in the optical storage media. Similarly, each information storage cell in which a different prespecified discrete information storage value (e.g. logical "0") has been recorded, is designed (i.e. constructed) to lack such selective light reflective properties and thus be optically transparent to all other spectral components. Using this approach to information state recording/storage, information state detection mechanisms can be constructed, as will be described in great detail hereinafter.

As indicated in FIG. 6, each information storage layer is labeled by (($_i$, $P_j$, $D_m$, $L_n$), corresponding to the information storage layer located within Deck m, and realized in information storage Layer n. This specified information storage layer has a characteristic reflection band for the polarization state $P_j$ centered approximately at wavelength ($_i$. Each n-th paired information storage structure has a characteristic wavelength, while its pair of constituent layers (($_i$, $P_1$, $D_m$, $L_n$) and (($_i$, $P_2$, $D_m$, $L_n$) have polarization states $P_1$ and $P_2$ that are orthogonal (i.e. perpendicular). As each n-th paired information storage structure comprises two wavelength and polarization-state selective layers as identified above, each m-th information storage deck may comprise up to 2N information storage layers.

According to the general principles of the present invention, digital information recorded in the information storage cells of each information storage layer (($_i$, $P_j$, $D_m$, $L_n$) can be read using a laser beam having a spectral component with a characteristic wavelength ($_i$ and polarization-state $P_j$ that is identical to the characteristic wavelength ($_i$ and polarization-state $P_j$ of the information storage layer (($_i$, $P_j$, $D_m$, $L_n$). Thus, the 2MN information storage layers of the generalized embodiment requires only N spectral laser lines in order to read out the stored information from the information storage cells in the various information storage layers.

Notably, the above specification of the information storage layers in the optical storage media is provided solely for the pedagogical purposes, as the partial physical address ($D_m$, $L_n$) is sufficient to specify the characteristic wavelength and polarization state (($_i$, $P_j$) required by the address translator for information retrieval operations. Also, it should be noted that the paired information storage layers (($_i$, $P_1$, $D_m$, $L_n$) and (($_i$, $P_2$, $D_m$, $L_n$) need not necessarily be in the same physical order, or in physical proximity with each other, as shown. Furthermore, it is understood that while there may be practical reasons for doing so in particular applications, each paired information storage structure need not be physically organized according to increasing or decreasing characteristic wavelengths, as shown in FIG. 6.

Having described the overall structure and function of the information storage and retrieval system of the present invention, it is appropriate at this juncture to describe in greater detail various illustrative embodiments of the novel information storage structured of the present invention.

In FIG. 7A, the first illustrative embodiment of the paired wavelength-selective and polarization-selective information storage structure of the present invention is shown. This structure can be used to construct any one of many embodiments of the optical storage media hereof. As shown, each paired information storage structure comprises: a first planar information storage layer (($_i$, $P_1$, $D_m$, $L_n$) which reflects incident light having polarization state $P_1$ and wavelength ($_i$ wherever a binary bit '1' is written (i.e. a first information value storage location) and transmits incident light wherever a binary bit '0' is written (i.e. a second information value storage location) regardless of the wavelength and polarization state of the incident light beam; a second planar information storage layer (($_i$, $P_2$, $D_m$, $L_n$) which reflects light having polarization state $P_2$ and wavelength (wherever a binary bit '1' is written and transmits incident light wherever a binary bit '0' is written regardless of the wavelength and polarization state of the incident light beam; and a superstrate, a substrate, and a plurality of interlayers between which the first and second planar information storage layers. In general, polarization states $P_1$ and $P_2$ of the incident laser beam are two mutually orthogonal to each other.

In general, Fresnel reflections should be eliminated in order to reduce background noise during laser beam reception. The reflections which would otherwise occur at the air-superstrate or air-substrate interfaces of the optical storage device can be effectively minimized by coating such surfaces with an anti-reflection (AR) coating. Optionally, the substrate-air interface can also be painted optically black (i.e. coated with a light-absorbing thin-film material). The reflections which occur at the interfaces of the plurality of interlayers and the information storage layers can be effectively minimized by selecting the refractive index of the plurality of interlayers to closely match the refractive of the information storage layers. By doing so, it is reasonable to neglect the effects of Fresnel reflections which occur at interfaces of the information storage layers as the incident laser beam propagates towards its addressed information storage layer during information retrieval operations. Alternatively, in some embodiments AR-coatings may be avoided by carefully designing the optical system used to pick-up spectral components reflected from the optical storage media during information reading operations.

Referring to FIG. 7A, on the top information storage layer, the shaded regions or areas (i.e. where a logical '1' is stored) reflects only $P_1$-polarized light centered at a characteristic wavelength ($_i(P_1)$) with a bandwidth of (((($_i$, $P_1$, $D_m$, $L_n$), and transmits freely $P_1$-polarized light having wavelengths outside this narrow reflective band and $P_2$-polarized light regardless of its wavelength. This structure, for convenience, is called the (($_i$, $P_1$, $D_m$, $L_n$)-layer. Similarly, on the bottom information storage layer, called the (($_i$, $P_2$, $D_m$, $L_{n+1}$)-layer, the shaded areas where '1' is stored reflects $P_2$-polarized light centered at a characteristic wavelength ($_i(P_2)$) with a bandwidth of (((($_i$, $P_2$, $D_m$, $L_{n+1}$) and transmits freely $P_2$-polarized light outside this reflective band and $P_1$-polarized light regardless of its wavelength. The clear areas on both storage layers transmits light freely, regardless the wavelength and polarization of the incident light. As indicated earlier, $P_1$ and $P_2$ are mutually orthogonal polarizations, either circular or linear. To optically read out the stored data, the wavelength of laser beam ($_i$ is within the reflective band of both layers, as illustrated in FIGS. 7B and 7C. The two storage layers may have different characteristic wavelength and bandwidth. Ideally, the reflective bandwidth is matched to the data readout optics which usually uses a focusing objective lens with a high numerical aperture, among other considerations, such as temperature effects. Typical spectral widths of semiconductor laser diodes used to read out the stored data are much narrower than the reflective bandwidth. To improve manufacturing, the characteristic wavelength and bandwidth of the paired structures can be slightly different, that is, $(_i ( (_i(P_1) ( (_i(P_2)$ and $(( ((_i, P_1, D_m, L_n) ( (( ((_i, P_2, D_m, L_{n+1})$.

The light used to read stored information is assumed to be linearly polarized or unpolarized. For linear polarization selective storage layers, the linearly polarization of the light is further assumed to be at 45(with respect to the $P_1$ or $P_2$ direction. The incident light beam then has spectral components $P_{1(x)}$ and $P_{2(y)}$ of equal intensity. For circular polarization-selective storage layers, the orientation of the linearly polarized incident light is not important, as it comprises both $P_1$ (i.e. right-handed circularly polarized, RHCP) and $P_2$ (i.e. left-handed circularly polarized, LHCP) spectral components of equal intensity. For unpolarized light, the incident laser beam has $P_1$ and $P_2$ spectral components which are either linearly or circularly polarized and having equal intensity.

As indicated in the table of FIG. 7D, different events occur when a laser beam is incident upon different regions of the paired information storage structure during information reading operations. For example, when the laser beam is incident on the paired information storage structure at location "a", where a '1' information bit is recorded in both the information storage layers $((_i, P_1, D_m, L_n)$ and $((_i, P_2, D_m, L_{n+1})$, then the laser beam reflected from the paired information storage structure has both $P_1$ and $P_2$ spectral components. When the laser beam is incident on the paired information storage structure at location "b", where a '0' information bit is recorded in both the information storage layers, then there is no laser beam reflected from the paired information storage structure. When the laser beam is incident on the paired information storage structure at location "c", where a '1' information bit is recorded in the $((_i, P_1, D_m, L_n)$ layer and a '0' information bit is recorded in the $((_i, P_2, D_m, L_{n+1})$ layer, then the reflected laser beam only has the $P_1$ spectral component. When the laser beam is incident on the paired information storage structure at location "d", where a '0' information bit is recorded in the $((_i, P_1, D_m, L_n)$ layer and a '1' information bit is recorded in the $((_i, P_2, D_m, L_{n+1})$ layer, then the reflected laser beam only has the $P_2$ spectral component. Notably, the information bit patterns shown in FIG. 7D are simply illustrative; any type of discrete information pattern may be recorded, stored and retrieved using the principles of invention herein disclosed. Also, it is understood that in linear polarization-selective media, the incident polarization state of the incident need not be disposed at 45(with respect to the $P_1$ direction of the optical media. The incident light beam can be polarized in a direction that P1 and $P_2$ components have a sufficient intensity.

In typical embodiments, the cross-sectional dimension of the focused laser beam will be less than the physical dimensions of the light reflecting and transparent regions of the information storage layers. Typically, these dimensions will be made microscopically small in order to increase the information storage capacity of the optical storage media.

Figure 8A:
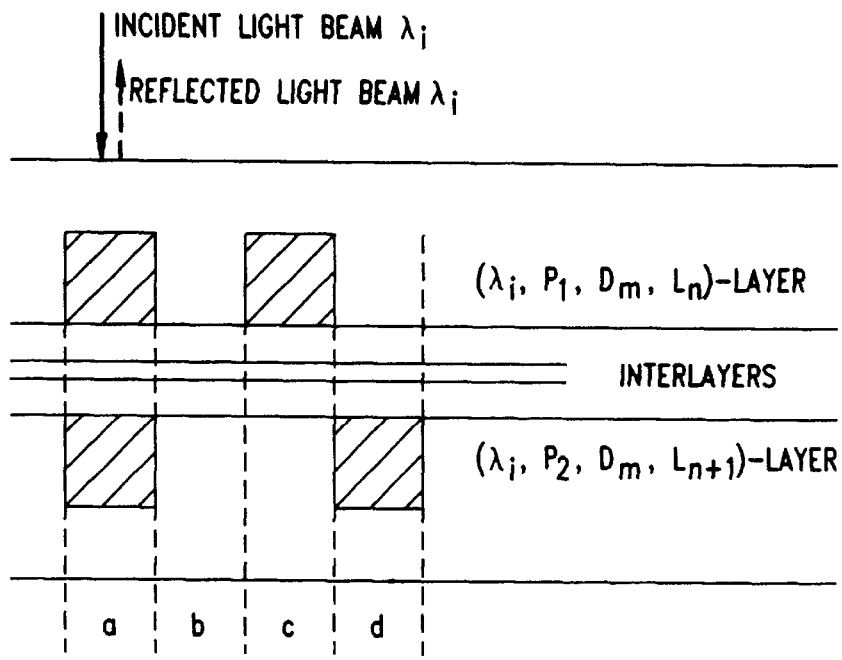
FIG. 8A is a schematic representation of a second illustrative embodiment of the paired wavelength-selective and polarization-selective information storage structure of the present invention which can be used to construct the optical storage media hereof, and as shown, comprises (i) a first planar information storage layer which reflects incident light having $P_1$-polarization state and wavelength ($_i$ wherever a binary bit '1' is written and transmits incident light wherever a binary bit '0' is written regardless of wavelength and polarization, and (ii) a second flat information storage layer which reflects light having $P_2$-polarization state and wavelength ($_i$ wherever a binary bit '1' is written and transmits incident light wherever a binary bit '0' is written regardless of wavelength and polarization.
Figure 8B:
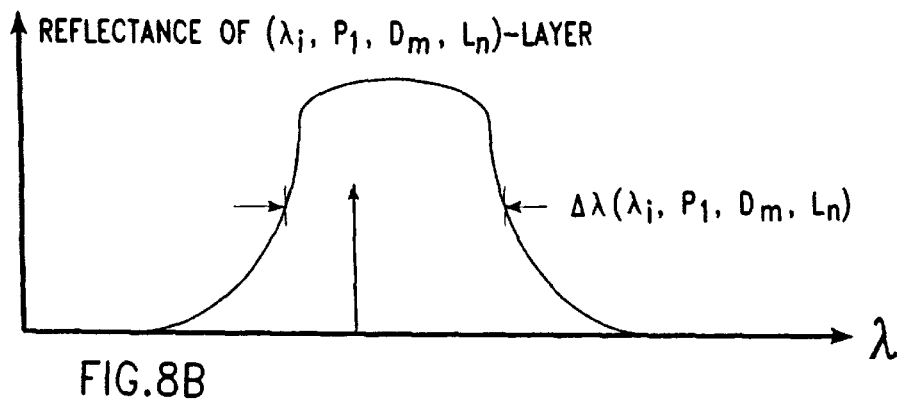
FIGS. 8B and 8C set forth a schematic representation of the reflectance spectra of the information storage layers shown in FIG. 8A.
Figure 8C:
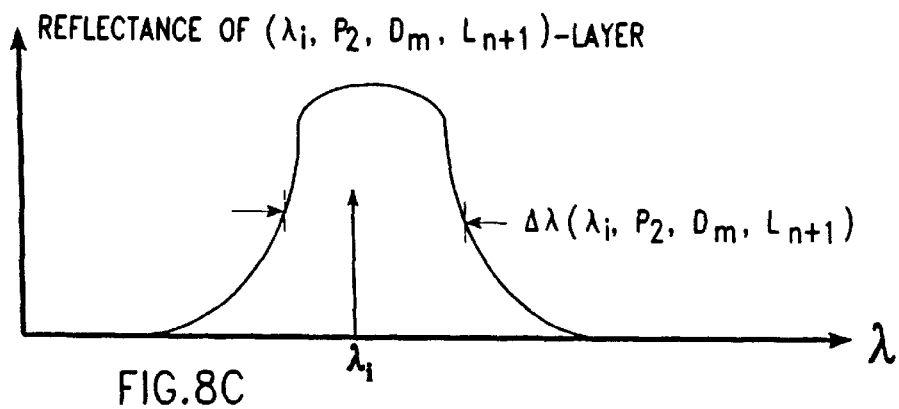

In FIG. 8A, a second illustrative embodiment of the paired information storage structure is shown. This wavelength and polarization selective structure can be used to construct any one of many embodiments of the optical storage media hereof. This information storage structure is similar to the structure shown in FIG. 7A, except that the non-reflective material used to form the 0' state information storage cells in FIG. 7A is replaced with an optically transparent material similar to that used to fabricate the substrate or superstrate of the structure of FIG. 7A. As shown in FIGS. 8B and 8C, the reflectance spectra of each of the planar information storage layers is centered (i.e. defined) about characteristic wavelength $(_i$. The Table of FIG. 8D sets forth the polarization-state of the detected laser beam while reading each of the illustrative information states at cell locations {a,b,c,d} recorded in the paired information storage structure shown in FIG. 8A.

Figure 9A:
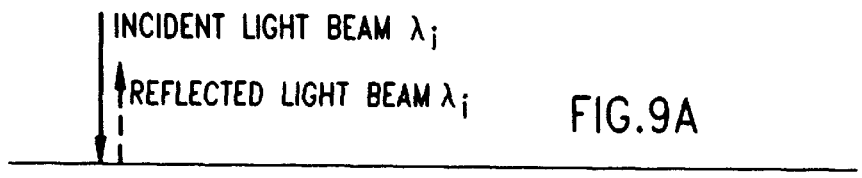
FIG. 9A is a schematic representation of a third illustrative embodiment of the paired wavelength-selective and polarization-selective storage structures of the present invention which can be used to construct the optical storage media hereof, and as shown, comprises (i) a first undulated information storage layer with a reflective coating that reflects incident light having $P_1$-polarization state and wavelength ($_i$ the same amount wherever a binary bit '1' or a binary bit '0' is written but which is detectable at different signal levels by an optical pick-up due to surface height differences for the binary bit '1' and binary bit '0', and (ii) a second undulated information storage layer with a reflective coating that reflects incident light having $P_2$-polarization state and wavelength ($_i$ the same amount wherever a binary bit '1' or a binary bit '0' is written but which is detectable at different signal levels by an optical pick-up due to surface height differences for the binary bit '1' and binary bit '0'.
Figure 9B:
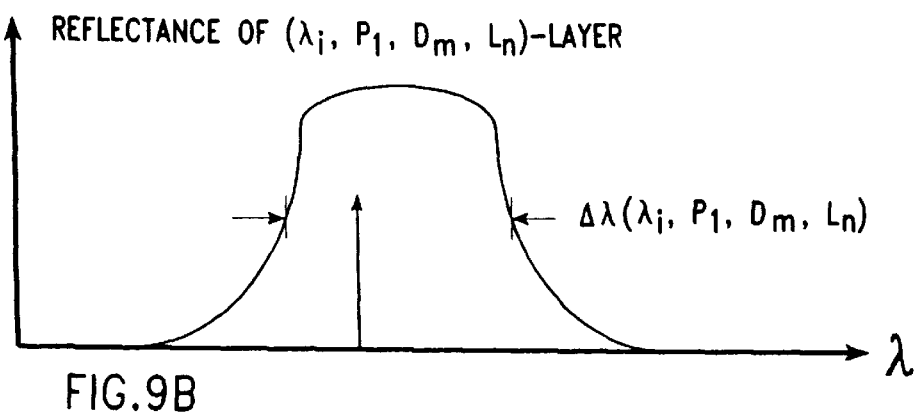
FIGS. 9B and 9C set forth a schematic representation of the reflectance spectra of the information storage layers specified in FIG. 9A.
Figure 9C:
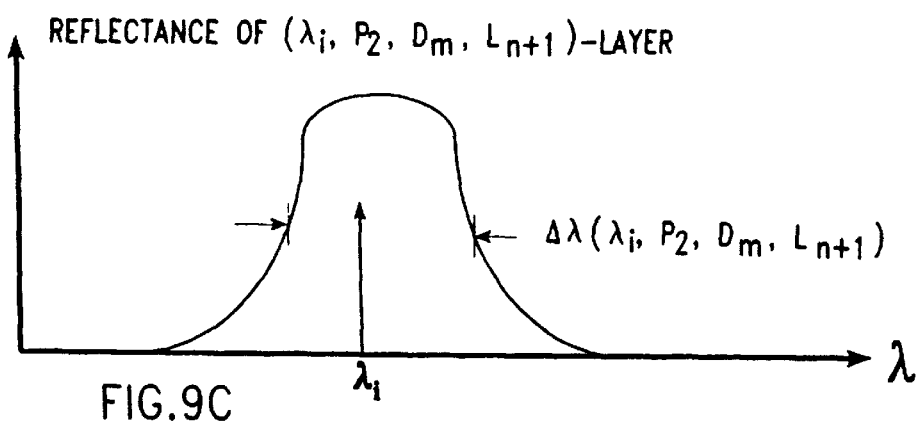

In FIG. 9A, the third illustrative embodiment of the paired information storage structure of the present invention is shown. This paired wavelength and polarization selective structure can be used to construct any one of many embodiments of the optical storage media hereof, e.g., disc, tape or card storage format. Unlike the other illustrative embodiments of the present invention, this paired wavelength-selective and polarization-selective information storage structure comprises: a first undulated (i.e. stepped) information storage layer $(((_i, P_1, D_m, L_n)$ which reflects incident light (i.e. spectral components) having a wavelength within the characteristic wavelength band $((_i$ and a polarization state equal to the $P_1$-polarization state wherever a binary bit '1' or a binary bit '0' is written therein, and transmits incident light (i.e. spectral components) having a wavelength falling outside of the characteristic wavelength band $((_i$ or a polarization state equal to the $P_2$-polarization state, which is orthogonal to the $P_1$-polarization state; a second undulated information storage layer $((_i, P_2, D_m, L_n)$ which reflects incident light (i.e. spectral components) having a wavelength within the characteristic wavelength band $((_i$ and a polarization state equal to the $P_2$-polarization state wherever a binary bit '1' or a binary bit '0' is written therein, and transmits incident light having a wavelength falling outside of the characteristic wavelength band $((_i$ or a polarization state equal to the $P_1$-polarization state; and a plurality of interlayers disposed between the first and second undulated information storage layers, for support without light scattering. In general, polarization states $P_1$ and $P_2$ are two mutually orthogonal polarization states of spectral components comprising the incident laser beam used to read information patterns recorded in the undulated surface of each information storage structure. In this illustrative embodiment, both binary "1" and "0" states, recorded as high and low surface undulations (i.e. steps), reflect light having spectral components with a wavelength and polarization state matched to the characteristic wavelength band and polarization state of the information storage layer. Thus, a binary "1" recorded on a first undulated (i.e. stepped) information storage layer $(((_i, P_1, D_m, L_n)$ will produce a reflected signal that will have a slightly higher light intensity when detected by the photodetector of the optical pick-up used in the information retrieval system, whereas a binary "0" recorded on the same undulated (i.e. stepped) information storage layer $(((_i, P_1, D_m, L_n)$ will produce a reflected signal that will have a slightly lower light intensity when detected by the photodetector of the optical pick-up used in the information retrieval system. On the basis of the difference in detected light intensity at the optical pick-up, the system is capable of determining whether a binary "1" or binary "0" has be recorded in a particular storage cell location on such an information storage device. This technique in intensity level discrimination is used in conventional CD-ROM reading units. As shown in FIGS. 9B and 9C, the reflectance spectra of each of the planar information storage layers is a narrow-band (($_i$ centered substantially about characteristic wavelength ($_i$. The Table of FIG. 9D sets forth the polarization-state of the detected laser beam while reading each of the illustrative information states at cell locations {a,b,c,d} recorded in the paired information storage structure shown in FIG. 9A.

Figure 9E:
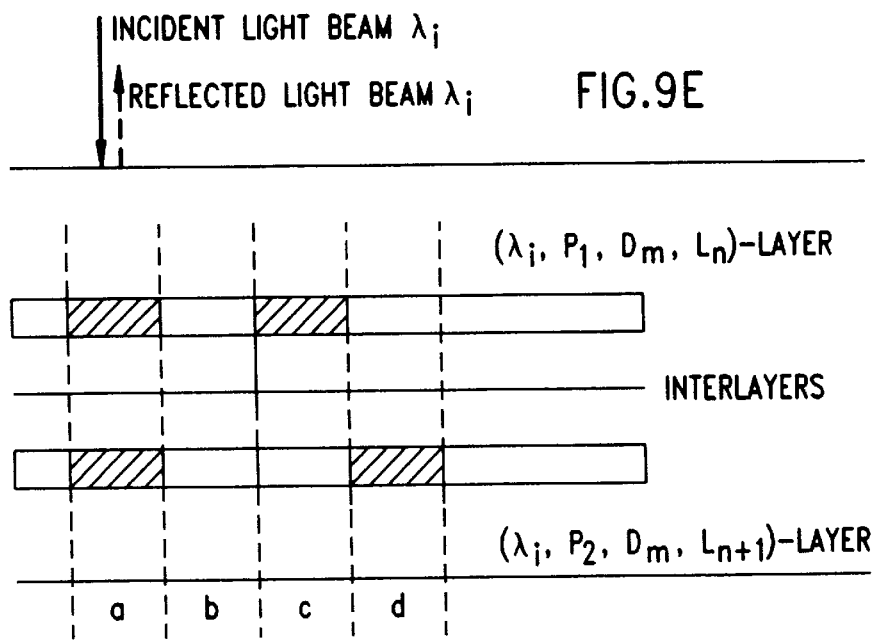
FIG. 9E is a schematic representation of a fourth illustrative embodiment of the paired wavelength-selective and polarization-selective information storage structure of the present invention which can be used to construct the optical storage media hereof, and as shown, comprises (i) a first planar, thin-film type information storage layer which reflects incident light having $P_1$-polarization state and wavelength ($_i$ wherever a binary bit '1' is written and transmits incident light wherever a binary bit '0' is written regardless of wavelength and polarization, and (ii) a second planar, thin-film type information storage layer which reflects light having $P_2$-polarization state and wavelength ($_i$ wherever a binary bit '1' is written and transmits incident light wherever a binary bit '0' is written regardless of wavelength and polarization.
Figure 9F:
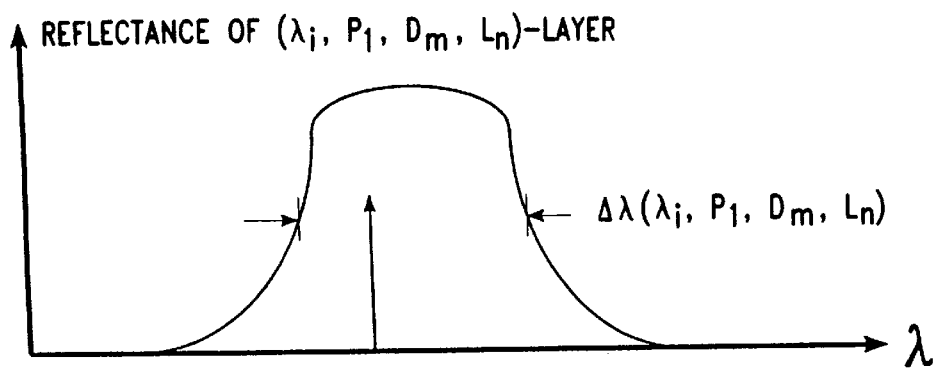
FIGS. 9F and 9G set forth a schematic representation of the reflectance spectra of the thin-film type information storage layers shown in FIG. 9E.
Figure 9G:
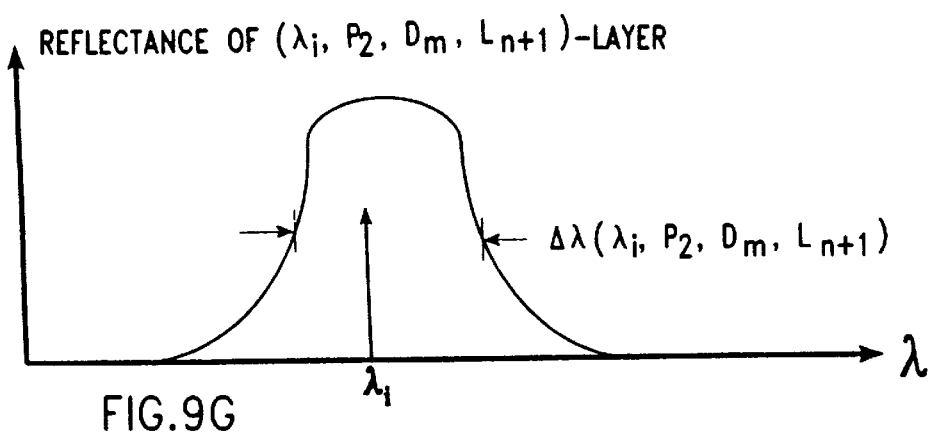

In FIG. 9E, a fourth illustrative embodiment of the paired information storage structure is shown. This wavelength and polarization selective structure can be used to construct any one of many embodiments of the optical storage media hereof. This information storage structure is similar to the structure shown in FIG. 9A, except that the reflective material used to form the "1" state information storage cells in FIG. 9A is thin, artificial chiral film. Methods for fabricating this information storage structure are illustrated in FIGS. 33A through 33G. As shown in FIGS. 9F and 9G, the reflectance spectra of each of the planar information storage layers is centered (i.e. defined) about characteristic wavelength ($_i$. The Table of FIG. 9H sets forth the polarization-state of the detected laser beam while reading each of the illustrative information states at cell locations {a,b,c,d} recorded in the paired information storage structure shown in FIG. 9E.

Figure 13A:
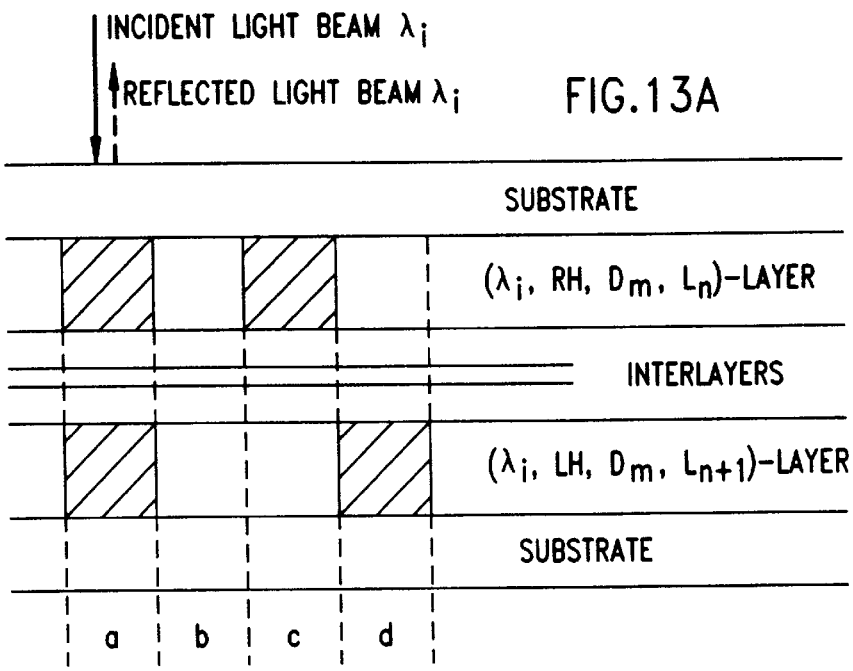
FIG. 13A is a schematic representation of a fifth illustrative embodiment of the paired wavelength-selective and polarization-selective storage structures of the present invention which is based on the wavelength-selective and circular polarization-selective reflectance properties of CLC material, which can be used to construct the optical storage media hereof, and as shown, comprises (i) a first planar information storage layer which reflects incident light having a right-handed circularly polarized (RHCP) state and wavelength ($_i$ wherever a binary bit '1' is written and transmits incident light wherever a binary bit '0' is written regardless of polarization and wavelength, and (ii) a second planar information storage layer which reflects incident light having a left-hand circularly polarized (LHCP) state and wavelength ($\lambda_i$ wherever a binary bit '1' is written and transmits incident light wherever a binary bit '0' is written regardless of polarization and wavelength.

In FIG. 13A, the fifth illustrative embodiment of the paired optical storage structure of the present invention is shown. This particular embodiment is based on the light reflectance properties of CLC material which are dependent on both the wavelength and circular polarization-state of the incident light. This paired information storage structure can be used to construct the numerous embodiments of the optical storage media hereof. As shown, the paired information storage structure comprises: a first planar information storage layer (i.e. RH-layer) which reflects incident light having a right-handed circularly polarized (RHCP) state and wavelength ($_i$ wherever a binary bit '1' is written and transmits incident light wherever a binary bit '0' is written regardless of polarization and wavelength; a second planar information storage layer (i.e. LH-layer) which reflects incident light having a left-hand circularly polarized (LHCP) state and wavelength ($_i$ wherever a binary bit '1' is written and transmits incident light wherever a binary bit '0' is written regardless of polarization and wavelength; a superstrate, a substrate and a plurality of interlayers disposed between the first and second planar information storage layers.

CLC material reflecting RHCP light is called a dextrorotary or right-handed (RH) CLC and, similarly, the CLC reflecting LHCP light is called a levorotray or left-handed (RH) CLC. Reflectance nearly 100% can be obtained with a layer of CLC material only a few microns thick. For information storage applications of the present invention, such high reflectance is not necessary. In fact, for decked information storage media of the present invention, a lower reflectance is prescribed. The reflectance of CLC has a spectral bandwidth given by (((($_0$(n/n$_{av}$, where (n is the birefringence, and n$_{av}$ is the average refractive index and is centered at the characteristic wavelength, ($_0$. The light reflectance R of polymer CLC material is determined by the CLC layer thickness L and is governed by the equation $R=\tanh^2[((n/n_{av})(L/P)]$, where the ratio L/P is an integer corresponding to the number of helical pitches in the film. Details concerning this phenomena are described at greater length in the publication entitled 'Design and construction of 1064-nm liquid-crystal laser cavity end mirrors, by J. C. Lee and S. D. Jacobs, published in *Journal of Applied Physics*, Vol. 68, No. 274 (1990).

The characteristic wavelength ($_0$ of CLC material is given by n$_{av}$P where P is the helical pitch associated with the particular CLC. In general, there are two known ways of tuning the characteristic wavelength of CLC material. In particular, the characteristic wavelength of CLC polymer can be tuned by controlling the concentration of chiral additive, as described in the following publications: U.S. Pat. No. 5,353,247 to Faris; 'Cholesteric Structure I: Optical Properties' in *Liquid Crystals*, by J. L. Fergason, published at page 89, with G. H. Brown, G. J. Dienes and M. M. Labes eds., (Gordon & Breach, New York, 1967); and 'Liquid crystal laser optics: design, fabrication and performance,' by S. D. Jacobs et al, in *Journal of the Optical Society of America*, Vol. B5, No. 91962 (1988). The characteristic wavelength of polymer CLC material can also be tuned by controlling the curing temperature, as described in the publication: 'Liquid crystal side chain polymers: properties and aspects for applications, by H. Finkelmann and H. J. Kock, published in *Display Technology*, Vol. 1, No. 81 (1985).

In general, there are four different states of molecular ordering for CLCs, namely: planar state; focal-conic state; homeotropic state; and isotropic state. While these states are described in the book "Liquid Crystals" cited above, it will be helpful to briefly review each such state of CLC molecular ordering below and indicate how the same can be used to realize the information storage values in the optical media of the present invention.

The planar state of molecular ordering is where CLC molecules are ordered in a helix, having an optical axis pointing in the same direction, typically normal to the face. Because of such molecular ordering, CLC material in this state exhibits wavelength and circular-polarization selective reflectance. In the present invention, the planar state of CLC material can be used to realize a particular logical state value (e.g. "1") to be recorded in the optical storage media hereof, as it will produce a signal of higher value.

The focal-conic state of molecular ordering is where CLC molecules are ordered in a helical structure, but the helixes are randomly oriented. While each individual helix has wavelength and polarization selective reflectance properties, light scatters in all directions, thus reducing the reflected light in any particular direction. Therefore, in the present invention, the focal-conic state of CLC material can be used to realize a particular logical state value (e.g. "0") to be recorded in the optical storage media hereof, as it will produce a signal of lower value.

The homeotropic state of molecular ordering is where CLC molecules are not ordered in a helix. The CLC molecules are rod-shaped, and have a optical axis pointing in one direction which is typically normal to the face of the thin-film. Because of such molecular ordering, CLC material in this state does not exhibit wavelength and circular-polarization selective reflectance. Therefore, in the present invention, the homeotropic state of CLC material can be used to realize a particular logical state value (e.g. "0") to be recorded in the optical storage media hereof, as it will produce a signal of lower value.

The isotropic state of molecular ordering is where the individual CLC molecules have a random orientation. Actually, this state is not a liquid crystalline state because there is no molecular ordering. Thus, CLC matter is said to be in isotropic state if its temperature is raised above a characteristic (i.e. clearing) temperature. Apart from Fresnel reflection, CLC material in the isotropic state does not exhibit wavelength and circular-polarization selective reflectance. Therefore, in the present invention, the isotropic state of CLC material can be used to realize a particular logical state value (e.g. "0") to be recorded in the optical storage media hereof, as it will produce a signal of lower value.

Notably, the above-described states of polymer CLCs provide several important advantages when fabricating the optical storage media of the present invention. In particular, the first information value storage cell locations (e.g. logical "1s") can be recorded first in an information storage structure hereof by inducing the CLC material into its planar state (e.g. using shearing or field alignment techniques). Thereafter, the second information storage value cell locations (e.g. logical "0s") can be recorded by (i) raising the temperature of particular portions of the CLC material to its "clear temperature" in order to cause it become isotropic, or (ii) subjecting particular portions thereof to a strong electric or magnetic field in order to cause it become focal-conic or homeotropic. Thereafter, the processed CLC material can be polymerized using conventional techniques and then allowed to cool so that the ordering of the CLC molecules are fixed or frozen. An alternative technique for realizing the logical "0" state is by destroying the CLC molecules.

Figure 13B:
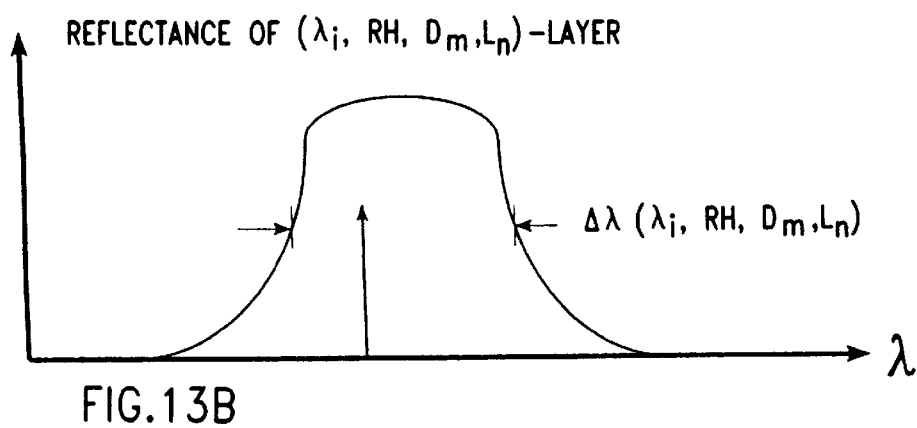
FIGS. 13B and 13C set forth a schematic representation of the reflectance spectra of the information storage layers specified in FIG. 13A.
Figure 13C:
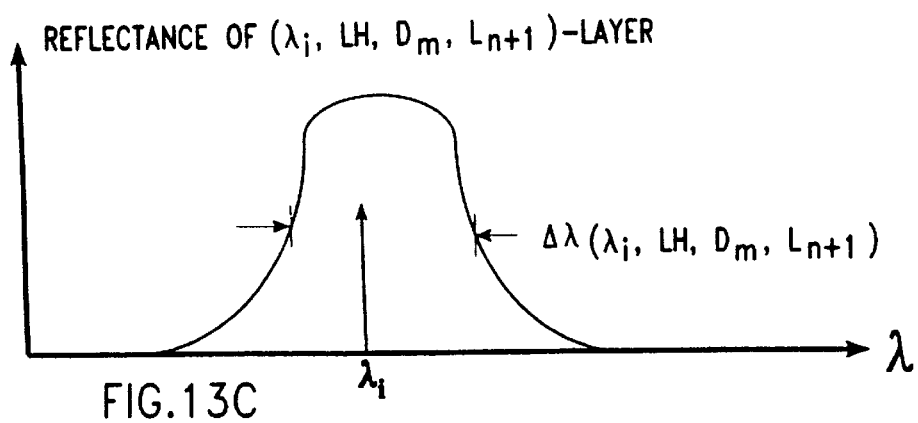

According to the technical teachings on the present invention set forth above, polarization states $P_1$ and $P_2$ in the CLC-based information storage structure are RHCP and LHCP, respectively. Without loss of generality, each first information value (e.g. logical '1' value) recorded in the top CLC-based information storage layer reflects incident light having (i) a spectral bandwidth of $((( _i, RH, D_m, L_n)$ centered at a characteristic wavelength $(_i(LH)$ and (ii) a RHCP state. For convenience, this information storage layer is denoted as the $((_i, RH, D_m, L_n)$-layer. In contrast, each first information value (e.g. logical '1' value) recorded in the bottom CLC-based information storage layer reflects incident light having (i) a spectral bandwidth of $((( _i, LH, D_m, L_n)$ centered at a characteristic wavelength $(_i(LH)$ and (ii) a LHCP state. This information storage layer is called the $(_i, LH, D_m, L_{n+1})$-layer. Together, the paired CLC layers are fabricated such that characteristic wavelength $(_i(RH)$ ( $(_i(LH)$ and the spectral bandwidth ( ( $((_i, RH, D_m, L_n)$ ( (( $((_i, LH, D_m, L_{n+1})$. Importantly, the characteristic wavelength of the incident laser beam (component), $(_i$, is selected so that it lies within the reflection band of the corresponding paired information storage structure, i.e., $(_i((_i(RH)$ ( $(_i(LH)$. As shown in FIGS. 13B and 13C, the reflectance spectra of each of the planar information storage layers is centered about characteristic wavelength $(_i$. The Table of FIG. 13D sets forth the polarization-state of the detected laser beam while reading each of the illustrative information states at cell locations {a,b,c,d} recorded in the paired information storage structure shown in FIG. 13A. In this illustrative embodiment of the optical storage media hereof, the information storage cells specifically designed to storing particular information values (e.g. logical "1" values) by selectively reflecting from the paired information storage layers $((_i, RH, D_m, L_n)$ and $((_i, LH, D_m, L_n)$, only incident light having particular characteristics, can be fabricated from either different CLC materials, or from the same nematic liquid crystal material with chiral additives of opposite chirality.

Using the above-disclosed teachings, paired CLC-based information storage structures having $((_i, LH, D_m, L_{n+1})$ and $((_i, RH, D_m, L_{n+1})$ information storage layers can be made using commercially available materials. For example, LH-type CLC material with a prespecified characteristic wavelength $(_i$ can be made using LH-type CLCs available from Wacker Chemie GmbH, of Munich, Germany, identified by Wacker Catalogue Numbers CC4039L and CC4070L, each having a characteristic wavelength of 390 nm and 700 nm, respectively. By mixing these cross-linkable CLCs together, a LH-type CLC material can be produced having a characteristic wavelength adjustable between 390 nm to 700 nm. The empirical formula for the production of such LH-type CLC material is given by $(_{i=10000/(1.49+1.15c)}$, where c denotes the concentration of CC4039L in CC4070L. The characteristic wavelength $(_i$ can be finely tuned by adjusting the cross-linking temperature. Similarly, RH CLC material with a prespecified characteristic wavelength $(_i$ can be made using cross-linkable CLCs identified by Wacker Catalogue Numbers CC4039L and CC4039R each having characteristic a wavelength of 390 nm, and Wacker Catalogue Number CC4070L having a characteristic wavelength of 700 nm. By mixing together the RH-type and LH-type CLCs, either a RH-type or a LH-type CLC material can be obtained, depending on the relative concentrations of the two components. For these cross-linkable CLCs, the characteristic wavelength thereof can be finely tuned by adjusting the cross-linking temperature. The above technique is well known and described in greater detail in "Liquid Crystals" (1992) by S. Chandrasekhar, published by Cambridge University Press. Having produced LH and RH CLC materials as described above, CLC optical storage devices can then be made using any one of the storage device manufacturing techniques described hereinafter. For example, according to one such manufacturing technique, the LH-type CLC material can be used to fill in a first microscopic pit pattern formed in one side of optically transparent substrate, whereas the RH-type CLC material can be used to fill in a second microscopic pit pattern formed in the other side of the optically transparent substrate. Once these CLC materials have been applied to the substrate, electric fields, magnetic fields, or mechanical shear forces can be used to align the CLC into a planar (i.e. reflective) state. Thereafter, various types of curing and laminating techniques can be practiced.

Following the teachings set forth in FIG. 6, the paired CLC information storage structure can be stacked in one or more information storage decks in order to increase the information storage capacity of the resulting CLC storage media. Thus with a information storage media having M decks fabricated from CLC material, it is possible to read 2MN information storage layers using only N laser lines (i.e. spectral components). Consequently, this provides the generalized system of the present invention with a 2M-fold increase in information storage capacity over prior art systems.

Figure 14:
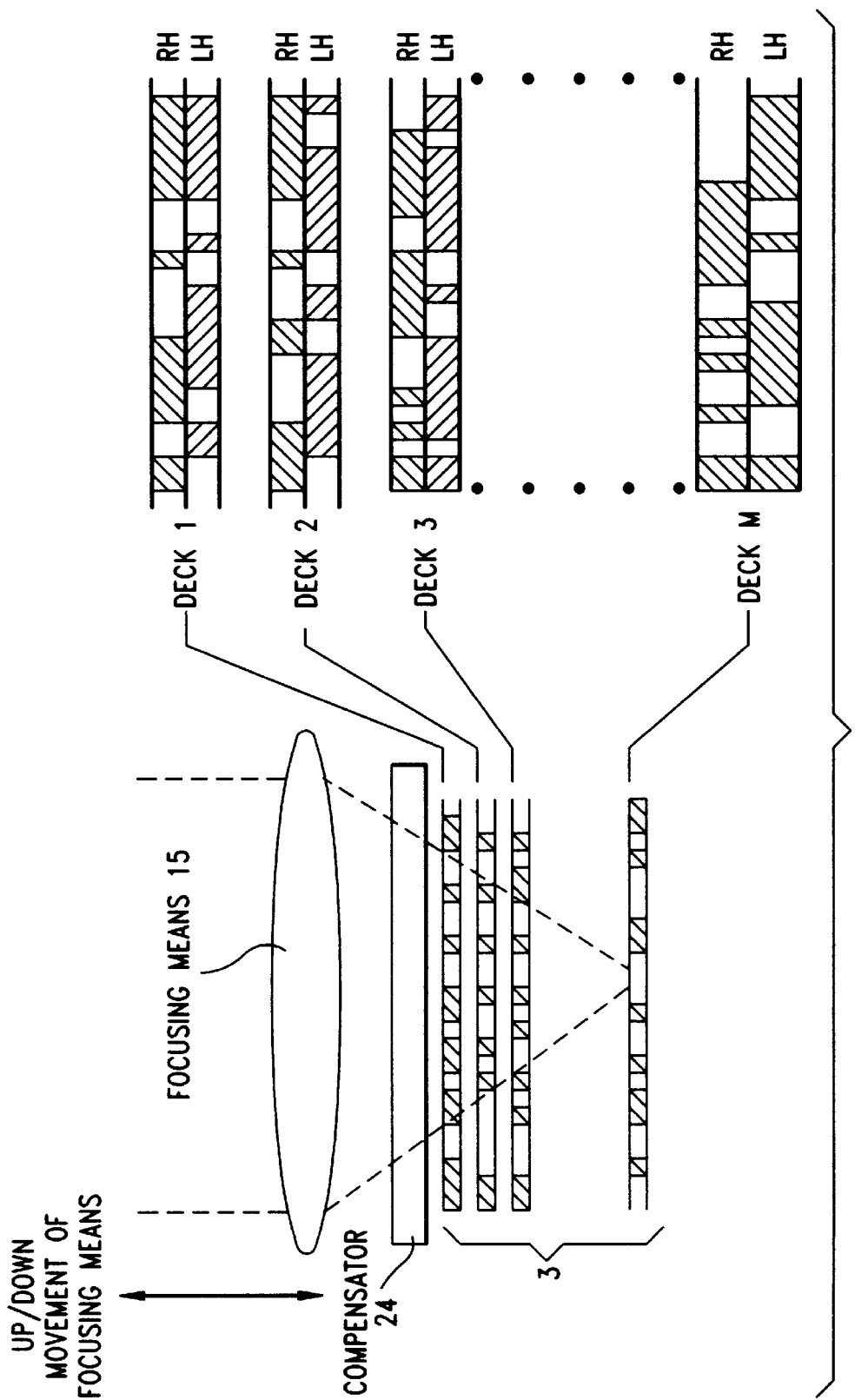
FIG. 14 is a schematic representation of second illustrative embodiment of the information storage system illustrated in FIG. 1, wherein information prerecorded in each one of the pair of wavelength-selective and polarization-selective information storage structures of each i-th information storage layer in the m-th information storage deck of the system, can be read by using a single focused laser beam having a characteristic wavelength ($\lambda_i$ and corresponding polarization state (i.e. LHCP or RHCP), and a mechanism for moving the focused laser beam up or down to a particular information storage deck of the system during information accessing operations.

Referring to FIG. 14, there is shown a decked information storage and retrieval system based on the CLC-based storage media described above. In this illustrative embodiment of the present invention, only a single spectral component is employed to construct each and every information storage deck in this multi-deck system (i.e. N=1) and therefore a single laser with the characteristic wavelength of the CLC material of the optical storage media is required to read out information prerecorded in the 2M information storage layers of the optical storage media of the system. When compared to the conventional technique of stacking semi-reflective surfaces of conventional CD media, the paired CLC storage media of FIG. 14 provides a doubling in storage capacity, other things being equal, namely: the number of stacked layers (i.e., M), the characteristic wavelength of the laser reading beam, and the media form factor. This information storage capacity of the system of FIG. 14 can be greatly increased by simply stacking N paired RH-LH information storage layers within each of the M information storage decks. In such a modified system, N laser lines (i.e., spectral components) will be required to read the 2MN CLC information storage layers in the resulting CLC-based information storage media. Again, when comparing the so modified system of FIG. 14 to the prior art stacked CD storage media, an 2N-fold increase in information capacity is realized.

The CLC storage media described above exploits the wavelength and circular-polarization selective reflection properties of cholesteric liquid crystals which naturally arise from the long-range molecular ordering of organic molecules. However, the optical storage media of the present invention may also be realized using synthetic light reflective coatings (e.g., films) which exhibit a wavelength-dependent circular dichroism similar to CLC material. Such films, for example, can be obtained by vapor deposition on a rotating substrate at an oblique angle, as described in the publication 'Chiral thin solid films: method of deposition and applications', by R. M. A. Azzam, in *Applied Physics Letters*, Vol. 61, 3118(1992). Physically, each birefringent thin-film layer of a few angstroms thick is an analog to a single CLC molecular layer which is also of a few angstroms thick. By rotating the substrate, the optic axis of the deposited birefringent film rotates continuously in the same rotation direction of the substrate. As the deposition accumulated, the optical axis traces a helical pattern along the z-axis. The structural analogy to cholesteric liquid crystal becomes apparent, leading to the similar wavelength and polarization selective reflectance. The chirality, i.e., RHCP and LHCP of the film, is set by the direction of the substrate rotation, which determines the rotation sense of optic axis. The helical pitch P is controlled by the rate of deposition per rotation. The film birefringence (n is controlled by the oblique angle of deposition and the material itself. Similar to the CLCs, the spectral reflectance can be controlled by the number of pitches, where one complete rotation about the optic axis equals one pitch. The wavelength and circular polarization selective reflectivity of this artificial chiral film follows the same formulas for the CLC materials.

Figure 15A:
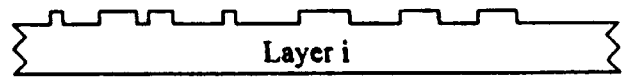
FIGS. 15A to 15D collectively show the sequence of steps carried out by the method of manufacturing multi-decked information storage structures realized using CLC material.
Figure 15B:
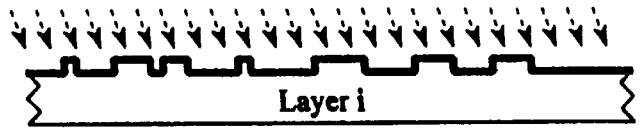
Figure 15C:
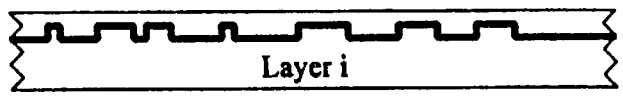
Figure 15D:
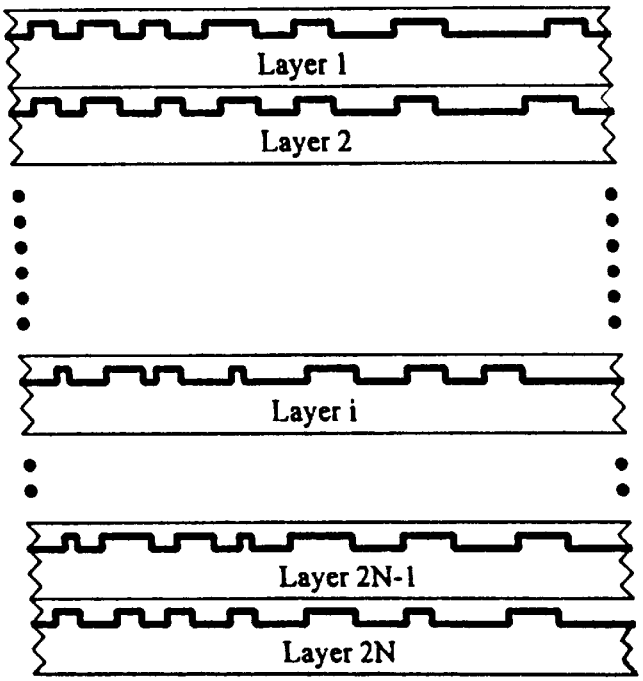

Referring to FIGS. 15A to 15D, a method will be described for fabricating a pre-recorded information storage layer using vacuum-deposited chiral thin-film (e.g. vacuum-deposited inorganic oxide thin film) having wavelength and polarization selective reflectance properties that are applied in optical storage applications of the present invention. As indicated at FIG. 15A, the first step of the method involves producing a stamped disc having a undulated (i.e. pitted) surface similar to conventional CD discs. Notably, the surface undulations encode digital bits of information in a conventional manner. As indicated in FIG. 15B, the next step of the method involves depositing an artificial chiral coating or film over the stamped disk. In accordance with the principles of the present invention, the deposited chiral film reflects either RHCP light or LHCP light at characteristic wavelength ($_i$, depending on the requirements of the information storage layer within the resulting optical media. Thereafter, the layer is coated with an optically transparent material in order to planarize the layer, as shown in FIG. 15C, and thereby produce an information storage layer of the present invention. This coating step can be carried out by applying a polymer to the chiral thin-film coated disc and then spin-coated and allowed to cure. Thereafter, information storage layers produced in the manner described above can be then stacked as shown in FIG. 15D. Following the technical teachings set forth in FIG. 6, multi-deck storage media can be fabricated using the above-described chiral thin-film coatings.

In accordance with the general principles of the present invention, the optical storage media hereof can be constructed using materials exhibits both wavelength and linear-polarization dependent reflection properties. One such way to produce such information storage layers is by constructing multilayer thin-film structures of quarter-wavelength thickness with alternating high and low refractive indices. This embodiment of the present invention will be described in greater detail below with reference to FIG. 16.

Figure 16:
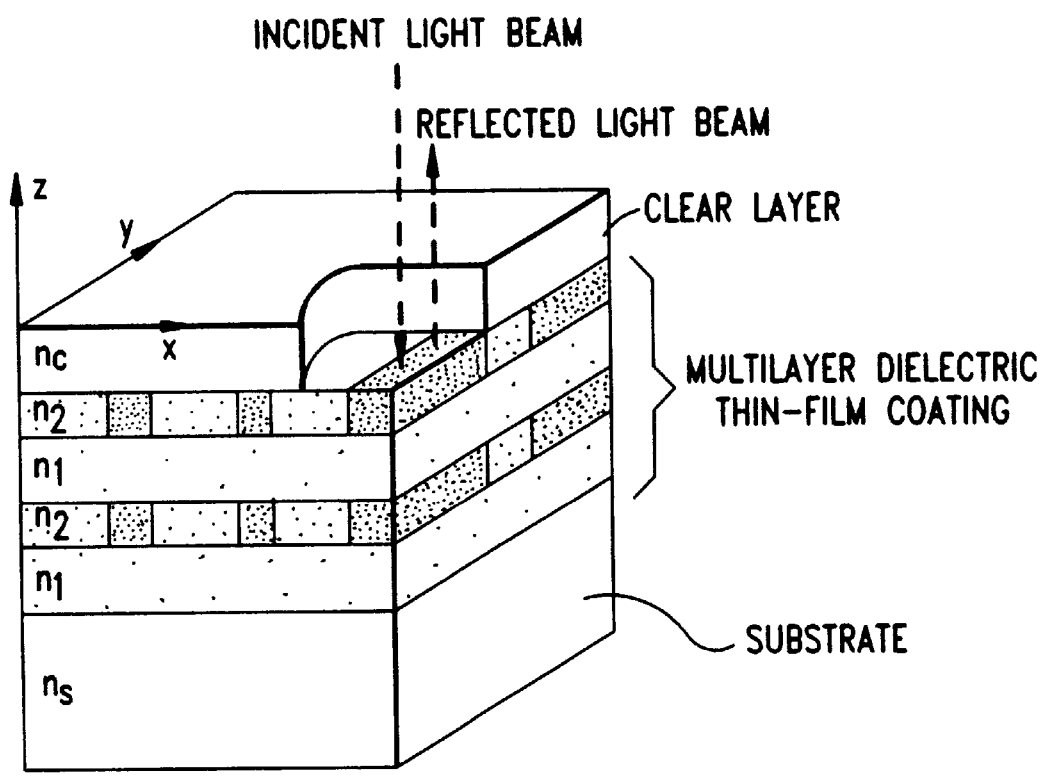
FIG. 16 is a perspective schematic representation of a fifth illustrative embodiment of the pair of wavelength-selective and polarization-selective storage structures according to the present invention which is based on multilayer dielectric thin film material, can be used to construct the optical storage media hereof, and as shown, comprises (i) a first planar information storage layer realized as a first dielectric thin-film layer which reflects incident light having a first linearly polarized state P1 and wavelength ($\lambda_i$ wherever a binary bit '1' is written and transmits incident light wherever a binary bit '0' is written regardless of polarization and wavelength, and (ii) a second planar information storage layer realized as a second dielectric thin-film layer which reflects incident light having a second linearly polarized state $P_2$ (orthogonal to $P_1$) and wavelength ($\lambda_i$ wherever a binary bit '1' is written and transmits incident light wherever a binary bit '0' is written regardless of polarization and wavelength.

In FIG. 16, the fifth illustrative embodiment of the information storage structure hereof is shown. This embodiment is based on stacked multilayer dielectric thin film material, which can be used to construct the optical storage media hereof. Notably, this stacked birefringent multilayer film material (i.e. having a different index of refraction along its x and y axes) exhibits wavelength and linear-polarization selective reflectance properties as hereinbefore described. This is unlike conventional multilayer dielectric mirror coatings which do not exhibit polarization selectivity, due to the fact that each dielectric layer therein is isotropic. As shown in FIG. 16, the multilayer information storage structure comprises: a substrate having a refractive index $n_s$, for mechanical support; first flat information storage layer (($_i$, $P_1$, $D_m$, $L_n$), realized as a first set of dielectric thin-film layers, which reflects incident light having a first linearly polarized state $P_1$ and wavelength ($_i$ wherever a binary bit '1' is written and transmits incident light wherever a binary bit '0' is written regardless of polarization and wavelength; a second flat information storage layer (($_i$ $P_2$, $D_m$, $L_n$), realized as a second set of dielectric thin-film layers, which reflects incident light having a second linearly polarized state $P_2$ (orthogonal to $P_1$) and wavelength ($_i$ wherever a binary bit '1' is written and transmits incident light wherever a binary bit '0' is written regardless of polarization and wavelength; and an optically transparent top layer having a refractive index $n_c$, which functions as a protective dust cover.

In the preferred embodiment of the optical storage media of FIG. 16, the multilayer structure disposed between the substrate and the dust cover consists of k alternating thin-film layers with refractive index n, and birefringent layers with $n_{2x}=n_1$ and $n_{2y}$ which is spatially modulated on a microscopic scale. Light polarized along x-axis transmits freely as the refractive indices are matched. Light polarized along y-axis transmits freely where $n_{2y}=n_1$ (to represent bit '0') and reflects where $n_{2y}$ (n$_1$ (to represent bit '1'). The maximum light reflectance R is for the quarter-wavelength stack ($n_{2y}t_2=n_1t_1=($_i/4$) which is given by $R=\{[n_c/n_s-(n_{2y}/n_1)^{2k}]/[n_c/n_s+(n_{2y}/n_1)]^{2k}\}^2$. Birefringent films can be obtained by exposing dye-doped polymers with linearly polarized light. For example, a large stable (n (0.2 for polyester with azo side groups has been reported in the publication 'Large photoinduced birefringence in an optically nonlinear polyester polymer, by Y. Shi et al. in *Applied Physics Letters*, Vol. 59, 2935 (1991). Designs not based on quarter-wave stacks are described in 'Coatings and filters, by J. A. Dobrowolski in *Handbook of Optics*, W. G. Driscoll and W. Vaughan eds., p8–65, McGraw Hill Book Co., New York, 1978. According to the technical teachings of the present application, this is the $P_2$-storage layer. Using the information storage structure described above, it is possible to construct a multi-decked optical storage media having both wavelength and linear polarization-state dependent reflection properties. While this optical media is preferred in the construction of card and type information storage devices, it can also be used to construct compact disc type devices as well.

Figure 10A:
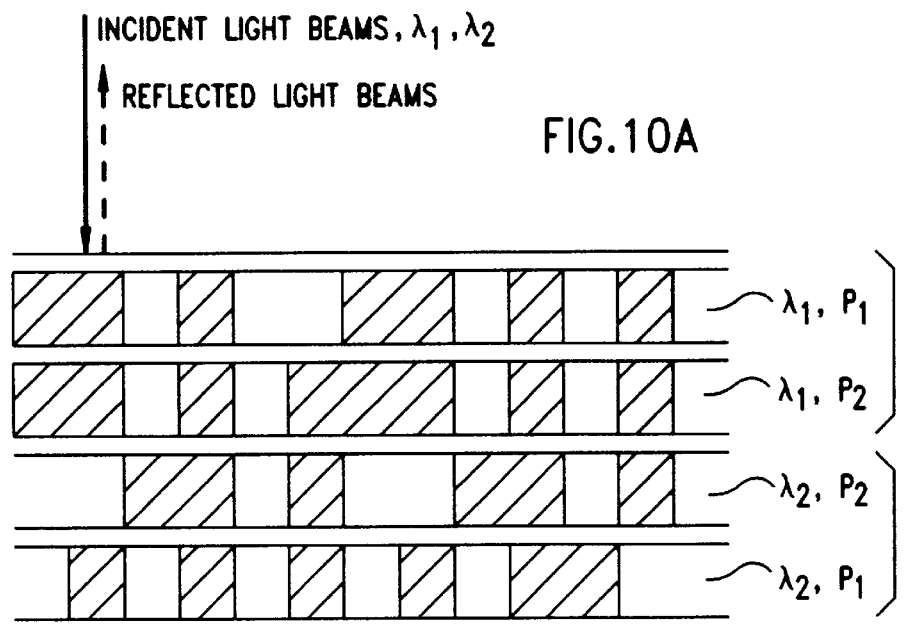
FIG. 10A is a schematic representation of an embodiment of the optical storage media of the present invention, shown constructed from two pairs of wavelength-selective and polarization-selective information storage structures of the present invention, shown above in FIGS. 7A to 9D, and from which prerecorded information tracks on different structures can be simultaneously read using a pair of optical signals having different characteristic wavelengths ($_1$ and ($_2$, respectively, during information reading operations.
Figure 10B:
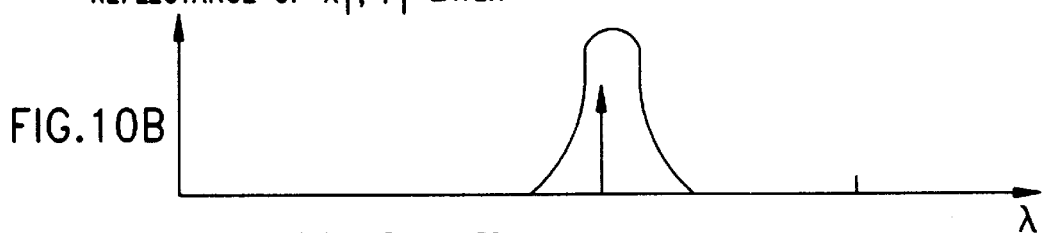
FIGS. 10B, 10C, 10D and 10E set forth a schematic representation of the reflectance spectra of each of the information storage layers shown in FIG. 10A.
Figure 10C:
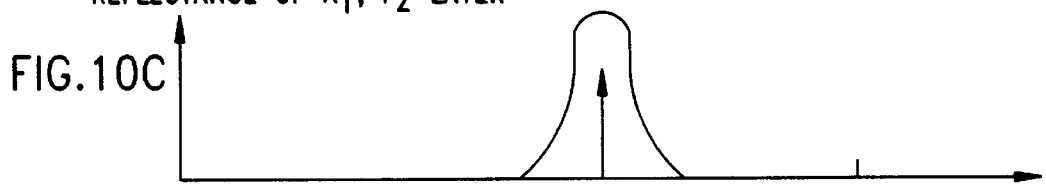
Figure 10D:
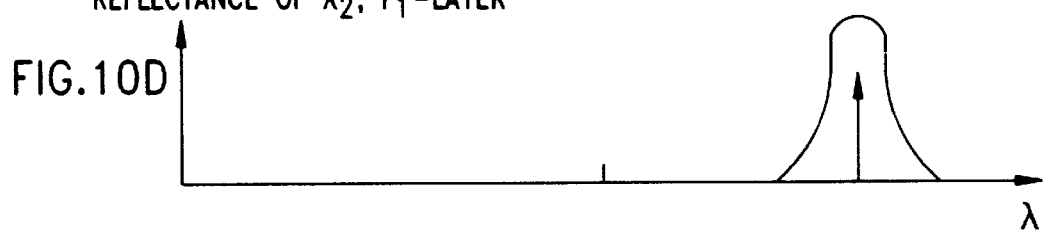
Figure 10E:
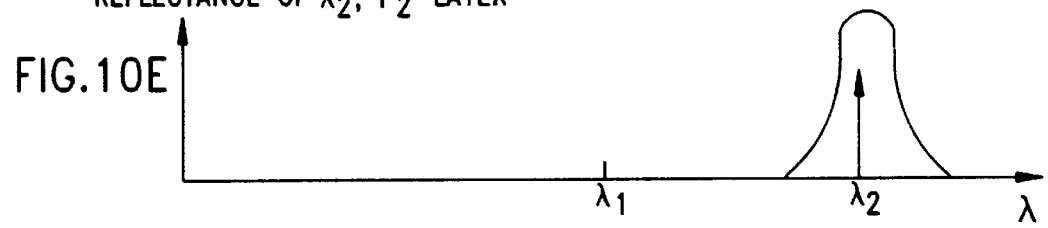

Referring to FIG. 10A, there is shown an information storage and retrieval system which uses optical storage media that permits simultaneous reading of information stored in different information storage layers. As shown, the optical storage media is constructed from two paired information storage structures, having characteristic wavelengths ($\lambda_1$ and $\lambda_2$ and polarization-states $P_1$ and $P_2$, respectively. FIGS. 10B, 10C, 10D and 10E provide a schematic representation of the reflectance spectra of each of the information storage layers shown in FIG. 10A. Using a laser beam having spectral components with characteristic wavelengths ($\lambda_1$ and $\lambda_2$ and polarization states $P_1$ and $P_2$, as indicated in FIGS. 10A, 10B, 10C, 10D and 10E, information stored in each of these paired information storage structures can be simultaneously read during information reading operations.

Following the nomenclature of naming the two-layered $P_1$–$P_2$ structure as discussed above, the (($\lambda_i$, $P_1$, $D_m$, $L_n$)-layer is a layer reflects a $P_1$-polarized light of wavelength ($\lambda_i$ with a bandwidth of (((($\lambda_i$, $P_1$, $D_m$, $L_n$) where bit '1' is written. It is required that (((($\lambda_i$, $P_1$, $D_m$, $L_n$) ( (((($\lambda_i$, $P_2$, $D_m$, $L_{n+1}$) and the output wavelength of readout laser ($\lambda_i$ be within the corresponding reflectance bands for i=1, 2, ..., N. For minimum signal cross-talk between different information storage layers, the reflection bands are not overlapped as illustrated in FIGS. 10B, 10c, 10d and 10E, for the case where N=2.

Figure 11A:
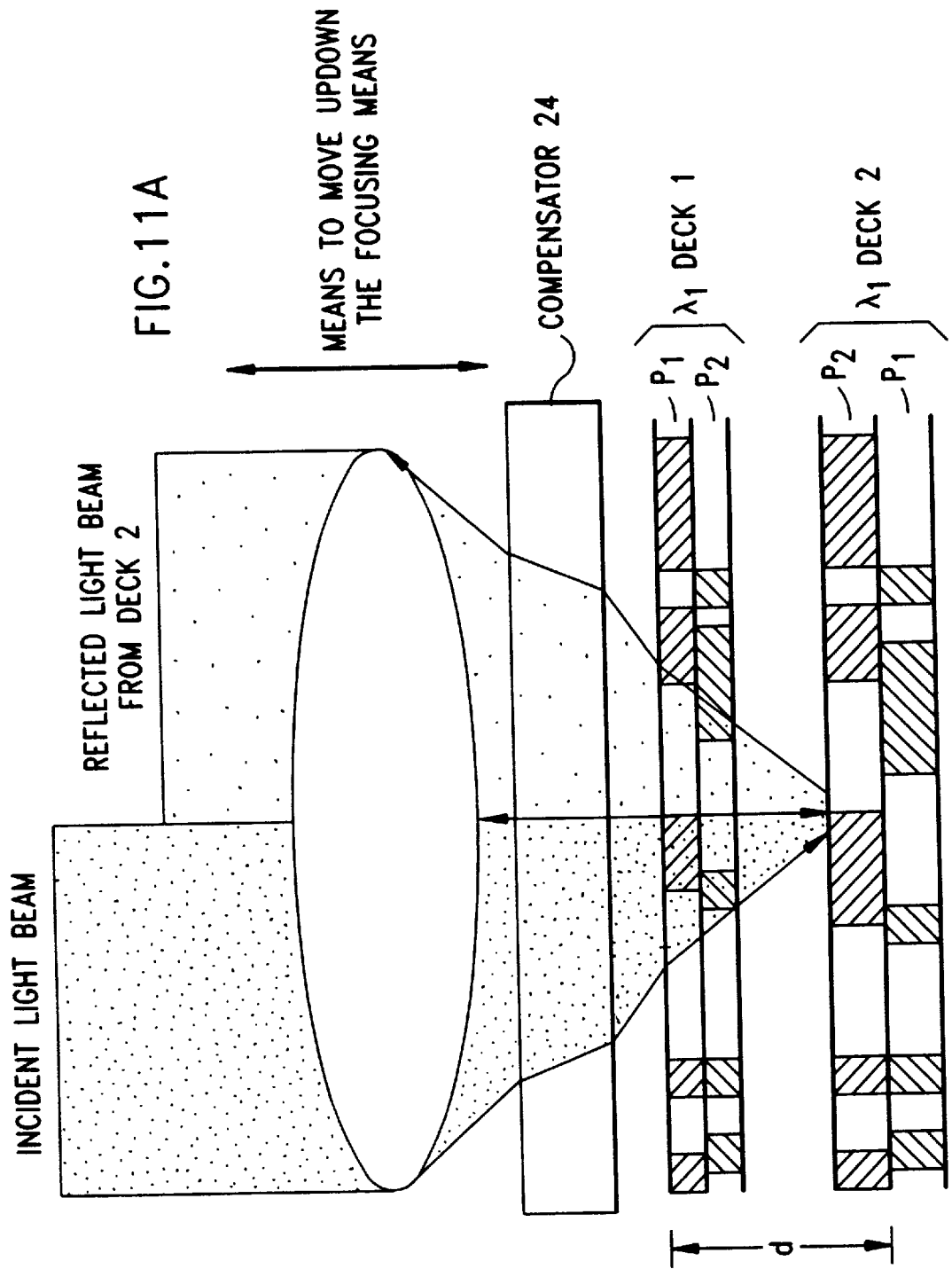
FIG. 11A is a schematic representation of a first illustrative embodiment of the information storage system illustrated in FIG. 1, wherein information prerecorded in each pair of wavelength-selective and polarization-selective information storage structures in each information storage deck of the 2-deck system, can be read during information reading operations using a single focused laser beam having a characteristic wavelength ($_i$.
Figure 11C:
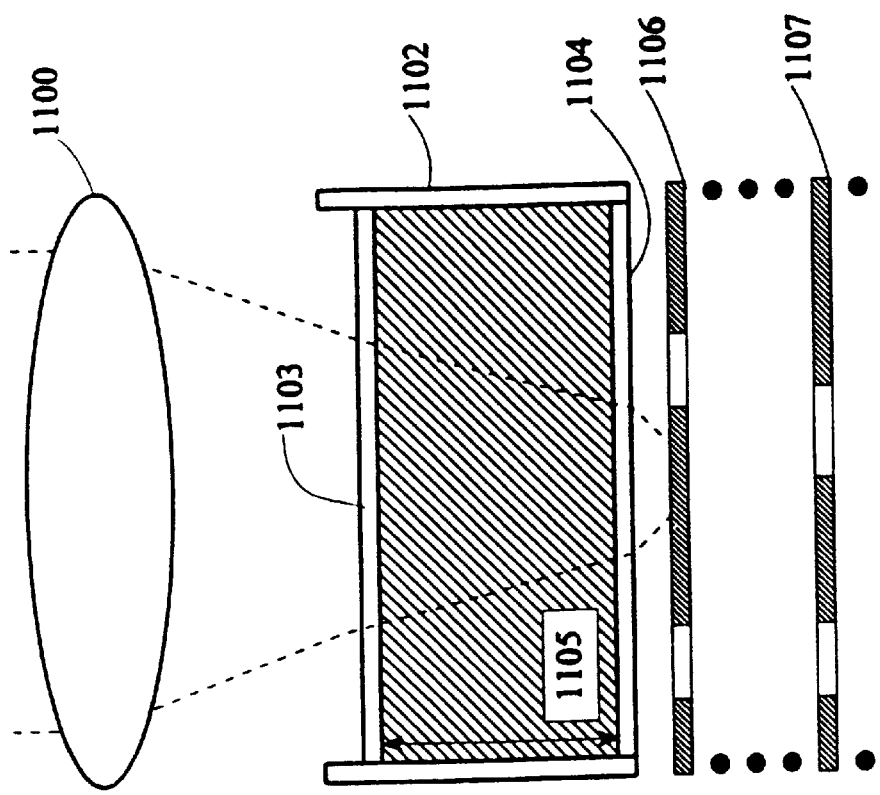
FIG. 11C is a schematic diagram of the spherical aberration compensator within the optical reading pick-up of the present invention shown in a second configuration.
Figure 11B:
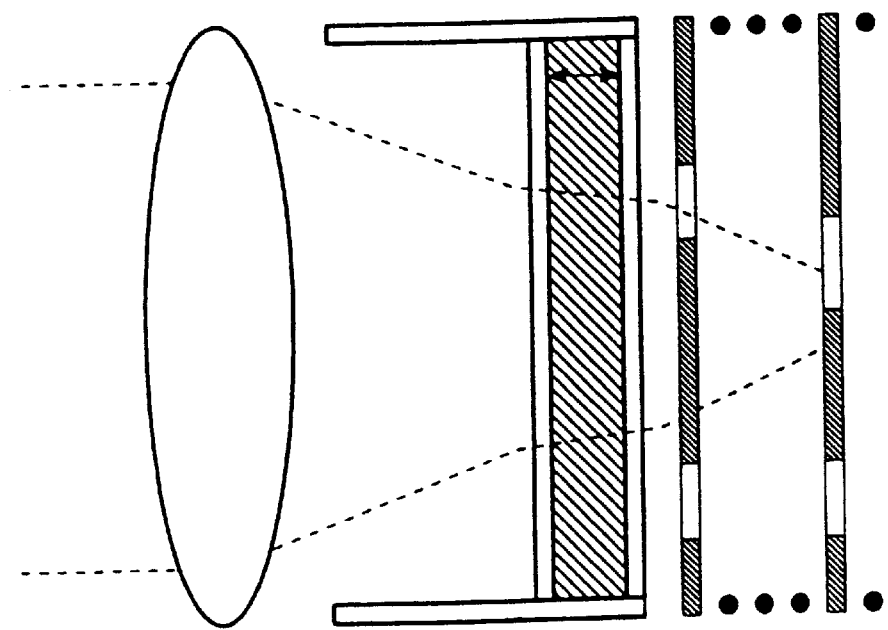
FIG. 11B is a schematic diagram of the spherical aberration compensator within the optical reading pick-up of the present invention shown in a first configuration.

In FIG. 11B, a schematic representation of the simplest form of a decked information storage system (i.e. where M=2) is shown. As illustrated, each information storage deck consists of two paired $P_1$–$P_2$ information storage structures of the type shown in FIGS. 7A, 7B, 7C, 8A, 8B, 8C, 9A, 9B and 9C. In such a system, prerecorded information in each pair of information storage structures can be read using a single focused laser beam having a characteristic wavelength ($\lambda_i$ and a polarization state which corresponds to the characteristic polarization state of the particular layer being read. The advantage of such a system becomes obvious: only one optical pickup with one laser is required to read information from all four information storage layers, thereby increasing the information storage capacity of such a system by a factor of four. The accessing, tracking and focusing of each deck is same as for a single deck system. The focusing objective lens is moved up or down in order to access the particular deck. As will be explained in greater detail, the disk-drive can recognize this type of multi-decked media by special coding on a particular track on the media.

As shown in FIGS. 11B and 11C, the spherical aberration compensator 24 is an optically transmissive plate of variable thickness. It is placed between the focusing means 1101 and the information storage media. The purpose of the spherical aberration compensator 24 is to maintain constant optical distance between the focusing means 15 and the information layer being readout from the optical storage media 3. Without this corrector or compensator, the focused laser beam spot will not be diffraction-limited, due to spherical aberration. Notably, the thickness of the compensator can be adjusted continuously or in discrete steps, according to the location of the information layer. As shown in greater detail in FIG. 1, the thickness control signal is provided by the storage system controller 22. As shown in FIGS. 11B and 11C, the compensator of the illustrative embodiment is realized as a cell 1102 having windows surfaces 1103 and 1104, which are transmissive over the spectral range of the laser beam used during information reading operations. The cell is filled with an optically clear fluid 1105 having an index of refraction typically in the range of 1.4 to 1.7. Notably, it may be advantageous to use a fluid 1105 with a higher index of refraction, as this will allow cell 1102 to be made thinner, as would be desired in many applications. In response to thickness control signals produced by system controller 22, one or both of the window surfaces 1103 and/or 1104 are designed to move up and down like a piston, in order that the thickness of the liquid within in the cell is adjusted such that the optical path length between the focusing means 1100 and particular information layer (i.e., $(nt)_{liquid}+(nt)_{windows}+((nt)_{information\ layers}$ above the particular layer) is kept nearly constant. In FIGS. 11B, the compensator is shown configured for reading out information recorded from the top layer 1106 of a multi-layer optical storage device hereof, whereas in FIG. 11C, the compensator is shown configured for reading out information recorded from lower layer 1107 thereof. By compensating for spherical aberration using this compensation device, the focused beam spot incident upon the information storage layer to be read is diffraction-limited, a requirement for precise reading of high-density information recorded within different information storage layers of the optical storage media hereof.

Figure 12A:
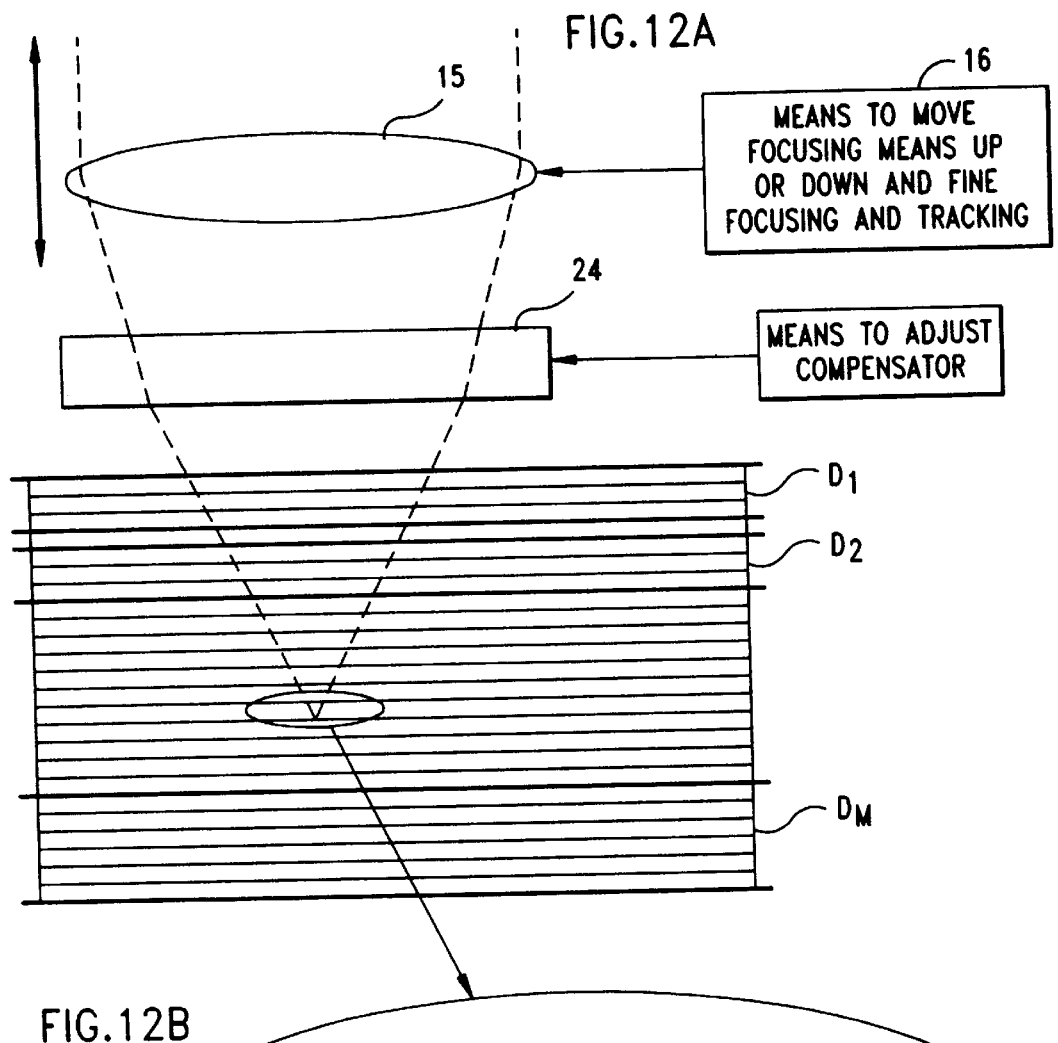
FIGS. 12A and 12B set forth a schematic representation of a second illustrative embodiment of the information storage system illustrated in FIG. 1, wherein information prerecorded in each i-th wavelength-selective and polarization-selective information storage structure in each of the M information storage decks of the system, can be read during information reading operations using (i) a single focused laser beam having a characteristic wavelength ($_i$, (ii) a mechanism for moving the focused laser beam up and down along a particular information storage deck, and (iii) a mechanism for fine-focusing the incident laser beam onto particular wavelength-selective and polarization-selective information storage structure within each information storage deck and tracking the laser beam reflected therefrom.
Figure 12B:
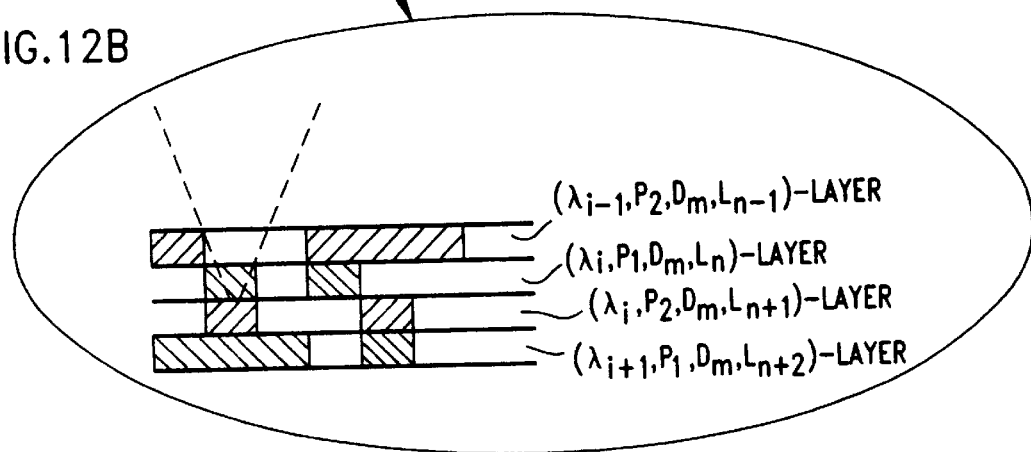

In FIGS. 12A and 12B, a schematic representation of a more complex, multi-decked information storage system is shown, in which M indicates the maximum number of information storage decks and N indicates the maximum number of pairs of information storage layers in an information storage deck. In this system, prerecorded information in each $L_n$-th information storage structure within each $D_m$-th information storage deck can be read using the following system components: (i) a single focused laser beam having a characteristic wavelength ($\lambda_i$ corresponding to the characteristic wavelength of the particular information storage layer being accessed; (ii) an adjustable mechanism for moving the focused laser beam up and down along a particular information storage deck being read; and (iii) an adjustable mechanism for fine-focusing the incident laser beam onto particular the information storage layer within a particular information storage deck, and thereafter tracking the same during the information reading operation.

A preferred design for the multi-deck storage system of FIGS. 12A and 12B requires that the reflectance $R_m$ for deck $D_m$ satisfy the following expression: $R_1$ ( $(1-R_1)^2 R_2$ ( $(1-R_1)^2(1-R_2)^2$( ... $((1-R_{M-1})^2 R_M$, for m=1, 2, ..., M. In this illustrative embodiment, it is assumed that the transmission coefficient $T_m=1-R_m$. For those skilled, this condition can be modified accordingly if there are transmission losses. In such instances, it is clear that $R_1 < R_2 < ... R_{M-1} < R_M < 1$ and $R_1 < 1/M$. For purposes of illustration, consider the case of a five deck system where M=5. According to the above-defined design criteria, $R_1$ (12% (first/top deck), $R_2$ (16% (second deck), $R_3$ (23% (third deck), $R_4$ (38% (fourth deck) and $R_5$ (fifth/bottom deck) 100%. Following such design criteria, the intensity of the reflected laser beam from each deck will be about 12% of the intensity of the incident laser beam. By following the above design criteria for layer-reflectance will assure that the signals received by the photodetector from each deck in the system are approximately equal. Notably, the reflectance coefficients (i.e. $R_m$) can also be chosen so that the signal-to-noise ratio (SNR) for each deck is above the minimum level required to achieve a given bit error rate. As the reflected signal strength decreases rapidly with increasing values of M, limits are naturally set on the value of SNR that can be obtained for any particular system design. When using signal detection techniques commonly used in conventional CD-ROMs reading units, systems having five decks (i.e. M=5) can be easily achieved. With improved signal detection techniques, systems with greater than five information storage decks should also be realizable.

When designing multi-deck information storage systems according to the present invention, a number of factors, such as cross-deck noise and the working distance of the laser beam focusing optics, present restrictions on the number of information storage decks that can be practically realized in any particular information storage and retrieval system.

During information reading operations, "cross-deck noise" is created by the reflection of laser light from the layers within other information storage decks in the optical storage device. A number of techniques may be employed to adequately reduce the effect of cross-deck noise. One technique involves increasing the optical distance between information storage layers in next-neighbor decks, having the same characteristic wavelength ($_i$ and polarization-state $P_j$. Another technique involves ensuring that the optical distance between the substrate, interlayers and superstrate (i.e. $d_i$) is 100 times greater than the depth of focus of the laser beam detection optics. For a moderate number of information storage layers (i.e. N), the deck thickness can be greater than the depth of focus. Another technique for minimizing cross-deck noise involves selecting distance $d_i$ to be a random value, not a multiple of ($_i$/2.

The working distance of the focusing objective lens of the laser detection (i.e. pick-up) optics imposes another restriction on the number of decks through which the laser beam can read. The working distance can be increased by using a larger lens aperture, i.e., diameter, for a given Number Aperture (N.A). However, practical limits will be set by the physical limitations of available technology. For example, when using the actuators of conventional CD-ROM drives for tracking and auto-focusing, constraints will be naturally imposed on both the physical size and mass of the focusing objective lens of the laser beam focusing/detection (i.e. pick-up) optics. Consequently, the working distance of the laser beam focusing/detection optics will be constrained by such factors.

Having described the wavelength and polarization-state dependent storage structures of the present invention, it is appropriate at this juncture to now describe in greater detail the laser focusing/detection subsystem (i.e. pick-up optics) schematically represented in FIG. 1 and described generally hereinabove.

In general, there are two preferred techniques for reading information from the optical storage media hereof using precharacterized laser beams. The first technique, illustrated in FIG. 17, controls the polarization-state of the spectral components of the laser beam as it is focused incident on the optical storage media, and shall be referred to hereinafter as a "type-1" optical pick-up. The second technique, illustrated in FIG. 20, controls the polarization-state of the spectral components of the reflected laser beam received by the photodetector, and shall be referred to hereinafter as a "type-2" optical pick-up. Notably, each of these optical pick-up subsystems is based on non-retroreflective design principles in order to prevent optical feedback to the laser diodes. One disadvantage of such an optical design is that the aperture of the focusing objective lens in the optical pick-up is not fully utilized.

Figure 17A:
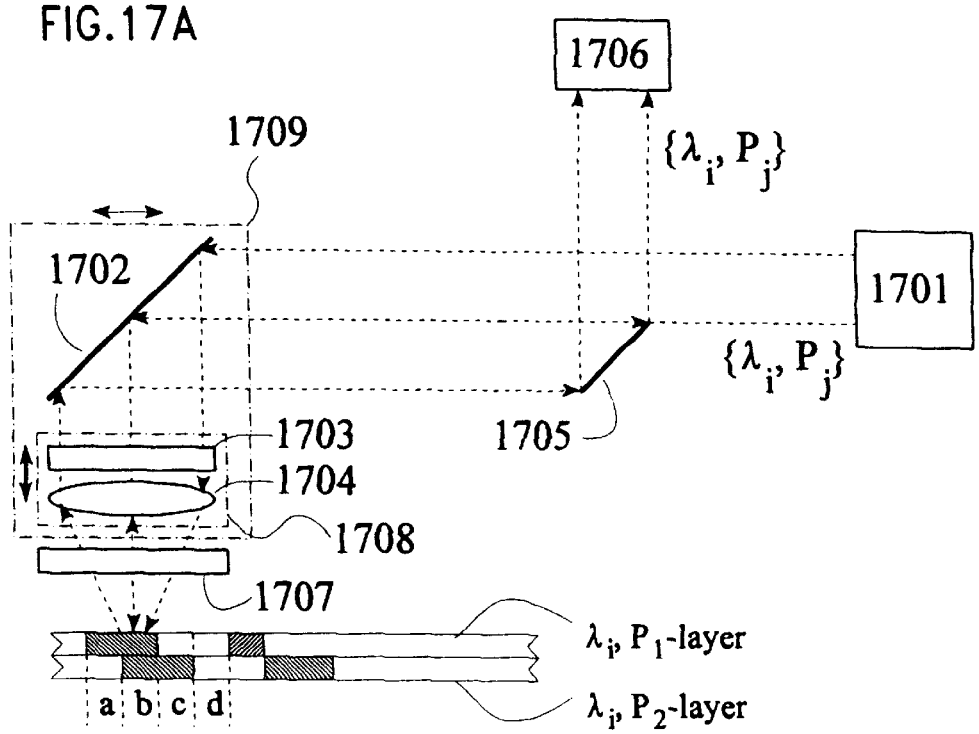
FIGS. 17A is a schematic diagram of a type-1 optical pick-up which controls the polarization state of the spectral components of the incident laser beam focused onto the optical storage media during information reading operations.

As shown in FIG. 17A, the type-1 optical pick-up subsystem comprises an assembly of components, namely: a laser beam producing unit 1701 for producing a collimated and circularized laser beam having one or more spectral components (i.e. lines) with characteristic wavelengths and polarization-states specified by the media access controller; a pair of beam-steering mirrors 1702 and 1705, for steering the produced laser beam after it has been collimated and circularized; a light diffractive phase-grating 1703 for diffracting the incident laser beam into three light beams (i.e. 0-th, +1st, and −1st order diffractive beams) for use in beam tracking, wherein the light diffractive efficiency of the grating over the 2nd and higher orders is minimized to conserve laser power; a focusing objective lens 1704 for focusing the collimated laser beam as it is directed incident to the optical storage media hereof; a first ultra-compact housing 1708 within which phase-grating 1703 and objective lens 1704 are mounted (i.e. enclosed) and which is moveable up and down under servo-control for fine focusing of the incident laser beam during information reading operations; a second ultra-compact housing 1709 with which beam-steering mirror 1702 and ultra-compact housing 1708 are mounted and which is radially translatable (i.e. moved) under servo-control for controlling the tracking of the incident laser beam during information reading operations; a spherical aberration compensator (i.e. corrector) 1707, as disclosed in FIGS. 11B and 11C; and an array of photodetectors 1706 for detecting the different narrow bands of spectral components of the laser beam as they reflect off corresponding information storage layers in the optical storage media during information reading operations.

In the illustrative embodiment(s), each information storage and retrieval system has two independent servo-control mechanisms. The function of the first servo-control system is to control the movement of (i) the phase grating 1703 and objective lens 1704, for the purpose of auto-focusing the incident laser beam onto a specified information storage layer. The function of the second servo-control mechanism is to control the movement of the (ii) the assembly of the phase grating 1703, objective lens 1704, beam steering mirror 1702, and spherical aberration compensator 1707 relative to the information storage media, for the purpose of controlling the incident laser along a specified information track. The first servo-mechanism can employ a voice coil in order to effect micro-movements required to control the location of the incident laser beam along an information track during information reading operations. The second servo-mechanism can use another voice-coil or a lead screw in order to effect larger movements required for controlling the movement of the incident laser beam from one information recording track to another on the optical storage disc of the present invention, as shown in FIG. 171. While voice coils are presently the most popular translational actuator used in such servo-control applications, it is understood that other actuators, based on piezoelectric principles, can also be used to practice the present invention.

Figure 17B:
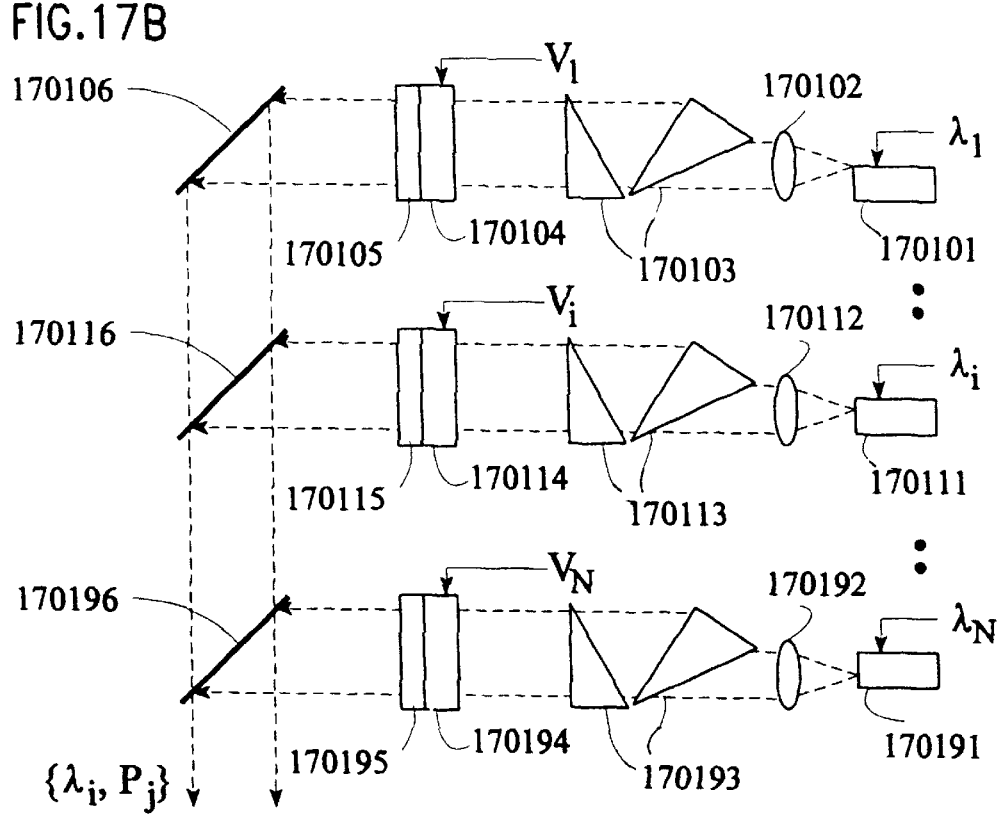
FIG. 17B is a schematic diagram of an optical subsystem that can be used with the optical pick-up of FIG. 17A, to control the polarization state of the spectral components of the incident laser beam used during information reading operations.

In FIG. 17B, the subcomponents of the laser beam producing unit are shown in greater detail. As shown, the laser beam producing unit 1701 comprises: an array of lasers, e.g. lasers 170101, 170111 and 170191, for producing spectral components with characteristic output wavelengths ($_1$, ($_i$, and ($_N$, respectively, and a predetermined polarization state (e.g. linear polarization state); an array of collimating lenses, 170102, 170112, and 170192, for collimating the spectral output of lasers 170101, 170111 and 170191, respectively; an array of anamorphic prisms, 170103, 170113 and 170193, for circularizing the spectral output from collimating lenses, 170102, 170112, and 170192, respectively; an array of quarter-wave (( /4) plates 170104, 170114 and 170194, for converting the linear polarized spectral components into, for example, RHCP spectral components; an array of voltage-controlled half-wave (( /2) retardation plates 170105, 170115 and 170195, for converting RHCP spectral components into LHCP spectral components; and an array of dichroic mirrors 170101, 170116 and 17096, respectively, for combining the polarized spectral components into a single composite laser beam, which has been precharacterized for reading particular information storage layers having characteristic wavelengths and polarization-states which correspond to the wavelengths and polarization-states of the spectral components of the incident composite laser beam.

Having described the type-1 optical pick-up of the illustrative embodiment, a number of modifications readily come to mind. For example, the lenses and prisms of the collimating and circularizing optics in the above-described optical pick-up can be replaced by a pair of cylindrical lenses of different focal lengths for collimating and circularizing output spectral components produced from the array of laser diodes. Also, instead of using the combination of the ($/4$-plate and the voltage-controlled ($/2$-plate, a voltage-controlled ($/4$-3($/4$ phase-retardation plate can also be used in order to change linearly polarized spectral components into RHCP or LHCP spectral components. In addition, instead of using an array of mirrors, a diffraction grating or a prism may be used to combine the polarized spectral components into a single composite laser beam.

Preferably, the ($/4$-plates of the type-1 optical pick-up described above are made from of birefringent crystals (e.g. quartz, sapphire, calcite), muscovite mica, polymers (e.g. Polaroid polyvinyl alcohol PVA, DuPont polyethylene terephthalate PET), or liquid crystal film. The voltage-controlled ($/2$- and ($/4$-3(14 phase retardation plates can be made from nematic liquid crystal. Suitable fabrication techniques for such electro-optical components are described in U.S. Pat. No. 4,670,744 to Buzak, and, U.S. Pat. No. 4,719,507 to Bos, both incorporated herein by reference. Either a DC or square AC voltage with a frequency beyond the response characteristics of the liquid crystal retarder can be used. Although high-speed phase-retarders with nanosecond response time are commercially available, there is no apparent advantage to using such devices, due inherently slow nature of the mechanical tracking and focusing mechanisms used in the optical pick-up.

Figure 17C:
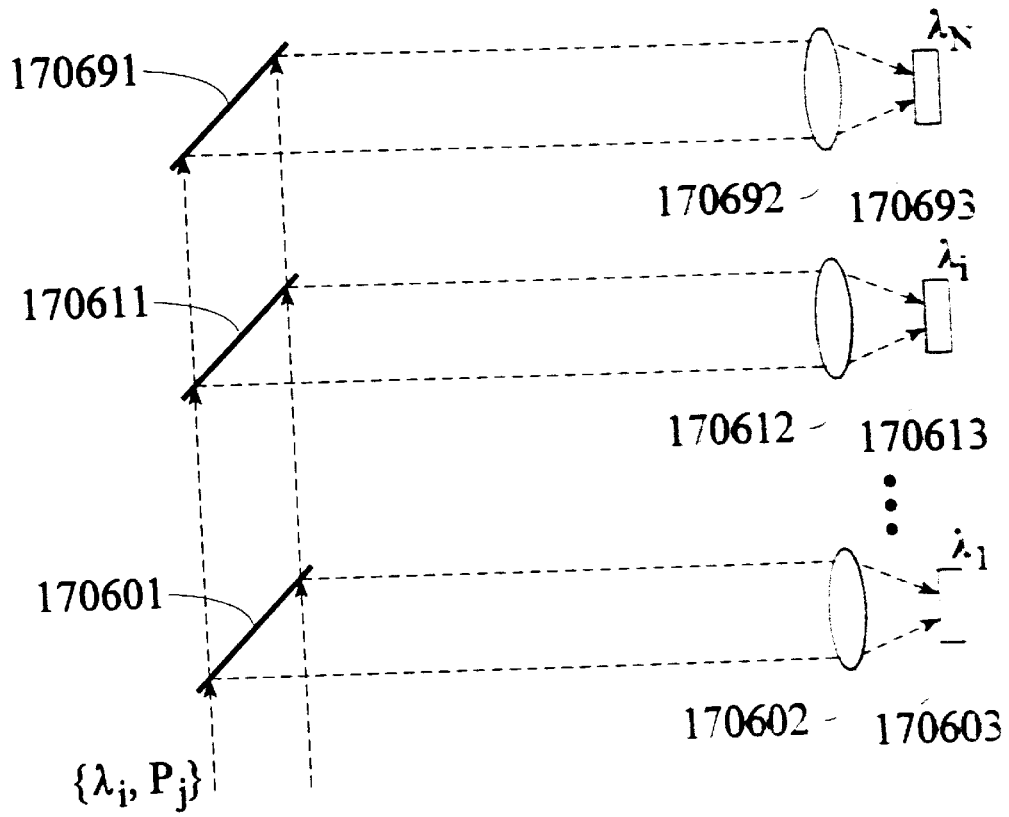
FIGS. 17C is a schematic diagram of another type of optical pick-up in which only spectral components transmitted through the optical storage media hereof are detected during information reading operations.
Figure 17D:
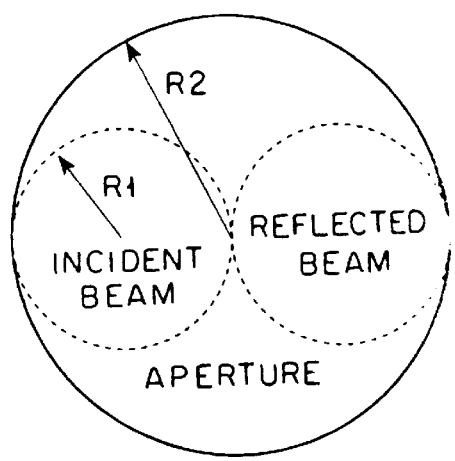
FIG. 17D is a schematic diagram of an optical subsystem that can be used with the optical pick-up of FIG. 17C, to control the polarization state of the spectral components of the incident laser beam used during information reading operations.
Figure 17E:
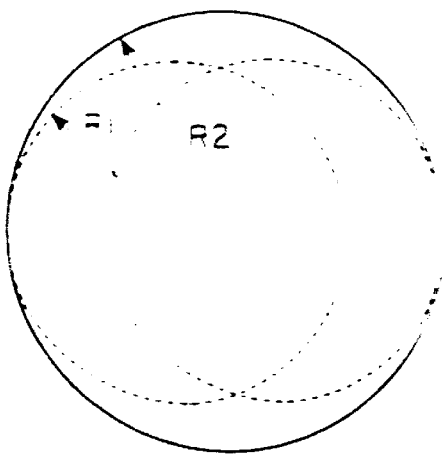
FIG. 17E is a schematic diagram of an optical subsystem that can be used with the subsystem of FIG. 17A, to detect the reflected spectral components along isolated optical channels.

Referring to FIG. 17E, the photodetection unit 1706 of the type-1 optical pick-up will now be described in greater detail. As shown, the photodetection unit comprises: an array of detectors 170601, 170611 and 170691, realized as an array of dichroic mirrors, for detecting, separating and directing along separate optical channels, the reflected optical signal components (i.e. reflected spectral components) of the reflected laser beam, characterized by wavelengths ($_1$, ($_i$, and ($_N$, respectively; and array of astigmatic lenses 170602, 170612, and 170692, each being disposed along an isolated optical channel, and focusing the individual spectral component to a focal point; and an array of multi-functional (i.e. quadrant-type) photodetectors 170603, 170613 and 170693, disposed at the focal points of astigmatic lenses 170602, 170612, and 170692, respectively, for detecting the intensity of each of the reflected spectral components.

The operation of the type-1 optical pick-up (i.e. head) will be described below. For purposes of illustration, it will be assumed that information is stored within the multilayered optical storage media of FIG. 11.

During an information reading operation, the media access controller specifies the wavelengths and polarization states of the spectral components of the laser beam required to read information from a specified information layer in a multi-layered/decked storage media of the present invention. In the illustrative embodiment of FIG. 17A, polarization of produced spectral components is achieved by electronically controlling the voltages provided to voltage-controlled half-wave (($/2$) retardation plates 170105, 170115 and 170195 during the information reading process. For example, when no voltage (i.e. $V_i=0$) is applied to any particular half-wave (($/2$) retardation plate (e.g. 170105, 170115 or 170195), the polarization-state of the spectral component passing therethrough does not change from its originally imparted polarization state. However, when a sufficient non-zero voltage $V_i$ is applied to any particular voltage-controlled ($/2$-plate, it changes the polarization-state of the spectral component ($_i$ passing therethrough from its originally imparted polarization state $P_1$ (e.g. from $P_1$ to $P_2$, or from LHCP-state to RHCP-state or vice versa). In the case of optical storage media having linear polarization-selective properties, each spectral component in the incident laser beam will have a linear polarization-state prespecified by the media access controller, and each information storage layer in the optical storage media corresponding will have a linear characteristic polarization-state. In such an illustrative embodiment, the function of each "activated" voltage-controlled half-wave (($/2$) retardation plate is to change the characteristic polarization-state of its input spectral component to the characteristic polarization state of its corresponding information storage layer from which prerecorded information is to be read. Consequently, the use of the ($/4$-phase retardation plate is not required.

The polarization state of each spectral component in the composite laser beam is selectively controlled in the above-described manner. After all of the specified spectral components have been simultaneously polarized in accordance with media access controller specifications, the polarized spectral components are combined into a single composite laser beam, and then, in the case of a multi-decked system, the laser beam is focused into the information storage deck specified by the media access controller. As the spectral component of the laser beam with characteristic wavelength and polarization state (($_i$, $P_2$) falls incident on the information storage layer-(($_i$,$P_1$), it is transmitted directly therethrough; then when this spectral component (($_i$, $P_2$) falls incident on the information storage layer-(($_i$, $P_2$), it is intensity modulated thereby and reflects back towards the optical reading head where the modulated spectral component is isolated from all other spectral components, detected and processed in a manner described above, to recover the bit stream (e.g. 11001111 . . . ) recorded in the accessed layer.

Notably, during the information reading process, the focusing of each incident spectral component (($_i$, $P_2$) and the tracking of the same as it reflects off the (($_i$, $P_2$) information storage layer can be carried out using servo-control techniques. Advantageously, because the error signal for servo-control is derived from the shape of the laser beam, and not its polarization-state, laser beam focusing and tracking can be carried out in the present invention using highly-developed beam focusing and tracking techniques used in conventional CD ROM drives to focus and track linearly polarized beams. These techniques will be described in detail hereinafter.

In the optical subsystem of FIG. 17A, only about half of the aperture of the objective focusing lens is used to focus the incident laser beam onto the optical storage medium, whereas the remaining portion of the aperture of the objective focusing lens is used to focus the reflected laser beam onto the detector. In many applications, it will be desired to use the full aperture of the focusing objective lens in order to focus both the incident and reflected laser beams during information reading operations. Below will be described several ways in which to achieve a greater utilization of the aperture of the objective focusing lens.

Figure 17F:
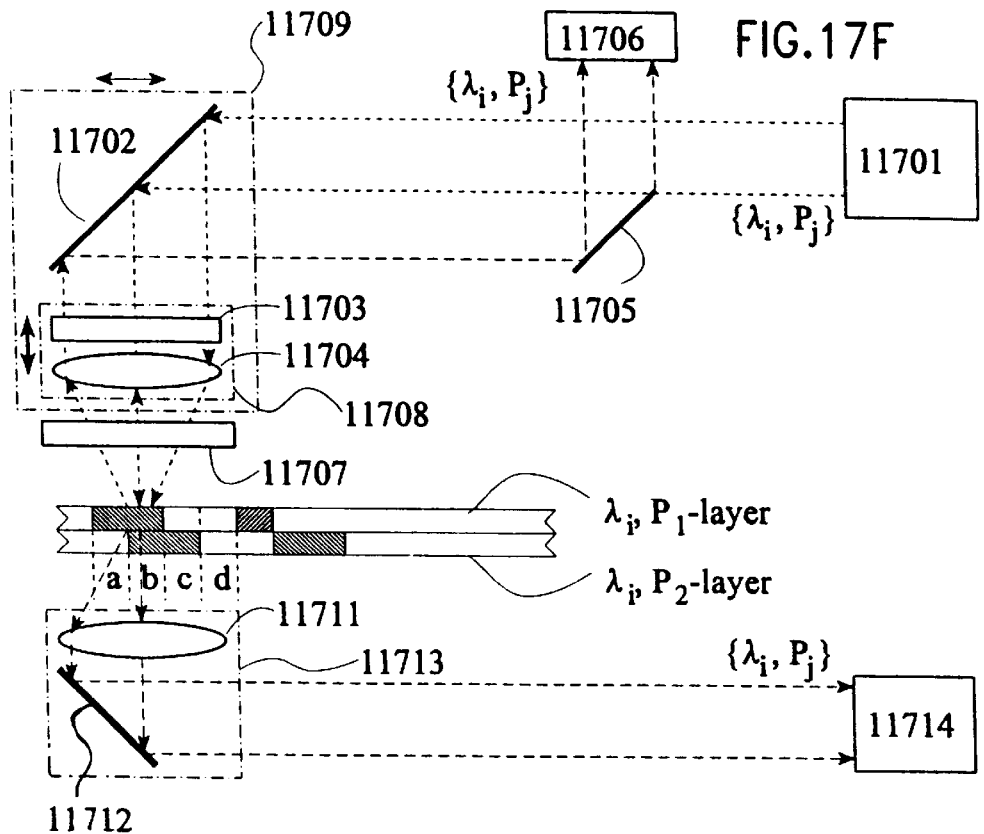
FIG. 17F is a schematic diagram of the aperture of a focusing objective lens used in an optical pick-up of the present invention, in which the incident and reflected laser beams are not allowed to spatially overlap.
Figure 17G:
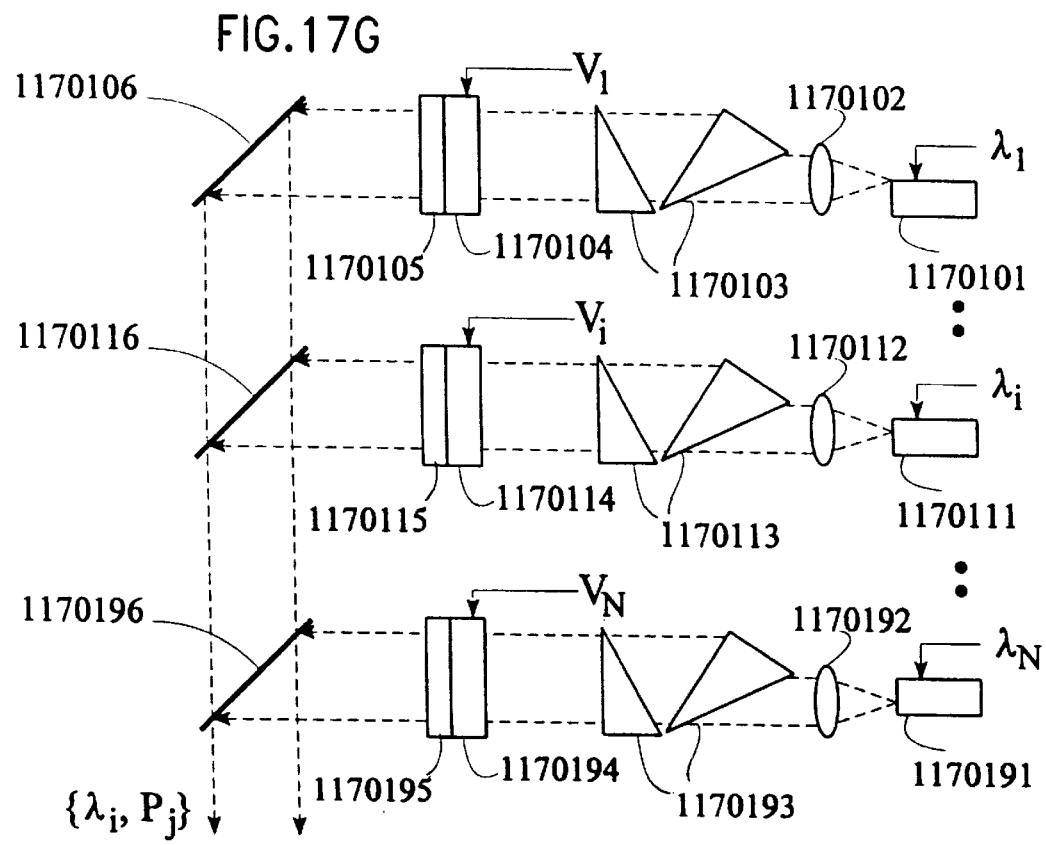
FIG. 17G is a schematic diagram of the aperture of the focusing objective lens used in an optical pick-up of the present invention, in which the incident and reflected laser beams are allowed to spatially overlap using retro-reflective principles.

As shown in FIGS. 17F and 17G, the aperture of the objective focusing lens is indicated by big solid circle, whereas the incident and reflected beams by dotted circles. While the light collection efficiency of a lens is usually reduced gradually from its center, aperture utilization can be visualized (i.e. to a first-order approximation) as the percentage area of the aperture that is covered. Thus, for arrangements with spatially separated beams, as illustrated in FIG. 17F1, only $(R_1/R_2)/2=(1/2)/2=25\%$ of the aperture is used. While it is impossible in practice to use 100% of the lens aperture, a "reentrant" or "retro-reflective" optical subsystem design will permit utilization of about 85–98% of the objective lens aperture. As shown in FIG. 17F2, this is generally achieved by allowing the optical path of the reflected laser beam to retrace the optical path of the incident (i.e. incoming) laser beam. In order to achieve this in practice, a Faraday isolator is employed along the overlapping optical path so that the aperture can be completely used (i.e. 100% utilization). In this case, shown in FIG. 17F2, the dotted circles representative of the incident and reflected beams are overlapped. If small mirror is placed at the focused spot of the reflected beam, which has a size is only few microns, then the light beam can almost fill the aperture (i.e., approach 100% utilization of the aperture). Below, two retro-reflective techniques are applied in the design of optical reading pick-ups (of either type-1 or type-2) in order to improve aperture utilization thereof.

Figure 18:
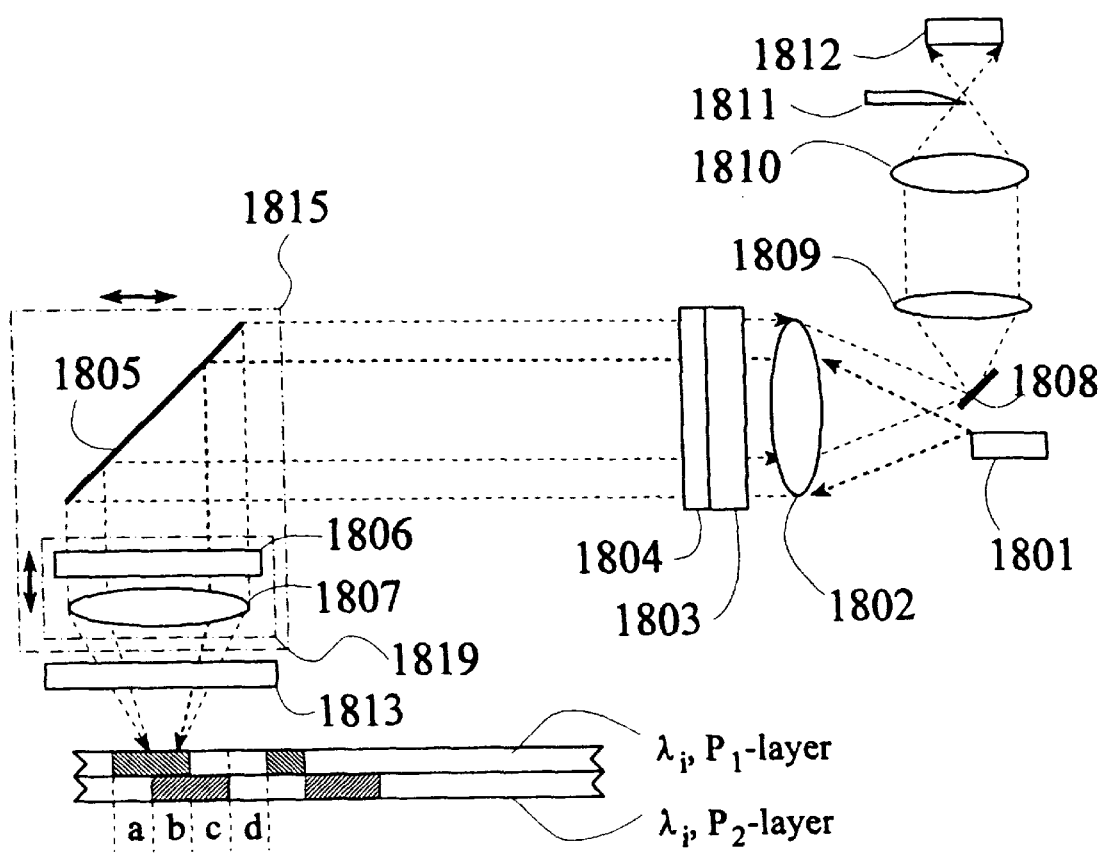
FIG. 18 is a schematic diagram of an optical pick-up which permits the use of a light focusing objective lens having a larger aperture, and which uses a knife-edge technique for laser beam auto-focusing.

As shown in FIG. 18, improvement in the aperture of the optical reading head can be achieved by simply moving the beam-steering mirror to a position between the laser source and beam collimating and circularizing optics. As shown, the optical reading head of this alternative embodiment comprises: a laser array 1801 for producing a laser beam having a characteristic wavelength; beam-shaping (i.e. collimating and circularizing) optics 1802 for collimating and circularizing the laser beam; a quarter-wave (($/4$) plate 1803 for imparting quarter-wave phase retardation to the laser beam; a voltage-controlled half-wave plate 1804 for imparting half-wave (($/2$) phase retardation to the laser beam, so that it is imparted with the characteristic polarization-state specified by the media access controller; a first beam-steering mirror 1805, for steering the polarized laser beam along the reading axis; a phase-grating 1806 for splitting (i.e. diffracting) the laser beam into three different laser for use in tracking, as described hereinabove; a focusing objective lens 1807 for focusing the laser beam onto a preselected information storage layer in the optical storage media having a corresponding characteristic wavelength and polarization-state, and thence for focusing the reflected laser beam back through plate 1804 and 1803 and lens 1803; a first ultra-compact housing 1814 within which phase-grating 1806 and objective lens 1807 are mounted (i.e. enclosed) and which is moveable up and down under servo-control for fine focusing of the incident laser beam during information reading operations; a second ultra-compact housing 1815 with which beam-steering mirror 1805 and ultra-compact housing 1814 are mounted and which is radially translatable (i.e. moved) under servo-control for controlling the tracking of the incident laser beam during information storage operations; a spherical aberration compensator (i.e. corrector) 1813, as disclosed, for example, in FIGS. 11B and 11C; a second beam steering mirror 1808 for steering the reflected laser beam along a light detection optical path; a relay lens 1809 disposed along the light detection optical path, for collimating the reflected laser beam; a spherical lens 1810 disposed along the light detection optical path, for focusing the laser beam; a knife-edge 1811 disposed at the focal plane of a spherical lens 1810, near it focal spot; a dual-photodetection arrangement 1812A centrally disposed along the light detection optical path, between dual-photodetectors 1812B and 1812C, for converting the reflected laser beam into two corresponding electrical analog signals A and B (i.e. Data Signals), for (i) conditioning (e.g. summing A+B) and thereafter digitizing to produce a digital data signal, and (ii) detecting the "in-focus" condition of the incident laser beam during information reading operations, in a manner which will be described in detail hereinafter; and a dual photodetection structure 1812B and 1812C disposed along the light detection optical path (i.e. created by a beam-splitter, not shown), and about dual-photodetector 1812A, for converting the reflected laser beam into a corresponding electrical signal, and detecting the "on-track" condition of the incident laser beam during reading operations. In this alternative embodiment, polarization control is carried out upon the laser beam prior to its incidence upon the optical storage media.

Figure 19:
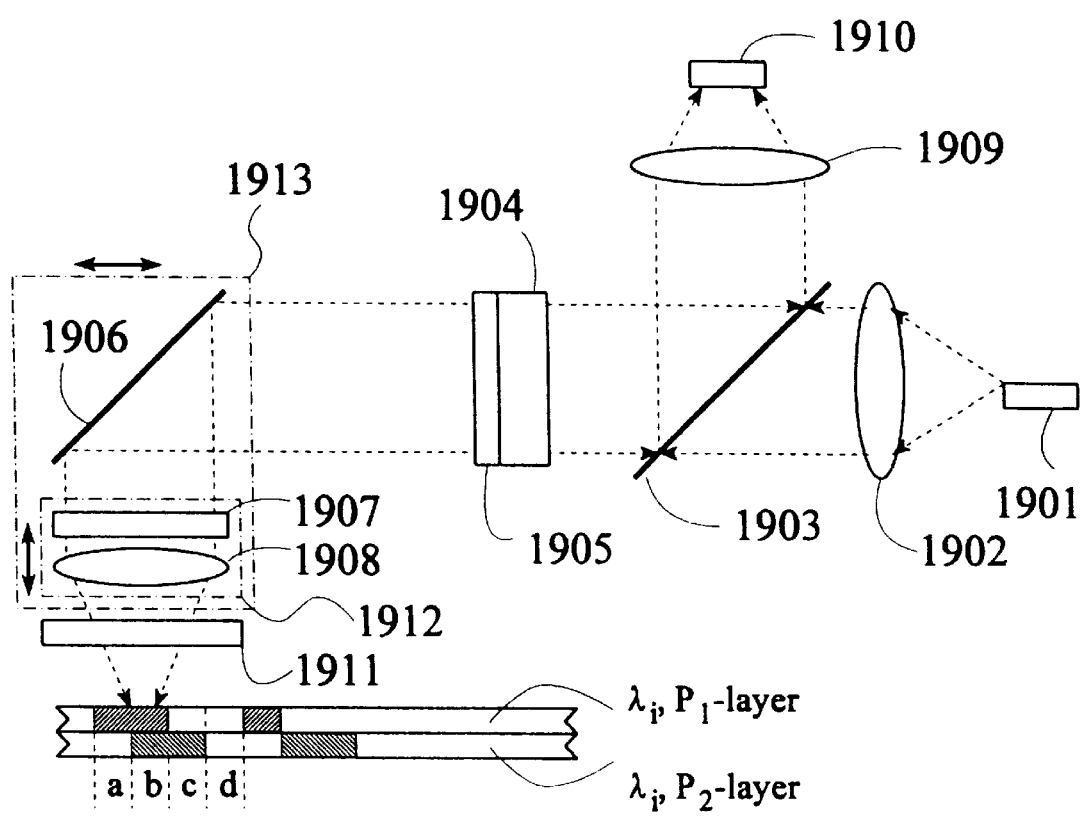
FIG. 19 is a schematic diagram of an optical pick-up which permits the use of a light focusing objective lens having a larger aperture, by using a Faraday optical isolator.

Yet another alternative embodiment for increasing the aperture of the focusing objective lens of the optical reading head hereof is illustrated in FIG. 19. As shown, the retro-reflective optical reading head of FIG. 19 comprises: a laser diode 1901 for producing a laser beam having a characteristic wavelength; beam-shaping (i.e. collimating and circularizing) optics 1902 for collimating and circularizing the laser beam; a polarizing beamsplitter 1903 for transmitting the incident laser beam and reflecting the reflected laser beam; a Faraday optical isolator 1904, for preventing laser light from reflecting back into the laser source (i.e. restricting light to propagate in the forward direction); a voltage-controlled half-wave plate 1905 for imparting half-wave (($/2$) phase retardation to the laser beam, so that it is imparted with the characteristic polarization-state specified by the media access controller; a first beam-steering mirror 1906, for steering the polarized laser beam along the reading axis; a phase-grating 1907 for splitting (i.e. diffracting) the laser beam into three different laser beams for beam tracking, as described hereinbefore; a focusing objective lens 1908 for focusing the laser beam onto a preselected information storage layer in the optical storage media having a corresponding characteristic wavelength and polarization-state, and thence for focusing the reflected laser beam back through lens 1908 and phase grating 1907 towards mirror 1906; a first ultra-compact housing 1912 within which phase-grating 1907 and objective lens 1908 are mounted (i.e. enclosed) and which is moveable up and down under servo-control for fine focusing of the incident laser beam during information reading operations; a second ultra-compact housing 1913 with which beam-steering mirror 1906 and ultra-compact housing 1912 are mounted and which is radially translatable (i.e. moved) under servo-control for controlling the tracking of the incident laser beam during information storage operations; a spherical aberration compensator (i.e. corrector) 1911, as disclosed, for example, in FIGS. 11B and 11C; an astigmatic lens 1909 disposed along the light detection optical path, for focusing the laser beam; and a quad-photodetection structure 1910A centrally disposed along the light detection optical path, between dual-photodetectors 1910B and 1910C, for converting the reflected laser beam into four corresponding electrical analog signals (i.e. Data Signals A, B, C and D) for (i) conditioning (e.g. summing A+B+C+D) and thereafter digitizing to produce a digital data signal, and (ii) detecting the "in-focus" condition of the incident laser beam during information reading operations; and a dual photodetection structure 1910B and 1910C disposed along the light detection optical path (i.e. created by a beam-splitter, not shown), and about quad-photodetector 1910A, for converting the reflected laser beam into a corresponding electrical signal, and detecting the "on-track" condition of the incident laser beam during reading operations. In this alternative embodiment, polarization control is carried out upon the laser beam prior to its incidence upon the optical storage media. While this retro-reflective optical pick-up design is preferred, the present cost of Faraday optical isolators may make this technique less practical in many applications.

Figure 20A:
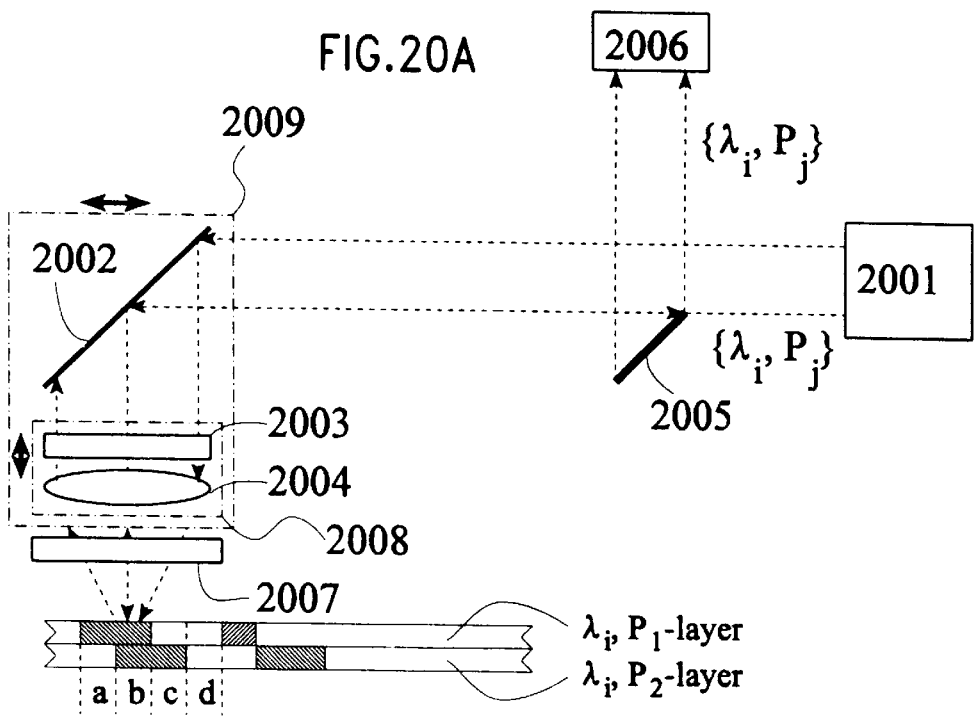
FIG. 20A is schematic diagram of a type-2 optical pick-up which detects the polarization state of laser beam after reflecting off the information storage layers of the optical storage medium during information reading operations.

In FIG. 20A, the type-2 optical pickup (i.e. reading head) is shown. The major difference between the type-2 system and the type 1 system is that for the type-2 system the polarization of the reflected laser signal, rather than that of the incident laser beam, is controlled by the media access controller. In this system, it is assumed that incident laser beam has both $P_1$ and $P_2$ components. For circular polarization-sensitive media, (e.g., CLC-based optical media), the P1 and P2 components of the incident laser beam may be either linear polarized or unpolarized. In either case, the incident laser beam is composed of two (i.e. left and right handed) circularly polarized components. In the circular polarization sensitive media case, the direction of linear polarization is not important. For linear polarization-sensitive media, the $P_1$ and $P_2$ components of the incident laser beam may linear or unpolarized, with the understanding that linear polarization is at 45(with respect to the x or y axis. In the linear polarization sensitive case, the two components $P_1$ and $P_2$ are equal in amplitude, thereby ensuring similar signal-to-noise ratio (SNR) for both $P_1$ and $P_2$ channels in this optical pick-up system. This requirement may be relaxed in the sense that as long as SNR is adequate, the non-zero (instead of 45( ) inclination is not strictly required.

As shown in FIG. 20A, the type-2 optical pick-up subsystem comprises an assembly of components, namely: a laser beam producing unit 2001 for producing a collimated and circularized laser beam having one or more spectral components (i.e. lines) with characteristic wavelengths, either linearly polarized or unpolarized, specified by the media access controller; a first beam-steering mirror 2002, for steering the produced laser beam after it has been collimated and circularized; a phase-grating 2003 for producing three laser beams for use in beam tracking; a focusing objective lens 2004 for focusing the collimated laser beam as it is directed incident to the optical storage media hereof; a first ultra-compact housing 2009 within which phase-grating 2003 and objective lens 2004 are mounted (i.e. enclosed) and which is moveable up and down under servo-control for fine focusing of the incident laser beam during information reading operations; a second ultra-compact housing 2009 with which beam-steering mirror 2002 and ultra-compact housing 2008 are mounted and which is radially translatable (i.e. moved) under servo-control for controlling the tracking of the incident laser beam during information storage operations; a spherical aberration compensator (i.e. corrector) 2007, as disclosed, for example, in FIGS. 11B and 11C; a second beam steering mirror for steering the produced laser beam after it has been reflected from the information storage medium and focused through the objective focusing lens; and an array of photodetectors 2006 for detecting the spectral components of the composite laser beam as they reflect off corresponding information storage layers in the optical storage medium during information reading operations.

Figure 20B:
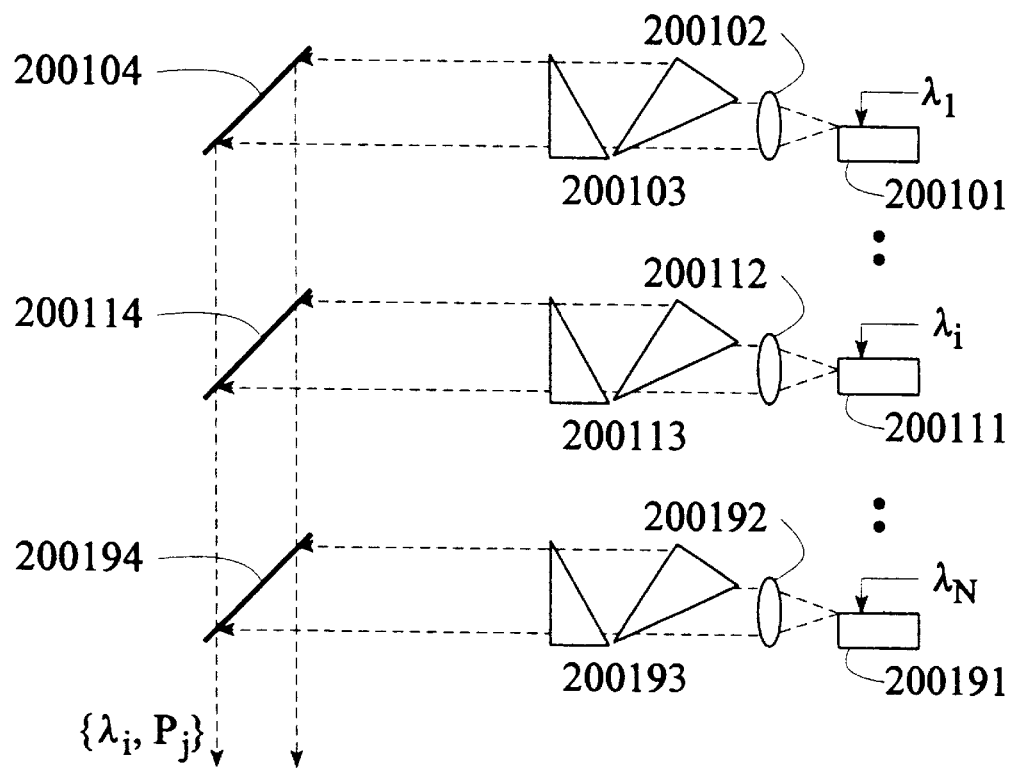

In FIG. 20B, the subcomponents of the laser beam producing unit are shown in greater detail. As shown, the laser beam producing unit 2001 comprises: an array of lasers, e.g., lasers 200101, 200111 and 200191, for producing spectral components with characteristic output wavelengths ($_1$, ($_i$, and ($_N$, respectively, and a predetermined polarization state (e.g., linear polarization state); an array of collimating lenses, 200102, 200112, and 200192, for collimating the spectral output of lasers 200101, 200111 and 200191, respectively; an array of anamorphic prisms, 200103, 200113 and 200193, for circularizing the spectral output from collimating lenses, 200102, 200112, and 200192, respectively; and an array of dichroic mirrors 200104, 200114 and 200194, respectively, for combining the polarized spectral components into a single composite laser beam precharacterized for reading particular information storage layers having characteristic wavelengths and polarization-states which correspond to the wavelengths and polarization-states of the spectral components of the incident composite laser beam. As the incident laser beam has two polarization components for type 2 optical pick-up, the polarization-state of the optical storage media is not important. The drawback of this system, however, is that unless both the $P_1$ and $P_2$ information storage layers (corresponding to characteristic wavelength ($_i$) are being accessed, half of the incident laser beam is not used (i.e. it is wasted).

Figure 20C:
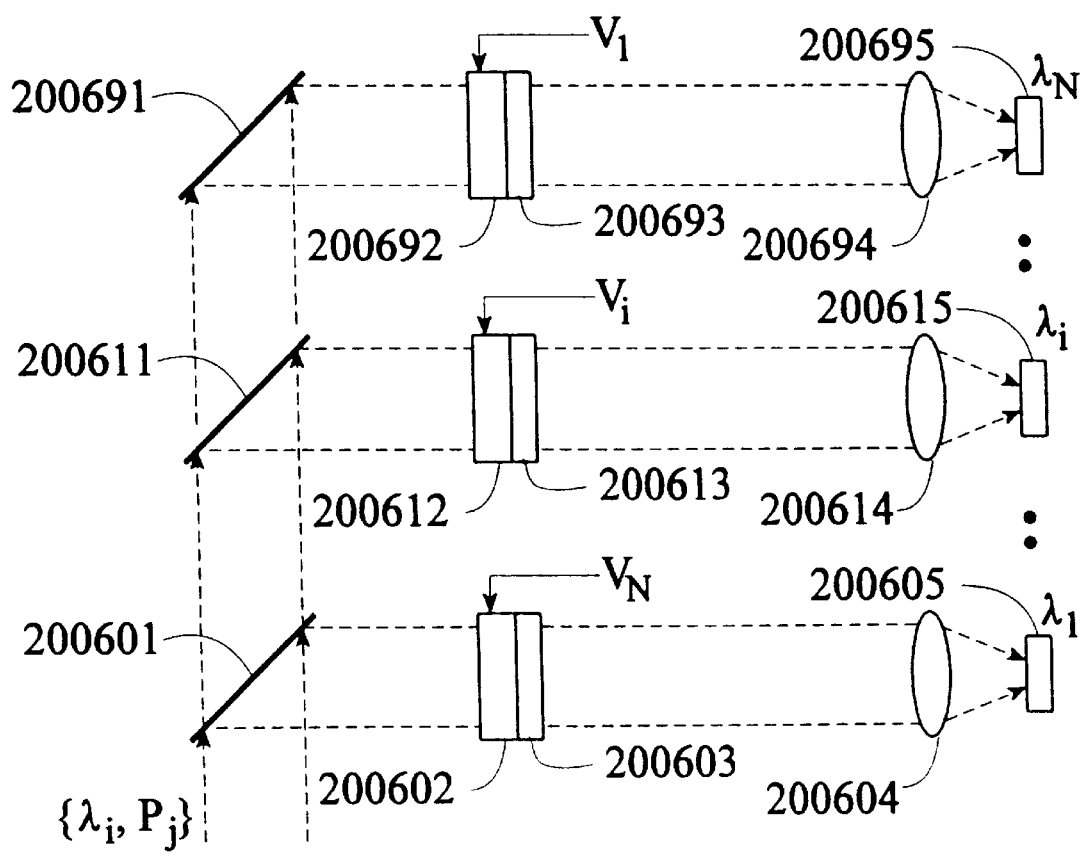

Referring to FIG. 20C, the photodetection unit 1706 of the type-2 optical pick-up will now be described in greater detail. As shown, the photodetection unit comprises: an array of dichroic mirrors 200601, 200611 and 200691, for separating and directing the spectral components of the reflected laser beam, characterized by wavelengths ($_1$, ($_i$, and ($_N$, respectively, along a plurality of spatially isolated optical channels; an array of voltage-controlled, circular-polarization selective shutters for light transmission regulation, comprising an array of voltage-controlled (/2-phase retarders 200602, 200612 and 200692 and an array of circular polarizer filters 200603, 200613 and 200693, respectively; an array of astigmatic lenses 200604, 200614 and 200694, each disposed along an isolated optical channel, and focusing the individual spectral component to a focal point; and multi-function photodetector 200605, 200615 and 200695, disposed at the focal points of astigmatic lenses for detecting the intensity of each of the reflected spectral components.

The operation of the type-2 optical pick-up (i.e., head) will be described below with reference to the multi-layered (CLC-based) optical storage medium of FIG. 13.

Central to understanding the operation of the type-2 optical pickup described above, is recognizing that a linearly polarized laser beam having characteristic wavelength ($_i$ consists fundamentally of both a RHCP spectral component and a LHCP spectral component, each having the same characteristic wavelength ($_i$ and an equal amplitude. This fundamental fact of physics is well known in the art and is discussed at great length in, for example, "Principles of Optics" by M. Born and E. Wolf, published by Pergamon Press, New York, and "Geometrical and Physical Optics" by R. S. Longhurst, published by Longman, New York. In essence, the linearly polarized laser beam can be represented as:

$$a_x \sin((t)) = \frac{1}{2}\{a_x\sin((t)) + a_y\cos((t))\} + \frac{1}{2}\{a_x\sin((t)) - a_y\cos((t))\}$$

where $a_x$ and $a_y$ are unit polarization vectors along x and y axes, respectively, and the terms in { } represent circular polarization vectors of magnitude equal to the square root of 2. More rigorously, it can be shown that the polarization vectors P1 and P2 (i.e. where 1 and 2 are either x and y, or RHCP and LHCP) form a complete set of eigenvectors, in terms of which any vector can be expressed.

As the linearly polarized laser beam reflects off each particular "prerecorded" information storage cell in a particular paired $P_1$–$P_2$ layer of the CLC-based storage medium, its spectral composition is typically transformed. The exact spectral composition of the linearly polarized laser beam after it is reflected from a particular information storage cell will depend on the logical states of the information bits recorded at that particular storage cell of the paired $P_1$–$P_2$ information storage layer. When considering the information storage medium shown in FIG. 20A, four rules are adequate to describe the behavior of incident laser beam used during information reading operations. These rules of behavior are set forth below.

When the laser beam is incident upon the information storage cell at position (a) where a logical "1" has been recorded on the $P_1$-polarized (i.e. RHCP) layer and a logical "0" has been recorded on the $P_2$-polarized (i.e. LHCP) layer, then only the $P_1$-polarized component of the linearly polarized incident laser beam will reflect off the information storage cell at that location. When the laser beam is incident upon the information storage cell at position (b) where a logical "1" is recorded on both the $P_1$-polarized layer and the $P_2$-polarized layer, then both $P_1$ and $P_2$ polarized components of the incident laser beam will reflect off the information storage cell at that location. When the laser beam is incident upon the information storage cell at position (c) where a logical "0" is recorded on the $P_1$-polarized layer and a logical "1" is recorded on the $P_2$-polarized layer, then only the $P_2$-polarized component will reflect off the information storage cell at that location. When the laser beam is incident upon the information storage cell at position (d), where neither a logical "0" is recorded on both the $P_1$-polarized layer and the $P_2$-polarized layer, then neither the $P_1$ polarized component or the $P_2$ polarized component of the incident laser beam will reflect off the information storage cell at that location, but rather both of these spectral components will be transmitted through the information recording medium at this cell location.

In order to detect the polarization state of each of the spectral components of the reflected laser beam, and thus detect the information bit recorded at each information storage cell within a particular track of the optical storage medium, the voltage-controlled, circular-polarization selective shutter is employed for each characteristic wavelength ($_i$ in order to control the transmission of reflected laser light towards the photodetector for detection. As mentioned above, each voltage-controlled shutter consists of a voltage-controlled (/2-phase retardation plate (e.g. 200612) and a circular (e.g. RH) polarizer (e.g. 200613). When the media access controller determines that the (($_i$, $P_1$)-layer is to be read, no voltage is applied to the voltage-controlled phase plate, and the circular-polarization selective shutter transmits only the $P_1$ (i.e. RHCP) polarized spectral component of the reflected laser beam. In such instances, the photodetector receives only the reflected spectral component reflected from the (($_i$, $P_1$)-layer as the $P_2$ (i.e. LHCP) polarized spectral component from the (($_i$, $P_2$)-layer is blocked by the circular-polarization selective shutter. The intensity of the detected spectral component carries information corresponding to the logical value recorded at that information cell location. Tracking and focusing onto the (($_i$, $P_1$)-information layer is servo-controlled using the $P_1$-polarized spectral component of the reflected laser beam.

When the media access controller determines that the (($_i$, $P_2$) information storage layer is to be read, then $V_i$ is applied to the voltage-controlled (/2-plate and the circular-polarization selective shutter transmits only the $P_2$-polarized spectral component of the reflected laser beam. In this case, the detector receives only the reflected spectral component from the (($_i$, $P_2$)-layer as the $P_1$-polarized spectral component from top (($_i$, $P_1$)-layer is blocked by the circular-polarization selective shutter. The intensity of the detected spectral component carries information corresponding to the logical value recorded at that information cell location. Tracking and focusing of this bottom (($_1$, $P_2$)-information layer is servo-controlled using the $P_2$-polarized spectral component of the reflected laser beam.

Notably, when using a type-2 optical pickup, the techniques shown in FIGS. 18 and 19 can also be used to improve the aperture of the beam focusing objective lens. Also, when using linear polarization-selective media, rather than circular-polarization selective media as described above, the polarization of the incident laser beam will preferably aligned at 45(with respect to the x-axis. In such an alternative embodiment, a linear polarizer will be used in lieu of each circular polarizer (i.e. 200692, 200612, 200602) in order to produce a voltage-controlled linear-polarization selective shutter. In a manner similar to the circular-polarization selective shutter described above, this linear-polarization selective shutter will transmit to the photodetector only reflected spectral components having both the characteristic wavelength and linear-polarization-state of the information storage layer specified to be read by the media access controller by way of the voltage control signals provided to the linear-polarization selective shutter.

In general, there are several schemes for maintaining the incident laser beam in the "in-focus" condition during reading operations, namely the "knife-edge" technique illustrated in FIGS. 18, 18A, 18B and 18C; and the "astigmatic difference" approach. These two techniques will be detailed below.

As shown in FIGS. 18, 18A, 18B and 18C, the knife edge technique employed in the laser beam detection subsystem of FIG. 18 exploits the fact that the divergence of the reflected beam changes as the optical storage media moves into its "out of focus" condition. In the optical arrangement shown in the FIG. 18, the laser beam passes through the beam shaper 1802 twice, so that its final shape is elliptical when the incident laser beam is in its "out of focus" condition, that is, when the analog Data Signals A and B produced from the light detector 1812A and the Focus Error Signal (FES) derived therefrom satisfy either of the following conditions: FES=A−B>0 or FES=A−B<0. When both halves of the light detector 1812A are evenly illuminated, then the "in-focus" condition is obtained (i.e. FES=A−B=0). As the optical storage media is moved "out of focus", the reflected laser beam is divergent or convergent and the focal image moves causing the knife edge 1811 to unevenly illuminate the dual detector 1812A, resulting in a non-zero error signal, which is used in autofocusing lens 1908 under servo-control. Notably, when using the Foucault knife edge method of FIG. 18A, 18B and 18C, the reflected laser beam need not be circular.

The astigmatic method, employed in the illustrative embodiment of FIG. 19, is preferred over the "knife edge" by virtue of its simplicity and easy alignment. In the system of FIG. 19, quadrant detector 1910A is placed along each optical channel, with its axes at 45(with respect to the paper, in the middle between the two focal planes at the circle of least confusion, which represents in-focus condition as the returning light beam is collimated by the objective lens (e.g. 1908). The astigmatic lens assembly 1909 has an axial focal difference of less than one millimeter. When the optical storage layer (e.g. the optical storage disc) moves away from the in-focus condition, then the laser beam either converges or diverges and the light distribution of the reflected laser beam at the quadrant detector 1910A becomes elliptical. By summing the Data Signals A and C and B and D from opposing detector segments to produce first and second sums (A+C) and (B+D), and subtracting the first sum from the second sum, a Focusing Error Signal (FES) is automatically generated (i.e. FES=(A+C)−(B+D)) for use in controlling the focus of the incident laser beam under servo-control. When the optical storage disc moves away from its in-focus condition, the returning laser beam is either converging or diverging and thus elliptical in beam cross-section at the quadrant photodetector, thereby generating a non-zero focus error signal FES=(A+C)−(B+D). In the in-focus condition, the reflected laser beam is collimated and therefore the quadrant detector generates a zero error signal. Notably, the produced error signal is positive when the optical storage medium moves away from the objective lens, whereas the error signal is negative when the optical storage medium moves closer towards the objective lens. The produced error signal is then used by the servo-mechanism to control direction in which the objective lens is moved in order maintain the in-focus condition. However, as will become apparent hereinbelow, the sign of the error signal will typically depend on the particular embodiment employed in carrying out auto-focusing control. Notably, when using the astigmatic technique of FIG. 19, the reflected laser beam must have a circular beam shape. The above-described auto-focusing technique can be easily realized in any embodiment of the present invention. Greater details on automatic focusing mechanisms for use in the optical storage systems hereof can be found in 'The Physical Principles of Magneto-Optical Recording' by M. Mansuripur, published by Cambridge University Press, 1995.

Figure 19D:
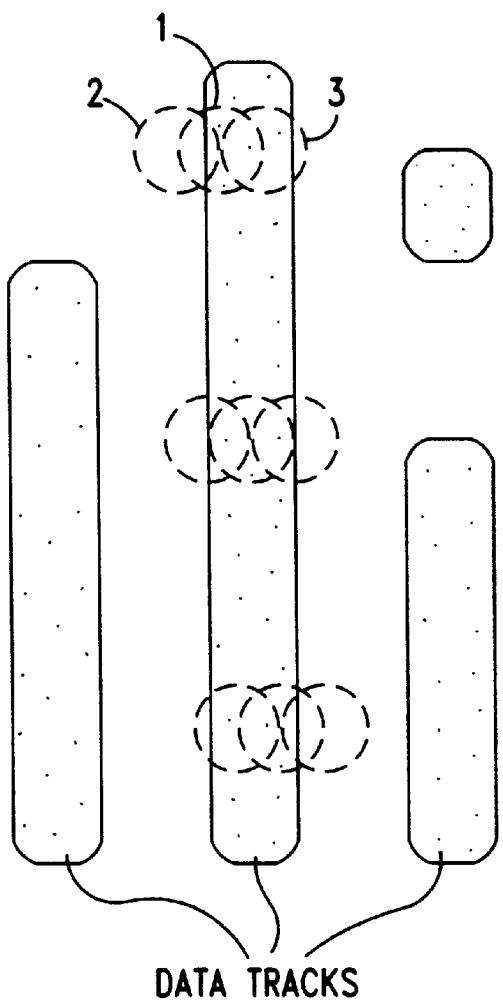
FIG. 19D is a schematic representation of an exemplary section of an information storage layer of the present invention, showing an information track along which an incident laser beam is undergoing servo-control during auto-tracking in order to prevent it from being moved accidentally onto adjacent information storage tracks during information reading operations.

In each of the illustrative embodiment of the present invention, it is necessary to automatically and precisely control incident laser beam during information reading operations so that it accurately follows the information track which the optical pick-up is instructed to read under the control of the system controller. In FIG. 19D, the process of auto-tracking using servo-control is schematically illustrated. For purposes of illustration, the system of FIG. 19 will be used to describe this process, noting that any one of the other illustrative embodiments possesses this system functionality.

Figure 19E:
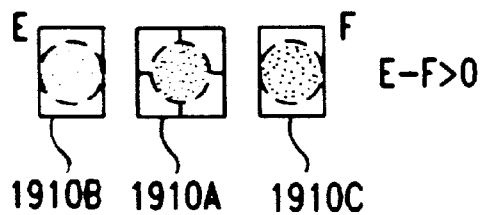
FIGS. 19E, 19F and 19G set forth a schematic representation showing different light intensity distributions being focused onto the dual photodetector of the optical pick-up of FIG. 19, for the three different cases of laser beam tracking under servo-control therein.
Figure 19F:
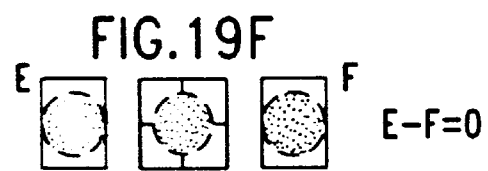
Figure 19G:
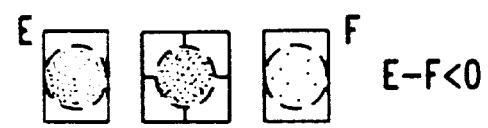

In FIGS. 19E, 19F and 19G, the dual photodetection cells 1910B and 1910C are shown closely positioned on opposite sides of the quadrant photodetector 1910A. In a multi-wavelength system, each isolated optical channel within the photo-detection subsystem will have a similar photo-detection arrangement for use in laser beam focusing and tracking control functions. In practice, all six of these photodetective surfaces can be realized on a single integrated circuit using state of the art microfabrication techniques known in the art.

As shown in FIGS. 19E, 19F and 19G, the photonic energy of the center beam having characteristic wavelength ($l_i$ and associated with the 0-th diffraction order (i.e. labeled 1) is focused onto the quadrant photodetector 1910A, and is used to (i) read the information recorded on the optical storage layer and (ii) carry out the above-described autofocusing function under servo-control. The photonic energy of the two weaker beams associated with the +1st and −1st diffractive orders (i.e. labeled 2 and 3) are used for automatic laser beam tracking under servo-control. The manner in which this latter function is carried out in practice is as follows. When the incident laser beam is at the center of the information storage track, as shown in FIG. 19D, then the photodetectors E and F (i.e. 1910B and 1910C, respectively) are evenly illuminated by the reflection of beams 2 and 3. Thus, the value of the Track Error Signal (TES) is TES=E−F=0. However, when the incident laser beam deviates from the center of the information storage track, then one of the tracking beams 2 or 3 is reflected back to the photodetector with relatively stronger intensity because a larger reflective area on the track has been illuminated. Under such conditions, the electrical signals produced from photodetectors E and F are not equal, and a signed non-zero error signal is generated for use by an actuator to move the optical pickup sideways in an appropriate manner.

In the above-described illustrative embodiments, laser diodes are used as light sources for reading information stored in the optical storage media of the present invention. Because of the unique reflection properties of information storage layers hereof (i.e. particularly the CLC layers), the reflected laser beam has the same circular polarization as that of the incident laser beam. Consequently, there is an advantage in using a non-retroreflective optical pick-up design in order to eliminate the intensity of noise produced as a result of to optical feedback with the laser. In order to prevent optical feedback with the laser, it is preferred to use the optical pick-ups shown in FIGS. 17A, 19, 21 and 22 when reading information from a CLC-based information storage disk. If a retroreflective design must be used, then low-coherence lasers (e.g. self-pulsating lasers) are preferred for use in the optical pick-up of the present invention.

In general, when it is desired that only one information track on only one layer of a $P_1$–$P_2$ information storage structure is to be read out at one instant in time (i.e. serially), then there is no requirement that the information tracks on these information layers are precisely aligned, or that they otherwise overlay each other. This information access (i.e. reading method) method allows the tracking and focusing on the particular storage layer being read. A primary advantage associated with this technique is that the information storage (i.e. recording) tracks of both the upper and lower layers of the $P_1$–$P_2$ information storage structure need not be aligned, thereby improving greatly the manufacturability of such information storage devices. Consequently, such embodiments of the information storage device of the present invention can be made by simply laminating two layers with a crude overlaying technique or none at all.

Figure 21:
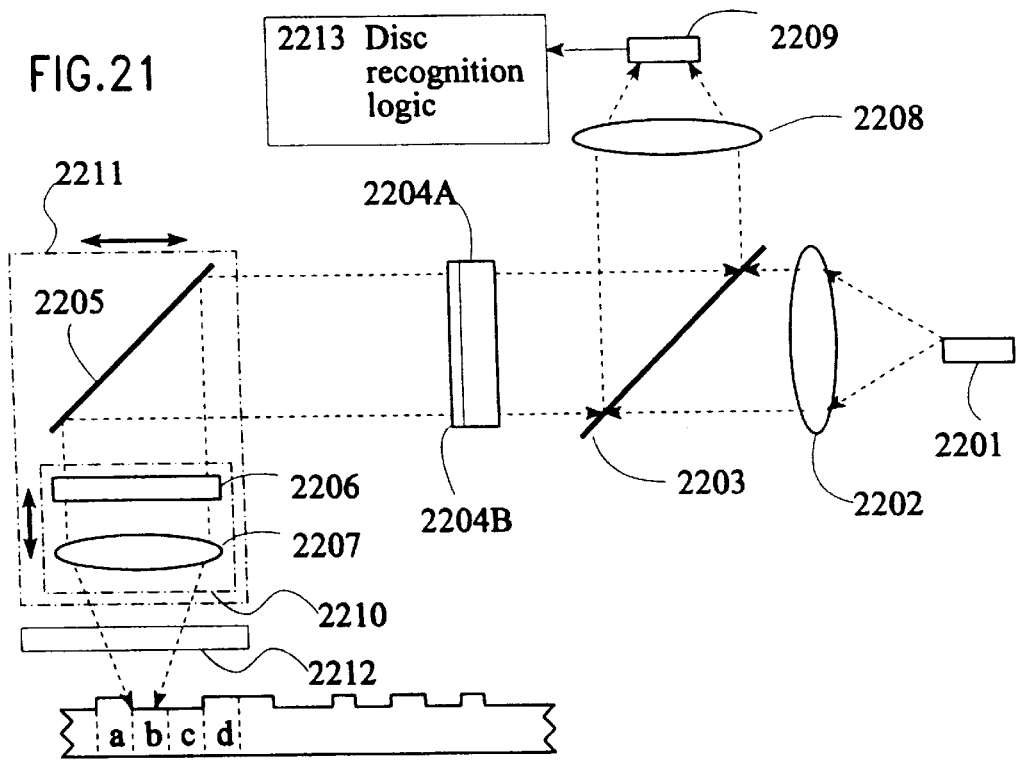
FIG. 21 is a schematic diagram of a non-retroreflective optical subsystem for simultaneous reading of aligned information stored in a paired polarization-selective and wavelength-selective information storage layers.

However, when it is desired to simultaneously read information from both the top and bottom layers of a $P_1$–$P_2$ information storage structure, it is then necessary that the information storage tracks thereon be precisely aligned with each other. In addition, a suitably adapted optical reading pick-up is required to carry out this simultaneous information access method. In FIG. 21, a schematic diagram for such an optical pick-up is shown. Advantageously, this optical pickup can read information from both the top and bottom layers of a $P_1$–$P_2$ information storage structure, thereby doubling (or multiplying) readout throughput.

As shown in FIG. 21, the optical pickup for parallel reading comprises a number of subcomponents, namely: a laser beam producing unit 2101 for producing a collimated and circularized laser beam having two spectral components (i.e. lines) each having the same characteristic wavelength and orthogonally-different polarization-states $P_1$ and $P_2$, respectively, specified by the media access controller; astigmatic lenses and an anamorphic prism 2102 for collimating and circularizing the composite laser beam; a first beam-steering mirror 2103, for steering the composite laser beam after it has been collimated and circularized; a phase-grating 2104 for splitting the composite laser beam into three spots for tracking and data retrieval; a focusing objective lens 2105 with a sufficient depth of focus for focusing the collimated laser beam onto the optical storage media hereof; a first ultra-compact housing 2113 within which phase-grating 2104 and objective lens 2105 are mounted (i.e. enclosed) and which is moveable up and down under servo-control for fine focusing of the incident laser beam during information reading operations; a second ultra-compact housing 2114 with which beamsteering mirror 2103 and ultra-compact housing 2113 are mounted and which is radially translatable (i.e. moved) under servo-control for controlling the tracking of the incident laser beam during information storage operations; a spherical aberration compensator (i.e. corrector) 2112, as disclosed, for example, in FIGS. 11B and 11C; a second beamsteering mirror 2106 for steering the reflected laser beam along a second optical path; a dichroic mirror for splitting the reflected laser beam into polarized spectral components $P_1$ and $P_2$; a first astigmatic lens 2108 for focusing the reflected laser beam containing polarized spectral component $P_1$; a photodetector 2109 for detecting the polarized spectral component $P_1$ reflected laser from the corresponding information storage layer $((_i, P_1)$ in the optical storage media; a second astigmatic lens 2110 for focusing the reflected laser beam containing polarized spectral component $P_2$; a photodetector 2111 for detecting the polarized spectral component $P_2$ reflected laser from the corresponding information storage layer $((_i, P_2)$ in the optical storage media.

The optical subsystem of FIG. 21 can be readily adapted for realization as either a type-1 pick-up design shown in FIG. 17A, or a type-2 pick-up design shown in FIG. 20A. When desiring to build a type-1 optical pick-up for simultaneously reading paired $P_1$–$P_2$ layers, the laser beam producing and spectral component detection units of FIGS. 17B and 17E will be included in the optical pick-up of FIG. 21. When desiring to build a type-2 optical pick-up for simultaneously reading paired $P_1$–$P_2$ layers, the laser beam producing and spectral component detection units of FIGS. 20B and 20C will be included in the optical pick-up of FIG. 21. In order to improve the aperture of the objective focusing lens of the optical pick-up of FIG. 21, the optical techniques disclosed in FIGS. 18 and 19 can be used as taught hereinabove. The depth-of-focus adjustment mechanisms shown in FIGS. 11 and 12 can be used of the optical pick-up of FIG. 21. Optionally, polarization band-pass filters can be placed in front the photodetectors. It is clear to those skilled that, for linear polarization-selective storage media, the circular polarization beamsplitter 2107 is replaced by a linear polarization beam splitter to separate the two orthogonally polarized signals.

Any of the embodiments of the optical pick-up subsystem of FIG. 21 described above can be used to simultaneously read information prerecorded on the tracks of paired $P_{1-P2}$ layers in an information storage structure hereof. However, to use this optical pick-up and thereby double the information readout rate of the system, the information tracks formed in these paired layers must be precisely aligned. Notably, this places strict requirements on the manufacturing process.

There are a number of techniques for manufacturing information storage devices having precisely aligned information tracks formed on each paired set of $P_1$–$P_2$ layers. The precision alignment techniques used in the photolithographic manufacturing of integrated circuit (IC) chips may be used in the alignment of information tracks recorded on paired $P_1$–$P_2$ layers. However, these techniques may not be practical at present for lowcost mass production of CD-ROM disks according to the present application. For optically-based Write-Once and Read-Many-times (WORM) disks, the information tracks recorded on the paired layers can be automatically aligned during writing operations. Thus, type 2 optical pickup are preferred for WORM drives.

Figure 23:
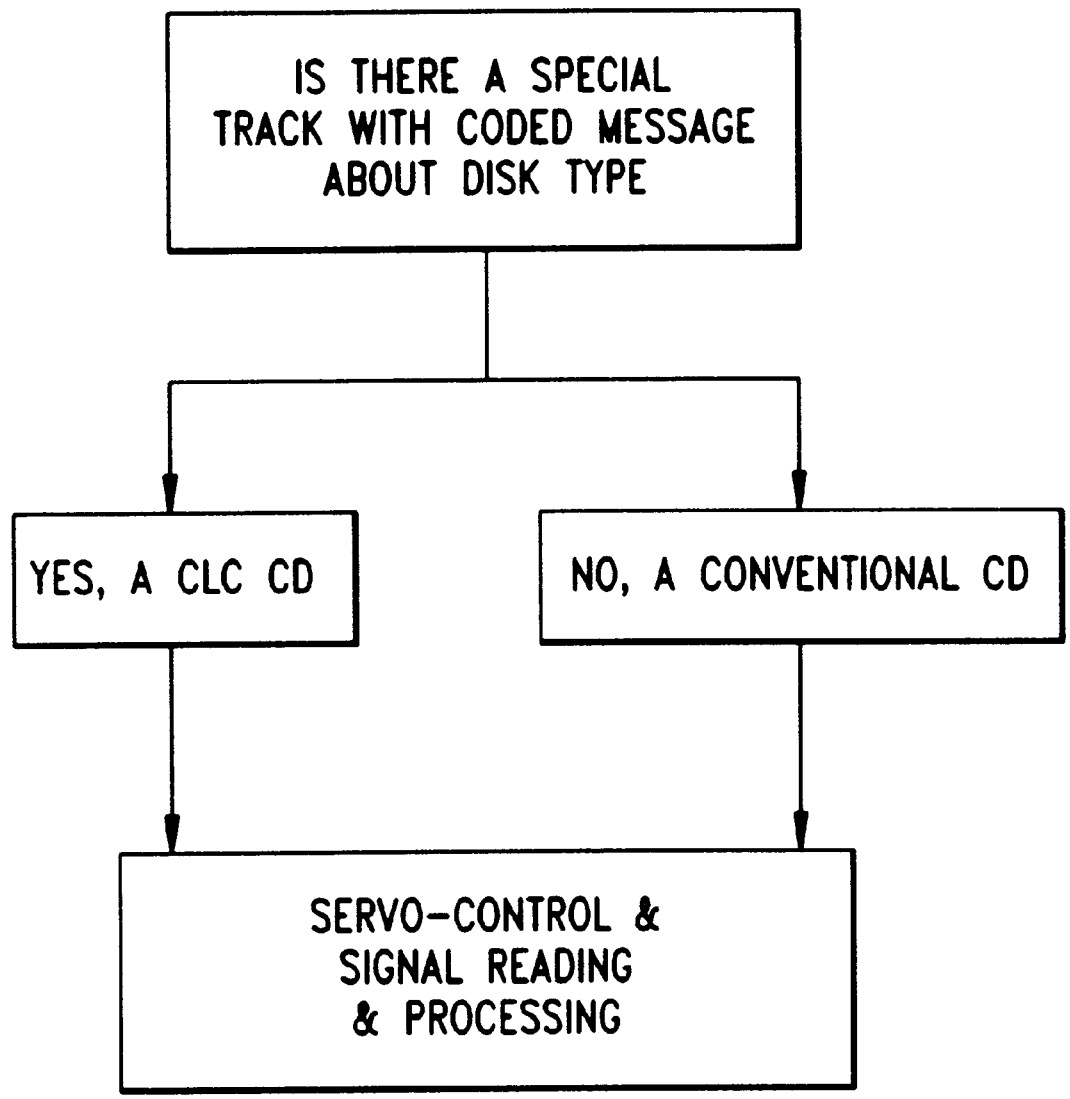
FIG. 23 is a schematic representation illustrating the logical operations carried out by the automatic disc-type recognizing mechanism employed in the system of FIG. 22.

For backward compatibility with conventional information storage and retrieval systems (e.g. CD ROM drives), the information storage an d retrieval system of the present invention, such as the CD drive of FIGS. 3A and 3B, includes a mechanism for automatically determining whether a conventional, multi-decked or multi-layered CLC disk has been inserted into its support tray for reading. In FIG. 23, an automatic disk-type sensing program is shown for use with the system of the present invention. In a manner similar to that of conventional CD drives, the CLC CD drive of the present invention scans (i.e. reads) the tracks from near the center of the disk to the outer rim thereof. Preferably, a coded message of a few bytes is pre-recorded on the first track of CLC discs of the present invention. When this coded message is scanned (i.e. read), the automatic disk-type sensing circuit in the CD drive unit hereof to read information about the inserted disk, and determines the disk type (e.g. two-layers, multilayers or multi-decked). If no such coded message is read, then the disk is automatically recognized as a conventional CD by the CD drive unit of the present invention. Alternatively, it would be desired to have conventional CD-ROMs coded, as this would allow them to be positively recognized. Thus by simply reading the information track of the disc, the system can properly set up the necessary servo-control to read the optical disc.

The two basic types of optical pickup designs described in great detail above are backward compatible, in that they can also be used to read regular CD-ROMs, as well as CD ROMs constructed in accordance with the principles of the present invention. When the optical pickups of the illustrative embodiments recognize that a conventional CD ROM has been inserted into its support tray for reading purposes, then automatically the electro-optics thereof are controlled in a particular manner in order to be capable of reading the conventional CD ROM, or the optical storage disc hereof, as the case may be. The operation of these illustrative embodiments will be described below when reading a conventional CD disc.

For example, when the type-1 optical pick-up of FIG. 17 recognizes that a conventional CD has been inserted within its support tray and is attempting to be read by a user, then the control voltage to the voltage-controlled phase-retardation plate does not matter, as the conventional CD ROM disc is not polarization selective. The reflected laser beam from the conventional CD disc is used for servo-controlling focusing and tracking.

When the type-1 optical pick-up of FIG. 17 recognizes that a CLC CD of the present invention has been inserted within its support tray and is attempting to be read by a user, then the control voltage to the voltage-controlled phase-retardation plate is automatically set to zero, causing the laser beam incident on the CLC disc to be circularly polarized (e.g. RHCP or LHCP) prior to incidence on the CLC disc. Upon reflection from metallic surface of the conventional CD disc, the circular polarization direction of the reflected laser beam changes (e.g. RHCP to LHCP). The reflected laser beam from the CD disc is used for servo-controlling focusing and tracking.

When the type-1 optical pick-up of FIG. 19 recognizes that a conventional CD has been inserted within its support tray and is attempting to be read by a user, then the control voltage to the voltage-controlled phase-retardation plate does not matter, as it changes $P_1$ to $P_2$ or vice versa. The reflected laser beam from the CD disc is used for servo-controlling focusing and tracking.

When the type-1 optical pick-up of FIG. 19 recognizes that a CLC CD of the present invention has been inserted within its support tray and is attempting to be read by a user, then the control voltage to the voltage-controlled phase-retardation plate is automatically set to zero, causing the laser beam incident on the CLC disc to be circularly polarized (e.g. RHCP or LHCP) prior to incidence on the CLC disc. Upon reflection from metallic surface of the conventional CD disc, the circular polarization direction of the reflected laser beam changes (e.g. RHCP to LHCP). The reflected laser beam from the CD disc is used for servo-controlling focusing and tracking.

When the type-2 optical pick-up of FIG. 21 recognizes that a conventional CD has been inserted within its support tray and is attempting to be read by a user, then the control voltage to the electrooptic phase-retarder in front of the photodetector does not matter, as the conventional CD is not polarization selective. The reflected laser beam from the conventional CD disc is used for servo-controlling focusing and tracking.

When the type-2 optical pick-up of FIG. 21 recognizes that a CLC CD has been inserted within its support tray and is attempting to be read by a user, then the control voltage to the electrooptic phase-retarder in front of the photodetector is automatically set to $V_{\ell/4}$, causing the polarization state of the circular polarization shutter to be either RHCP or LHCP. Then when the linearly polarized incident laser beam reflects off the metallic surface of the CLC CD, it will automatically be circularly polarized and thus transmitted without any attenuation through the circular polarization shutter located before the photodetector.

Figure 22:
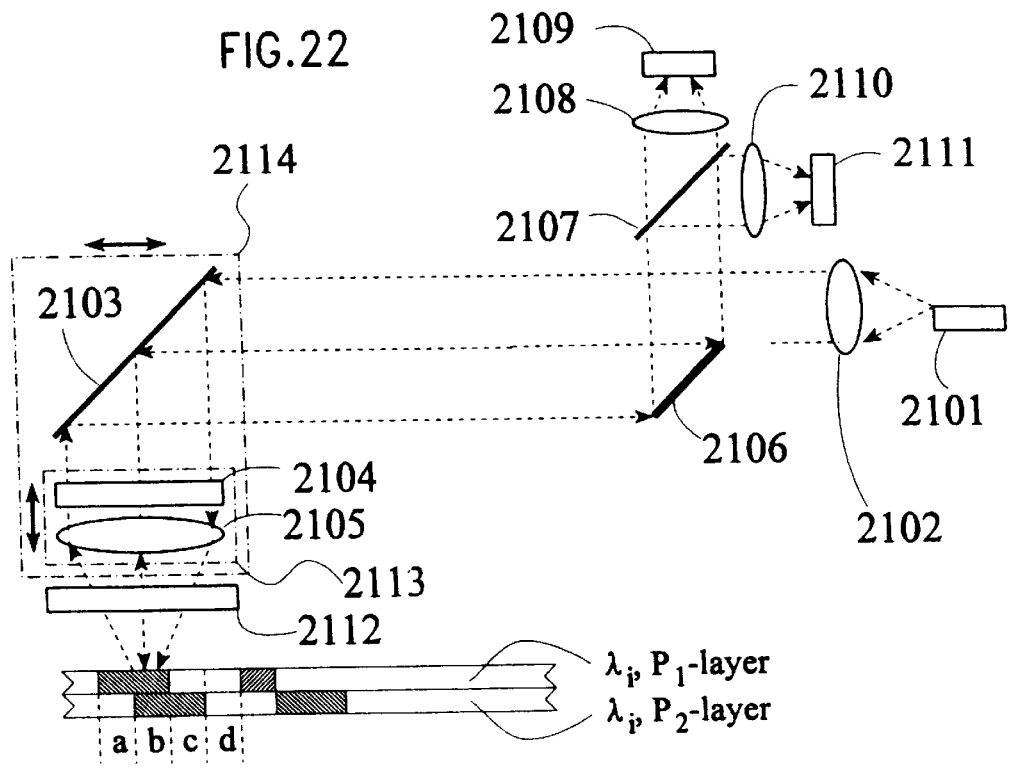
FIG. 22 is a schematic representation of the information storage and retrieval system of the present invention, in which an automatic disc-type recognizing mechanism is employed to provide backward compatibility.

In FIG. 22, an information reading system is shown having a retro-reflective optical reading head similar to that shown in FIG. 19, in addition to employing disc recognition logic. The system comprises: a laser diode 2201 for producing a laser beam having a characteristic wavelength; beam-shaping (i.e. collimating and circularizing) optics 2202 for collimating and circularizing the laser beam; a polarizing beamsplitter 2203 for transmitting the incident laser beam and reflecting the reflected laser beam; a Faraday optical isolator 2204A, for preventing laser light from reflecting back into the laser source and a voltage-controlled half-wave plate 2204B for imparting half-wave ((/2) phase retardation to the laser beam, so that it is imparted with the characteristic polarization-state specified by the media access controller; a beam-steering mirror 2205, for steering the polarized laser beam along the reading axis; a phase-grating 2206 for splitting (i.e. diffracting) the laser beam into three different laser beams for beam tracking, as described hereinbefore; a focusing objective lens 2207 for focusing the laser beam onto a preselected information storage layer in the optical storage media having a corresponding characteristic wavelength and polarization-state, and thence for focusing the reflected laser beam back through lens 2207 and phase grating 2206 towards mirror 2205; a first ultra-compact housing 2210 within which phase-grating 2206 and objective lens 2207 are mounted (i.e. enclosed) and which is moveable up and down under servo-control for fine focusing of the incident laser beam during information reading operations; a second ultra-compact housing 2211 with which beam-steering mirror 2205 and ultra-compact housing 2210 are mounted and which is radially translatable (i.e. moved) under servo-control for controlling the tracking of the incident laser beam during information storage operations; a spherical aberration compensator (i.e. corrector) 2212, as disclosed, for example, in FIGS. 11B and 11C; an astigmatic lens 2208 disposed along the light detection optical path, for focusing the laser beam; multi-function photodetector 2209 disposed along the light detection optical path, for converting the reflected laser beam into a corresponding electrical signal for signal processing; and disc recognition logic 2213, illustrated in greater detail in FIG. 23. In this alternative embodiment, polarization control is carried out upon the laser beam prior to its incidence upon the optical storage media. While this retro-reflective optical pick-up design is preferred, the present cost of Faraday optical isolators may make this technique less practical in many applications.

In general, the process for manufacturing CLC disks is different from the process employed in the manufacture of conventional CD ROMs. Conventional CD-ROM disks usually employ the EFM code which translates an 8-bit data byte into a 14 optical bit pattern in which no fewer than 2 '0's and more than 10 '0' may occur between any two consecutively occurring '1's. In the CLC CD ROMS of the present invention, a data code, such as the so-called 8–14 modulation (EFM) code may be used. However, it is understood that other code may be used to fully exploit for optical storage media of the present invention.

Below several methods are disclosed in detail for producing multilayer CLC storage media.

When sequentially reading information tracks on CLC layers, it is not essential that the information tracks recorded on paired layers be aligned. This is because focusing and tracking are servo-controlled with respect to the track on a particular CLC layer being read. Such disks can be made by laminating information storage layers realized as pre-recorded disks of very thin thickness.

In order to greatly reduce the investment cost of research and development in equipment for manufacturing the optical media of the present invention, the precision molding process used to manufacture conventional CD-ROMs can be modified and thereafter used to practice the present invention. As shown in FIGS. 24A to 24F, the method of the present invention comprises the using special machinery to make a master mold for CLC CDs, from which many duplicate stamping molds can be made for mass production of CLC CDs.

Figure 24A:
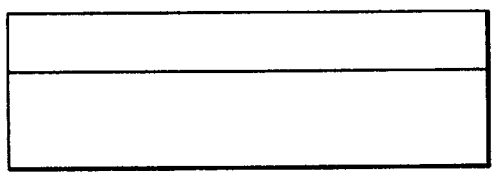
FIGS. 24A to 24F show the process steps for making master molds for mass-manufacturing CLC-based information storage discs.

As shown in FIG. 24A, the first step of the method involves applying a "positive" photoresist onto a flat substrate using a spin coating technique. Preferably, the photoresist has a low-thermal expansion coefficient. In order to make a matched pair of molds for stamping precisely aligned disks, the substrate must be made from an optically transparent material, such as glass or like material. In some applications, a negative photoresist can be used, although the following processing steps will require modification in a manner readily apparent to those skilled in the art.

Figure 24B:
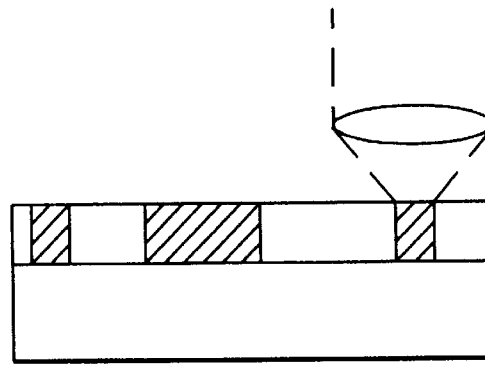
Figure 24C:
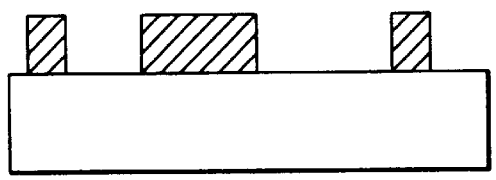

As shown in FIG. 24B, the second step of the method involves using a focused laser beam in order to directly expose the photoresist layer along a continuous spiral track, at either a constant linear velocity (CLV) or constant angular velocity. Exposing the photoresist layer at constant linear velocity provides higher recording capacity over constant angular velocity (CAV) or zoned constant angular velocity (ZCAV) formats which requires concentric information storage tracks. In some applications, the CAV and ZCAV formats may be preferred because these offer a faster access time than the CLV format. The exposure of the photoresist by the writing laser beam is controlled by digitally modulating the laser beam using an encoded digital signal which is either feed sequentially or in reverse order. This method of exposure is usually called direct-write, as no mask is used. To make precisely overlaid (i.e. aligned) tracks on both sides of the substrate, the spiral or concentric tracks must be exactly written on the matched pair of molds. This can be achieved by precisely controlling the rectilinear (x,y) or polar (r, ( ) coordinates of the writing laser beam. The (x, y)- or (r,( )-position is servo-controlled by laser interferometers which have an accuracy within 5 nanometers, which is more than adequate for this use. The (-position can be precisely controlled by an angular (i.e. optical or magnetic) encoder mounted on the spinning shaft supporting the substrate disc. The accuracy of this angular encoder should be better than milli-arcseconds. As shown in FIG. 24C, the exposed photoresist is then developed using a wet chemical etching agent or a dry plasma etching agent, thereby leaving intact on the substrate surface, the area of the substrate coated with photoresist. This remaining area corresponds to logical '1' values.

In an alternative embodiment of the present invention, photo-etching steps (B) and (C) above can be replaced by a single photoablative process carried out using an excimer laser which directly etches a digital data pattern into the surface of the disc substrate, using a laser beam having ultraviolet spectral components that photochemically decompose organic solid, such as plastic, into gaseous products.

Figure 24D:
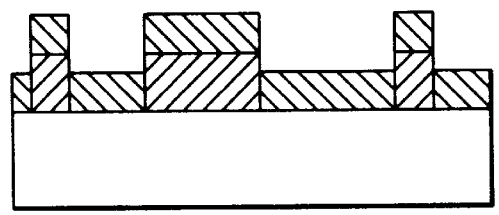
Figure 24E:
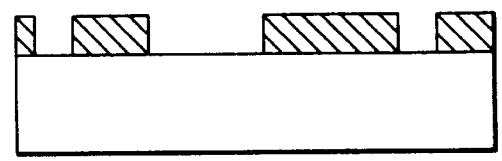
Figure 24F:
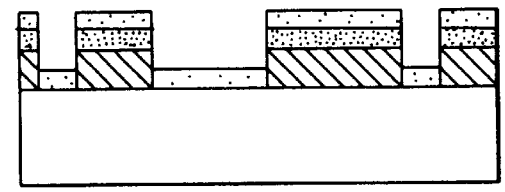

As shown in FIG. 24D, the next step of the method involves evaporating a thin metal film onto the etched away surface of the disc substrate. As shown in FIG., 24E, the method involves using a lift process in order to wash away the unexposed photoresist with metal film on top, leaving a metal thin film dot pattern, corresponding to digital data pattern encoded in to the surface of the disc substrate. At this stage of the method, the digital information pattern recorded on the CD master mold can be read with high information fidelity using a special CD drive. The repairs, so-called opens, 'pinholes' and 'mousebites', shorts and other defects, can be made using laser deposition or deletion, if repairable. As shown in FIG. 24E, the method then involves using either vacuum deposition or electrode-less plating in order to increase the hardness of the protrusion pattern on the surface of the master mold.

After the master mold has been made, many duplicate stamping molds can be made for mass production of CLC-type CDs. This involves using a stamping mold duplicating process which essentially uses the master mold to press several so-called daughter molds of opposite image. The daughter molds are then plated to increase the surface hardness for stamping operations. This technique is commonly used in the production of conventional CD ROMs. The resulting stamping mold has protrusions where logical "1"s are recorded, and pits where logical "0"s are recorded.

Having made a duplicate stamping mold using the method described above, a CLC-based information recording layer is produced in the following manner. With the stamping mold installed in a conventional stamping machine, the stamping mold halves are heated. Then a glob of plastic is injected into the stamping mold and subsequently pressed. After cooling, the stamping machine ejects the pressed disk which has pits of one micron or deeper where logical "1"s are recorded. These pits are then filled with an appropriate CLC material having a negative dielectric anisotropy. Preferred CLCs are polymers having a high molecular weight, and a solid state over the operating temperature range. One suitable class of cholesteric liquid crystals is called the polymeric liquid crystals, which include polysiloxanes, di-acrylates, di-epoxides, di-vinylethers and others, that are essentially an anisotropic glass that exhibits the physical properties of a normal liquid crystal. Other suitable class of cholesteric liquid crystals is called nematic liquid crystals, which may include chiral additives. Regardless of the particular CLC material used, the resulting structure is a CLC-based information storage layer having information recording tracks with storage cells digital information states (i.e. values) encoded into the surface structure of the layer.

In FIGS. 25A to 25D, a method is disclosed for making a double-sided CLCdisc using two separate stamping operations. In general, the first step of the method involves producing, as described above, separate stamping molds, from which first and second storage (i.e. recording) layers (e.g. discs) of the paired CLC information storage structure (e.g. doubled-layered CD disc) can be made using the general pressing and filling method described above. These information storage layers are labeled as the A-side and the B-side, respectively. Then as shown in FIG. 25B, the pits on the stamped disks are filled with an appropriate CLC having a negative dielectric anisotropy. Then as shown in FIG. 25C, both sides of the CLC-filled discs are capped with a transparent thin plastic film. If simultaneous readout is to be employed, then the plastic film must be sufficiently thin in order to accommodate the depth of focus of the focusing objective lens of the optical pick-up. Sub-micron film thicknesses with surface consistency and uniformity can be obtained by spinning techniques well known in the art. As shown in FIG. 25D, the filled layer is first heated above the glass temperature of the liquid crystal material, and then subjected to an external electric field applied normal to the layer in order to align the CLC cells into the planar state. After the aligning operation, the layer is cooled. Notably, U.S. Pat. No. 5,353,247 to co-applicant, incorporated herein by reference, teaches other techniques for aligning CLC information cells in order to write a logical '1' information state. Then, the information storage disks containing recorded information cells are laminated or bonded together, as disclosed in FIG. 25E, to form a paired CLC information storage disk. As shown in FIG. 25F, the paired CLC disc can be laminated to a plastics substrate for improving the structural integrity of the resulting CLC compact disc.

Figure 26A:
FIGS. 26A to 26D collectively show the process steps for making double-sided CLC-based disks using a single stamping operation.
Figure 26B:
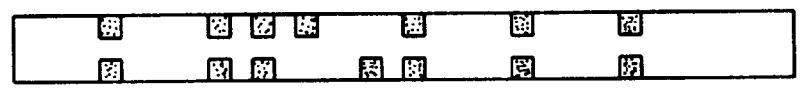
Figure 26C:
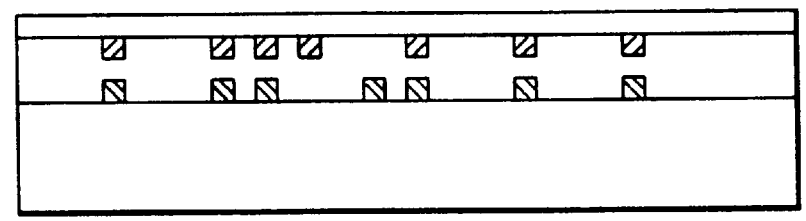
Figure 26D:
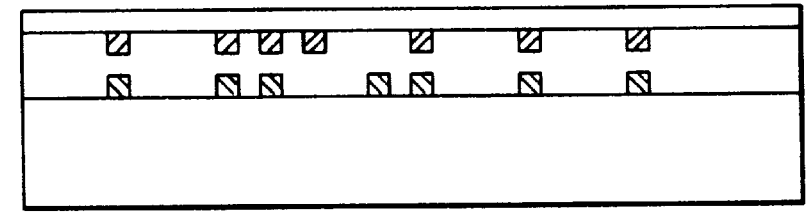

Referring to FIGS. 26A to 26D, a method will now be disclosed for making a double-sided CLC disc in a single stamping operation. The first step of the method involves producing a stamping system comprising both a top molding surface and a bottom molding surface, each having pit (i.e. incised) patterns formed therein which correspond to the digital information patterns to be recorded in the resulting paired information storage structure. Using this molding system, the pit patterns corresponding to the digital information patterns to be recorded in the resulting paired information storage structure, are simultaneously pressed into the opposite sides of a plastic disc in a single stamping operation. The resulting pressed disc is shown in FIG. 26A. Then as shown in FIG. 26B, the pits on each side of the pressed disc are filled with appropriate CLC material. Then as shown in FIG. 26C, the top surface of the filled disc is coated with a thin plastic film, whereas the lower side thereof is capped with a thicker plastic film, functioning as a substrate. Thereafter, digital information value are recorded in the information storage cells on both sides of the disc by aligning the CLC molecules using either an external magnetic field or an external electric field. The resulting structure is a paired CLC-based, $P_1$ and $P_2$ information storage structure according to the present invention.

As discussed in great detail hereinabove, it is essential that the spiral or concentric information tracks recorded on a pair of information storage layers be precisely aligned with each other in order to be capable of simultaneously reading information from both information storage layers. Thus precise alignment of paired $P_1$ and $P_2$ information storage layers is required during the stamping or lamination steps of manufacturing processes. Below are two alignment procedures which can be used to produce high-volume, low-cost CLC CD-ROM disks, As shown in FIG. 27A, one method of information storage layer alignment involves forming CLC alignment marks on the mold portion of each information storage layer to be manufactured. The purpose of these alignment marks is to facilitate precise alignment of the information storage tracks formed on the A-side and B-side of pressed information storage layers as they are made. Preferably, the location of these alignment marks are written at outer rim of each stamped disk. As shown in FIG. 27B, the CLC-based alignment marks may be realized as either rectangular elements, circular arcs, radial lines or any other pattern which provides positional information (x, y) or (r, ( ) on the stamped disks. The function of these CLC-based alignment marks is to produce reflecting strips on both the A and B sides of the CLC disks which are both wavelength and polarization state selective. In the illustrative embodiment, the CLC alignment marks change a linearly polarized laser beam into a RHCP laser beam upon reflection thereoff. The information retrieval techniques disclosed hereinabove can be used to retrieve relative positional information from the scanned alignment marks. As the scanned area carrying the alignment marks is very small, it will be more convenient to use a modified optical system to retrieve relative positional information from the scanned alignment marks. This will ensure that the paired information storage layers are precisely aligned for simultaneous information track reading operations using the optical pick-up of FIG. 21.

In FIG. 27C, a first illustrative embodiment of the information track-alignment system is shown. As shown in FIG. 27C, the optical alignment system comprises: a laser diode (not shown) for producing a laser beam with characteristic wavelength ($_i$ and linear polarization state; a photodetector 2808; a collimating lens 2807; a RHCP polarizing filter 2806; a beam splitter 2802; an oscillating plate 2803; scanning focusing lens 2804; and focus adjustment mechanism 2805. In order to align the information tracks on the A and B sides of a pair of stamped discs, the information track-alignment system operates as follows. During an alignment operation, the laser diode produces a laser beam having wavelength ($_i$ and polarization state $P_1$. The laser beam is collimated and then directed through beamsplitter 2802, oscillating glass plate 2803, and scanning focusing lens 2804, onto the CLC-based alignment marks formed on the A and B sides of the paired information storage structure. The oscillating plate 2803 moves the light beam as indicated, resulting in a focused light spot scanning along the alignment marks formed on the A and B sides of the stamped discs of the information storage structure. The scanning focusing lens 2805 is moved up or down along its optical axis in order to focus on both the A and B sides of the information storage discs. As the laser beam is reflected off the CLC alignment marks on the information storage layers, its polarization state is changed to RHCP. This reflected laser beam is then focused by lens 2804 and directed by the beamsplitter 2802 through RHCP polarizing filter 2806. The RHCP polarizing filter passes only the RHCP portions of the reflected laser beam corresponding to the CLC alignment marks. These optical signals are focused onto photodetector 2808 by focusing lens 2807 and produce corresponding electrical signals. The polarizing filter is controlled by an electrical signal in synchronism with the focusing mechanism 2804. In FIG. 27D, the produced electrical signals are shown. The detection scheme is similar to reading the paired information layers simultaneously, except that the data pattern is not random, as shown in FIG. 27D. Assuming the pattern is 10101 . . . , the electrical signals are of the form of a square wave. The relative timing of the leading/trailing edges of the electrical signal provides information about the spatial alignment of the paired information layers. By timing these signals, an error signal (t can be generated for use in servo-control during the alignment process.

Figure 27E:
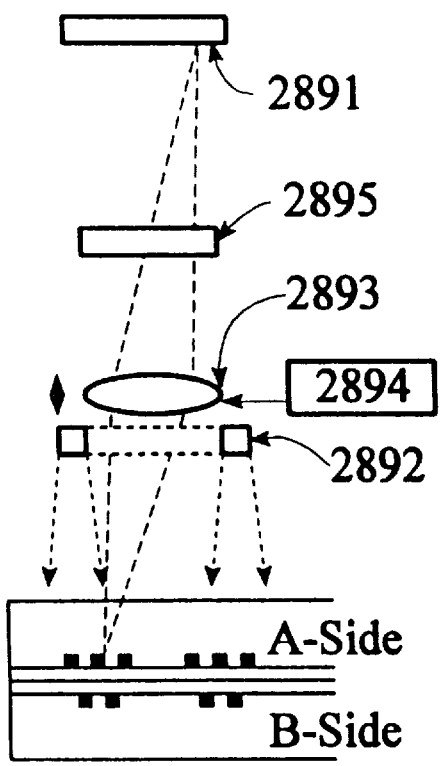
FIG. 27E is a schematic diagram of a second embodiment of the optical subsystem hereof, for aligning the alignment marks on the first and second sides of double-sided CLC-based information storage discs during manufacturing operations carried out using the method of FIG. 25.
Figure 27F:
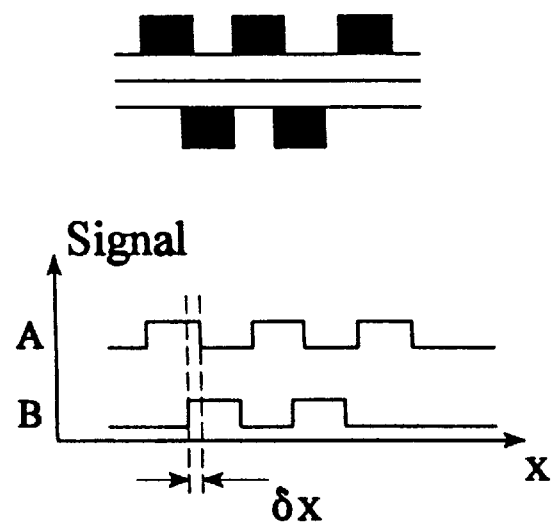
FIG. 27F is a schematic diagram showing the electrical signals produced by the subsystem of FIG. 27E during the alignment of the information value patterns on the first and second information storage structures of the CLC-based information storage disc.

In FIG. 27E, a second illustrative embodiment of the information track-alignment system is shown. As shown in FIG. 27E, the optical alignment system comprises: an image detector (i.e. CCD array) 2891; a fiber-optic ring-shaped illuminator 2892 for producing a laser beam with characteristic wavelength ($_i$ and a linear polarization state, for illumination of the CLC alignment marks on sides A and B of the information recording discs; an image forming device 2893 for forming an image of an the alignment marks on the CCD detector; a mechanism 2894 for moving the imaging device 2893 up or down to focus on side A or side B of the information recording discs; a polarizing filter 2895 for passing either a $P_1$ or $P_2$ polarized image of the alignment marks in response to an electrical signal synchronous to the control signal controlling focusing mechanism 2894. During operation, the information tracks on discs A and B are moved slowly relative to each other, as shown in FIG. 27F, in order to achieve an aligned state. The movement of these discs is controlled by error signals that are produced by comparing signals representative of alignment marks on sides A and B, produced by the image detector 2891 during alignment movement. If such signals have high contrast and are relatively noise-free, then it is possible to achieve sub-micron alignment. After alignment of the information recording tracks has been achieved, a bonding agent in liquid form, such as UV or heat curable adhesives (e.g. cement or epoxy), is applied to the aligned discs. During alignment and before curing, the discs are moved relative to each. After alignment, the bonding agent is cured by UV and/or heat, and sometimes simply by the passage of time (e.g. when induced polymerization process is used), causing the applied liquid bonding agent to solidify. After completion of this alignment process, the discs are 'glued' together and cannot be moved relative to each other.

Figure 28:
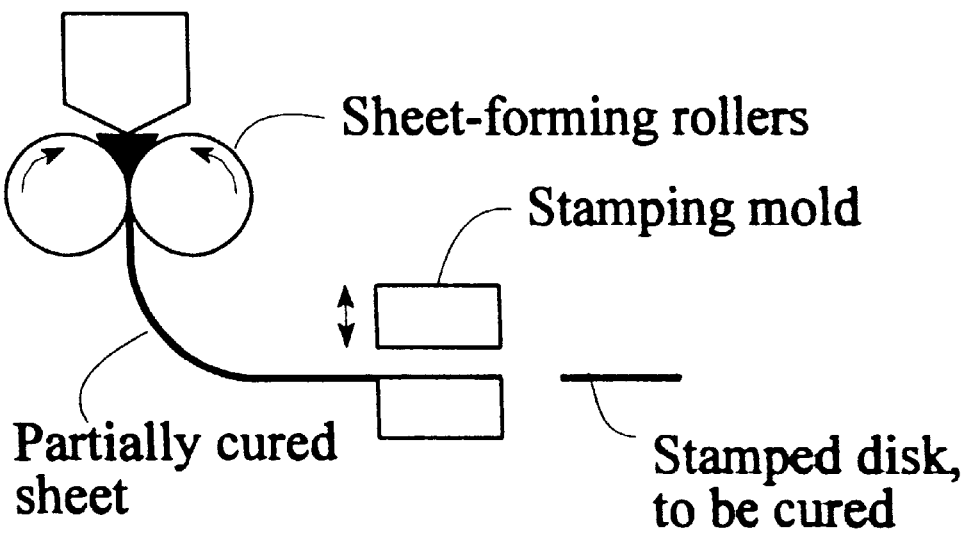
FIG. 28 is a schematic diagram illustrating the steps of a process for making an aligned CLC-based information storage disk using a single stamping operation.

In FIG. 28, there is shown a method of manufacturing aligned CLC discs using sheet-forming rollers and a stamping mold. As shown, partially cured plastic is extruded to forming a plastic sheet. Then at a stamping station, the plastic sheet is stamped using precisely aligned stamping molds, as described in connection with FIG. 26A. The stamping molds can be made using the techniques described hereinabove. During the stamping operation, the disk surfaces are impressed with pit patterns corresponding to digital information recorded during the manufacturing of the stamping molds. Then the stamped disc is cured for hardness in a conventional manner. The remainder of the manufacturing steps, such as filling the pits with liquid crystal material, capping the surfaces, and then writing digital information values to the information storage cells, are carried out in a manner to that described above.

Figure 29:
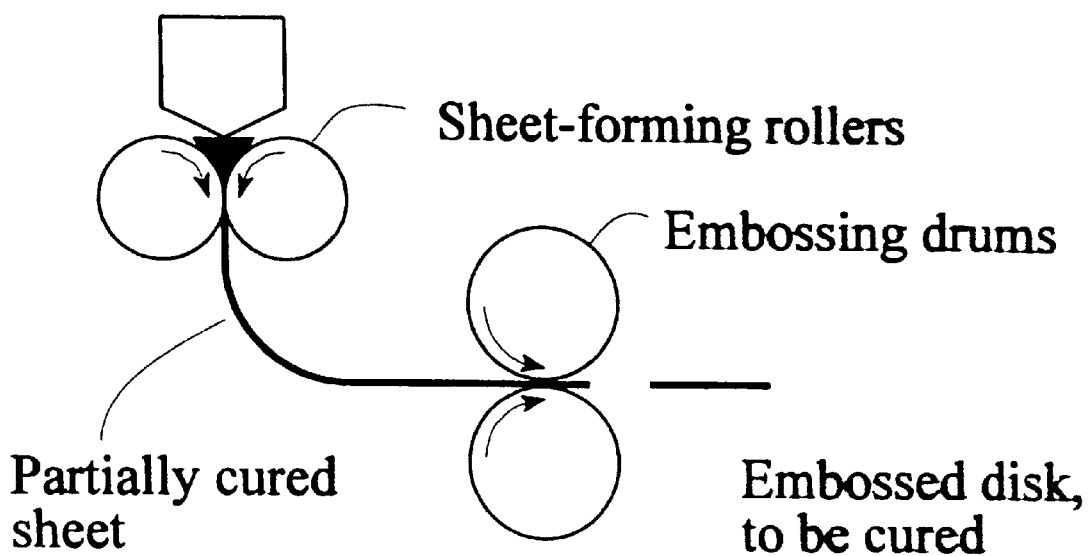
FIG. 29 is a schematic diagram illustrating the steps of a process for making an aligned double-sided CLC-based information storage disc using an embossing operation.

The above-described disc manufacturing process can be modified so that CLC discs are made using embossing techniques rather than stamping techniques. As shown in FIG. 29, a partially cured plastic is extruded to forming a plastic sheet. Then at an embossing station, the plastic sheet is embossed using precisely aligned embossing drums which can be made using techniques described in FIGS. 30A and 30B, described below. During the embossing operation, the disk surfaces are embossed with pit patterns corresponding to digital information recorded during the manufacturing of the stamping molds. Then the embossed disc is cured for hardness in a conventional manner. The remainder of the manufacturing steps, such as filling the pits with liquid crystal material, capping the surfaces, and then writing digital information values to the information storage cells, are carried out in a manner to that described above.

As shown in FIGS. 30A and 30B, the embossing drums can be made in manner quite similar to that employed in manufacturing stamping molds. As shown, a blank drum with a smooth surface is rotate at a prescribed angular velocity while a focused laser beam is directed at the surface in order to photoablate the smooth surface and thus write digital data patterns along the z-axis. The resulting surface of the embossing drum has pit patterns of submicron depth, which correspond to the digital data patterns recorded therein. This technique is used to produce an embossing drum for side A and side B of the CLC disc to be manufactured by the embossing technique. However, like the stamping manufacturing technique, the embossing drums must also be aligned so that the information tracks recorded on the resulting CLC disc are precisely aligned so that simultaneous reading thereof may be carried using the optical pick-up of FIG. 22 or the like. Thus, CLC alignment marks are photoablated in the surface of the embossing drum during its manufacture, and thereafter filled with a CLC material, as described above. As shown in FIGS. 30A and 30B, the alignment marks (i.e. (-marks) encode the angular position (of the digital information tracks recorded in the surface of the embossing drum.

In FIG. 31, a modified procedure is shown for aligning embossing drums used during process of FIG. 29 to simultaneously emboss side A and side B into the opposite sides of the extruded plastic sheet. As shown, the aligning system comprises: a laser source (e.g. a He—Ne laser) for producing a laser beam having a characteristic wavelength and linear polarization-state; a beam-splitter BS for splitting the produced laser beam along first and second paths; a first focusing lens disposed along the first path, for focusing the laser beam on the (-marks of the first embossing drum; a mirror M for directing the laser beam along the second path towards the second embossing drum; a second focusing lens disposed along the second path, adjacent the mirror M, for focusing the laser beam on the (-marks of the second embossing drum; a third focusing lens disposed along the second path as shown, for focusing the laser beam reflected off the (-marks of the first and second embossing drums; and a photodetector for detecting the laser beam focused by the third focusing lens. The detection scheme employed in this system is similar to that for aligning two discs, as shown in FIG. 27D. The major differences is that the system shown in FIG. 31 is modified so as to use two photodetectors, rather than one, and that polarized light having both $P_1$ and $P_2$ components is used, as the alignment marks are not wavelength and polarization selective in this system. During the drum alignment procedure, the first and second embossing drums are incrementally rotated relative to each other, while the polarizing beamsplitter BS is used to divide the laser beam produced from the laser source. The $P_1$ and $P_2$ components of the produced laser beam travel along separate paths, in order to generate reflecting signals from respective drums. The polarizers shown are used to isolate the reflecting signals, whereas the focusing lenses focus the beam onto the alignment marks and focus the reflected light beams onto the photodetectors. The detection scheme is similar to reading the paired information layers simultaneously, except that the (-marks (i.e. information pattern) is not random. Assuming the information pattern is 10101..., the electrical signals are of the form of a square wave. The relative timing of the leading/trailing edges of the electrical signal provides information about the spatial alignment of the embossing drums. By timing these signals, an error signal (t can be generated for use in servo-control during the process of precisely aligning the embossing drums.

Having described the illustrative embodiments of the present invention, several modifications readily come to mind.

Figure 32A:
FIG. 32A is a schematic representation of a portion of an information track formed on the optical storage media of the present invention, in which the information pattern has been encoded using a frequency-modulated (FM) analog signal, rather than a digital signal.
Figure 32B:
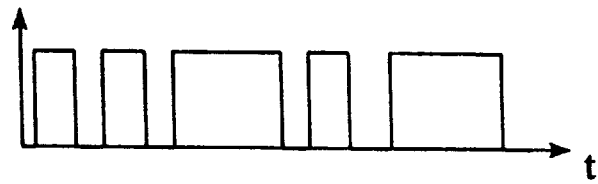
FIG. 32B is a schematic representation of the digital signal produced by an optical pick-up of the present invention, detecting an incident laser beam reading the information pattern shown in FIG. 32A.
Figure 32C:
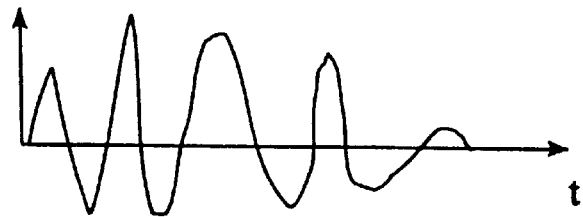
FIG. 32C is a schematic representation of the demodulated analog signal recovered from detected digital signal of FIG. 32B.

For example, the optical storage media of the present invention has been described in connection with the storage of digital information. However, the paired information storage structure of the present invention can also be used to record analog information which has been encoded using frequency modulation (FM) encoding, which is commonly used in the manufacture of video compact discs of either the CAV type (having a short playing time but easy to freeze frames) or the CLV type (having a long playing). In such an alternative embodiment, an FM encoded analog signal is recorded in the optical storage media hereof using the following procedure. As shown in FIG. 32A, a frequency-modulated (FM) analog signal is recorded on the optical media by varying the length and position of the reflecting area along the information storage track. In contrast with digital encoding techniques described hereinabove, the recorded signal (and thus the polarization and wavelength reflective selective surfaces) have a variable length and position along the information storage track. Then, during information reading operations, the laser beam reflected off the information pattern produces an optical signal, as shown in FIG. 32B, which is detected by an optical pick-up hereof to produce a corresponding electrical digital signal. The corresponding electrical digital signal can then be demodulated in a conventional manner to recover the underlying analog information signal, shown in FIG. 32C.

In the above-described illustrative embodiments of the present invention, only the "reflected" spectral components of an incident laser beam are detected and processed during information reading operations in order to recover recorded information patterns. In this reflection mode, there is no change in the background signal if the information storage value being read is a logical "0", and there is only a change in the background signal level if a logical "1" (i.e. a selectively reflective region along the information track) is being read. This is commonly called "dark-field" detection. With this technique, a weak reflected signal can be conditioned (e.g. amplified) without substantially increasing noise and thus obtained signals with high signal to noise (SNR) ratios.

Figure 17H:
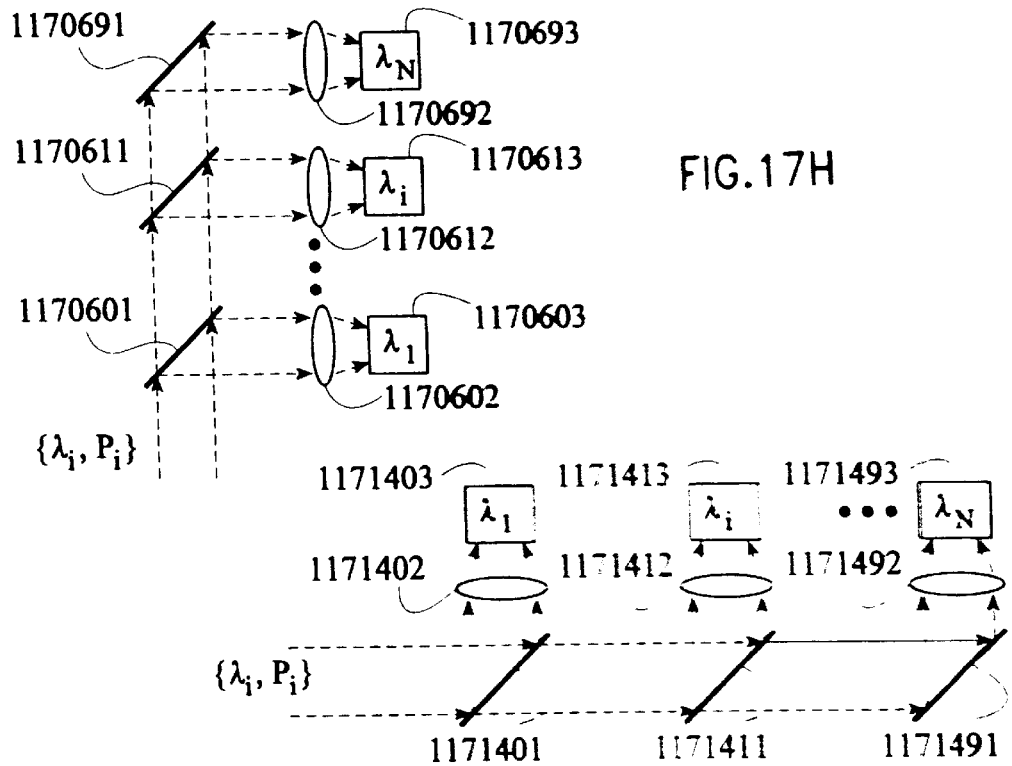
FIG. 17H is a schematic diagram of an optical subsystem that can be used with the subsystem of FIG. 17C, to detect along isolated optical channels, both the reflected spectral components for feedback signal generation used in autofocusing and tracking, as well as (ii) transmitted spectral components for recovering the information pattern recorded along an information storage track.
Figure 17I:
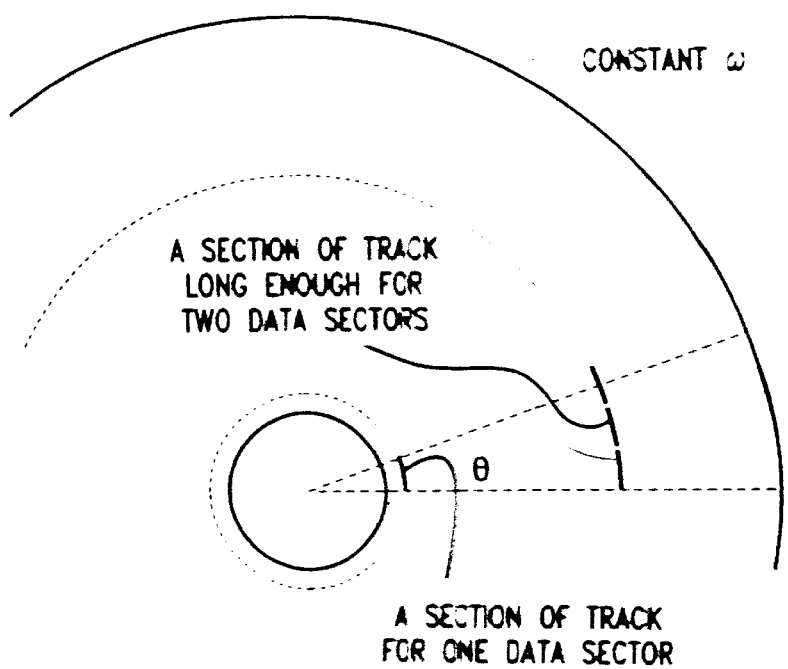
FIG. 17I is a schematic diagram of different information storage tracks recorded on an optical storage disc of the present invention, when using Zoned Constant Angular Velocity formatting.

In an alternative embodiment of the present invention, shown in FIGS. 17C and 17H, only "transmitted" spectral components of an incident laser beam are detected and processed during information reading operations in order to recover recorded information patterns. In this transmission mode, there is no change in the background signal level if the information storage value being read is a logical "1" (i.e. a selectively reflective region along the information track), and there is only a change in the background signal level if a logical "0" is being read. This is commonly called "bright-field" detection. While this technique is typically less preferred than the "dark-field" technique, due to detector saturation, it may, however, in some applications, be desirable to employ this light detector technique. The details of this non-retroreflective type information storage and retrieval system will be described below.

As shown in FIG. 17C, the optical pick-up subsystem of this alternative embodiment comprises all of the subcomponents of the optical pick-up of FIG. 17A. Thus, as shown in FIGS. 17D and 17H, the laser beam production unit 11701 and light detection subsystem 11706 employed in the optical pick-up of FIG. 17C are identical to the laser beam production unit 11701 and light detection subsystem 11706 employed in the optical pick-up of FIG. 17A. What is different in the optical pick-up of FIG. 17C is the addition of light collecting subsystem 11713 and light detection subsystem 11714 located on the side of the optical storage disc, opposite the incident laser beam.

As shown in FIG. 17C, the light-collection subsystem 11713 comprises an ultra-compact housing adapted to move in unison with housing 1709, as the optical pick-up moves relative to the optical storage disc during information reading operations. The light collection subsystem 11713 also comprises two other major subcomponents, namely: a collimating lens 11711 for collecting and collimating laser light beam transmitted through the optical storage disc; and a beam-steering means (e.g. a mirror) 11712 for steering the collimated laser beam towards the light detection subsystem 11714, as shown. In this optical pick-up configuration, the focusing means 11708 requires autofocusing and tracking. Consequently, reflected laser light is detected by light detection subsystem 11706 and used to generate feedback signals in manner described in connection with the optical head of FIG. 17A. As the position of light collection subsystem 11713 relative to the information track being read is less critical during information reading operations, light collection subsystem 11713 does not require autofocusing or tracking mechanisms.

The construction of light detection subsystems 11706 and 11714 is substantially identical. The details of such subsystems can be found by reference to the description of the subsystem of FIG. 17E. However, the primary functional difference between these two light detection subsystems is that the light detector of subsystem 11714 need not have multiple image detection surfaces, typically used to implement autofocusing and tracking functions, and thus will have a simpler construction.

The optical information storage media of the present invention can also be used to directly store (i.e. record) high-resolution images for various micro-imaging applications. The images can represent diverse types of information, such as text, two-level (B/W) images, or spatial masks for use in optical processing applications, such as image-recognition. In this alternative embodiment, the information storage regions of each information storage layer can be designed to follow the form of image matrices or submatrices, organized according to a suitable information storage structure, and the first and second information values recorded in each information storage layer can correspond to pixel values of the image to be stored.

It is also understood that with proper encoding, logical "0s can be made to correspond to selectively reflective regions along the information tracks of the optical media hereof, while logical "1s" are made to correspond to light transmissive regions therealong.

In FIGS. 15A through 15D, a method has been disclosed for fabricating a pre-recorded information storage layer using vacuum-deposited chiral thin-film (e.g. vacuum-deposited inorganic oxide thin film). As disclosed, this particular method involves stamping a disc having a undulated surface encoded with a digital information pattern, and then depositing a chiral coating or film over the stamped disk.

Figure 33A:
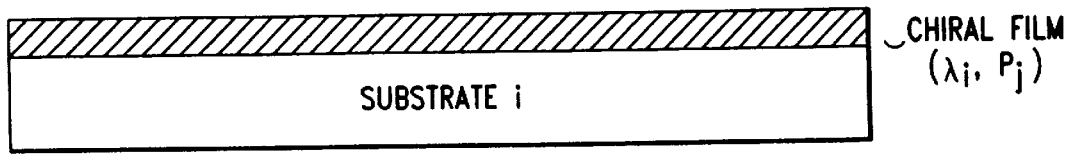
FIGS. 33A to 33G collectively show the sequence of steps carried out during the method of manufacturing a paired information storage structure of the present invention using artificial chiral films.
Figure 33B:
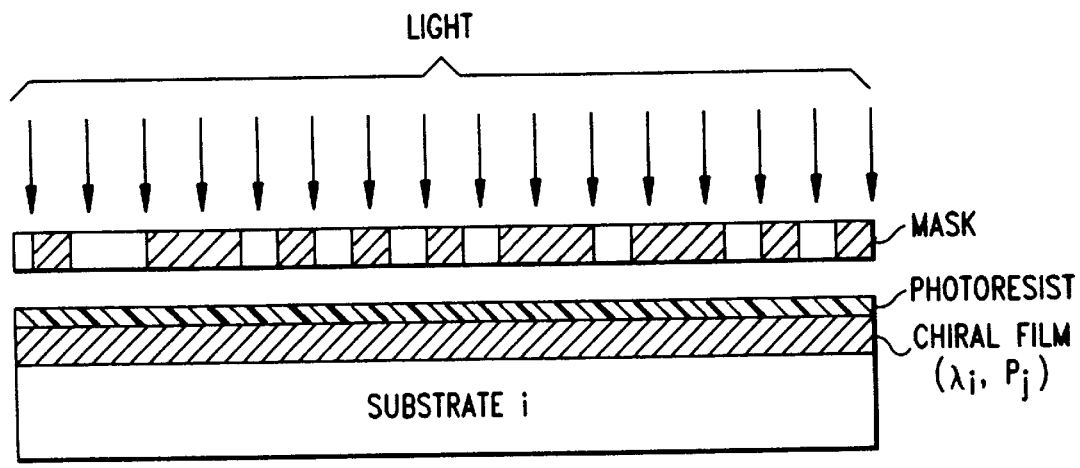
Figure 33C:
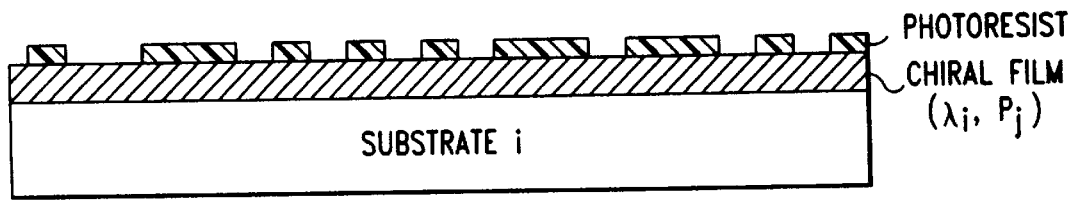
Figure 33D:
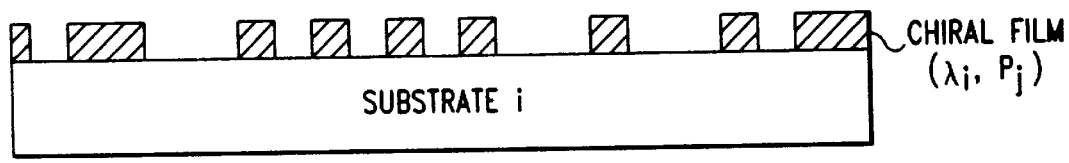
Figure 33E:
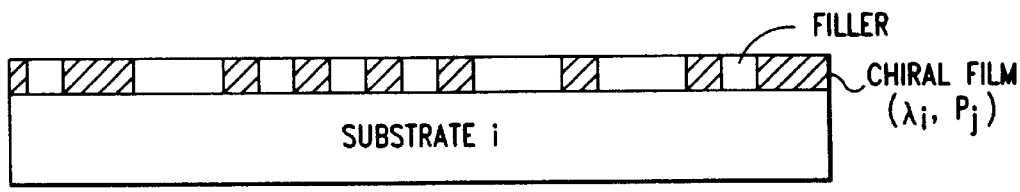
Figure 33F:
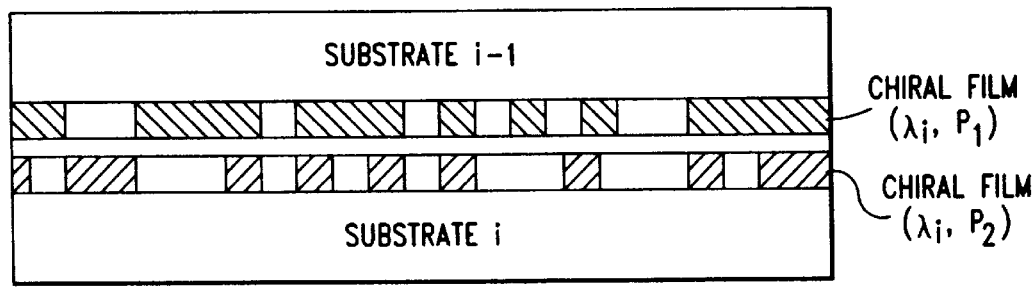
Figure 33G:
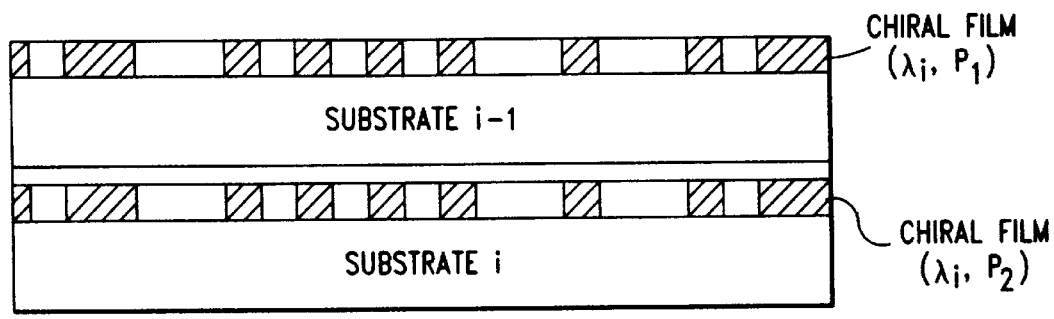

In yet a further alternative embodiment of the present invention, illustrated in FIGS. 33F and 33G, a paired information storage structure of the type illustrated in FIGS. 9E, 9F, 9G and 9H, can be made using a pair of patterned layers of artificial chiral thin-film having characteristic wavelengths and polarization states $((_i, P_1)$ and $((_i, P_2)$. Such a pair of information storage structure can be used to form multi-layered and multi-decked information structures in accordance with the principles disclosed herein.

In FIGS. 33A through 33G, a method is presented for forming a multi-layered information storage device, in which digital information value storage locations of either the first or second binary value are realized as a patterned layer of artificial chiral thin-film having a particular characteristic wavelength and polarization state, namely $((_i, P_1)$ or $((_i, P_2)$. In FIGS. 33A through 33G, steps are illustrated for forming the i-th information storage layer in a multi-layered information storage structure. As illustrated in FIG. 33A, the first step of the method involves depositing upon the i-th substrate enclosed within a vacuum environment, a uniform layer of artificial chiral film which exhibits wavelength and polarization selective reflectance at a characteristic wavelength ($(_i$ and polarization state $P_2$. A suitable technique for depositing chiral film has been described above, with reference to Azzam, supra. Suitable material for depositing birefringent film and chiral film (i.e. a rotating birefringent film) include oxides of two groups of elements selected from the Periodic Table for Elements: the first group on the left side of the Table includes the elements Li, Ba, Y, Ti, Zr, Hf, V, Nb, Ta, Mo, W, and Re; and second group on the right side of the Table includes B, Si, Ge, Sn, Pb, Sb, Bi. Such materials are identified in the 1989 paper "Thin film retardation plate by Oblique deposition" by T. Motohiro and Y. Taga, published in Applied Optics, Vol. 28, No. 13, at page 2466.

As shown in FIG. 33B, the next step of the method involves applying a layer of photoresist to the chiral film layer, and after exposing the photoresist layer to a pattern of actinic light formed by a photo-mask interposed between the photoresist layer and the source of the light. The light pattern formed in the photo-mask spatially corresponds to either the first digital information value pattern (e.g. a logical "1" pattern) that is to be formed on the $((_i, P_2)$ information storage layer. The logical complement of the light pattern spatially corresponds to the second digital information value pattern (e.g. a logical "0" pattern) that is to be formed on the $((_i, P_2)$ information storage layer. After removing the photo-mask and using photo-resist etchants known in the art to etch away the photo-resist layer at locations not exposed to light through the photo-mask, a photo-resist pattern is formed on the chiral film layer, as shown in FIG. 33C. This photo-resist pattern spatially corresponds to the first digital information value pattern (e.g. a logical "1" pattern) associated with the digital information pattern to be formed on the $((_i, P_2)$ information storage layer. Then the portions of the chiral layer unprotected by the remaining photo-resist pattern are etched away using chemical etchants known in the art, to form a chiral thin-film pattern which spatially corresponds to the first digital information value (i.e. bit) pattern (e.g. a logical "1" pattern) that is to be formed on the $((_i, P_2)$ information storage layer.

As shown in FIG. 33E, the next step of the method involves applying an optically transparent filler material to the resulting chiral thin-film pattern in order to fill in the logical complement (e.g. logical "0" pattern) presented upon the i-th substrate, and thus achieve planarization. This filler material should be substantially transparent to the optical wavelengths over which the information storage device is designed to operate. Preferably, the filler material has an index of refraction approximately equal to that of the average refractive index value of the chiral film. The advantage of using filler material with such properties is that, when reading information recorded in lower information storage layers, the laser reading beam sees an approximately uniform material, thus resulting in lower scattering losses in the information-encoded return signal.

Notably, the resulting structure fabricated by the above-described process provides only one half of the i-th paired information storage structure. At this stage, there are two ways in which to proceed in forming the i-th paired information storage structure according to the principles of the present invention.

The first approach involves repeating the above steps described at FIGS. 33A through 33E, using an uniform layer of artificial chiral film having a characteristic wavelength ($_i$ and polarization state $P_1$, instead of a uniform layer of artificial chiral film having a characteristic wavelength ($_i$ and polarization state $P_2$, where polarization state $P_2$ is orthogonal to polarization state $P_1$. Then as shown in FIG. 33F, these two information storage structures are laminated together in a manner so that the chiral thin-film pattern associated with the (($_i$, $P_1$) information storage layer is adjacent the chiral thin-film pattern associated with the (($_i$, $P_2$) information storage layer. In this approach, the chiral-based information storage structures are interposed between the i-th and (i−1)-th substrates within the multilayered information storage structure.

The second approach also involves repeating the above steps described at FIGS. 33A through 33E, using an uniform layer of artificial chiral film having a characteristic wavelength ($_i$ and polarization state $P_1$, instead of an uniform layer of artificial chiral film having a characteristic wavelength ($_i$ and polarization state $P_2$ Then as shown in FIG. 33G, these two information storage structures are laminated together in a manner so that the chiral thin-film pattern associated with the (($_i$, $P_2$) information storage layer is separated from the chiral thin-film pattern associated with the (($_i$, $P_1$) information storage layer by the (i−1)-th substrate within the multilayered information storage structure.

Having fabricated the i-th information storage layer within the multi-layered structure, the above-described process is repeated for each (i+1)-th paired information storage structure. Each adjacent layer can be laminated to its neighboring layer to provide the multilayered information storage structure having light reflection properties that are response to both the wavelength and polarization state of the incident light beam used to read information values prerecorded therein. Multilayered information storage structures, in turn, can be assembled together to form a multi-decked information storage device, as described hereinabove.

The above-described method of making information storage structures of the present invention from chiral thin-film can be readily applied to make information storage structures of the present invention using dielectric birefringent film, as shown in FIG. 16. The major modification is that chiral material is replaced with dielectric birefringent material. Also, birefringent film employed in the structure of FIG. 16 can also be fabricated by vacuum depositing multilayer film on an oblique substrate. In this case, the substrate is not rotating but is fixed in two orientations, namely: normal in XZ and YZ planes.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

What is claimed is:

1. A multi-decked information storage device comprising:

a plurality of information storage decks indexable as m=1,2,3, . . . , M, and collectively stacked together to form a composite structure;

wherein each said information storage deck includes a plurality of information storage layers, each said information storage layer being indexable as an i-th information storage layer where i=1, 2, 3, . . . , N, and collectively stacked together to form a composite substructure, wherein each said i-th information storage layer includes a first information storage structure mounted adjacent to a second information storage structure, wherein said first information storage structure in each said i-th information storage layer has a first plurality of first and second information value storage locations recorded therein, wherein each said first information value storage location recorded in said first information storage structure of said i-th information storage layer has a first characteristic wavelength band $\Delta\lambda_a$ and a first characteristic polarization state $P_1$ which is orthogonal to a second characteristic polarization state $P_2$, and reflects spectral components that are incident thereto and have a wavelength within said first characteristic wavelength band $\Delta\lambda_a$ and a polarization state equal to said first characteristic polarization state $P_1$, and each said second information value storage location recorded in said first information storage structure of said i-th information storage layer transmits spectral components that are incident thereto and have one of a wavelength outside of said first characteristic wavelength band $\Delta\lambda_a$ and a polarization state equal to said second characteristic polarization state $P_2$, and wherein said second information storage structure of each said i-th information storage layer has a second plurality of first and second information value storage locations recorded therein, wherein each said first information value storage location recorded in said second information storage structure of said i-th information storage layer has said characteristic polarization state $P_2$ and a second characteristic wavelength band $\Delta\lambda_b$ overlapping at least a portion of said first characteristic wavelength band $\Delta\lambda_a$ about a prespecified wavelength $\lambda_i$, and reflects spectral components that are incident thereto and have a wavelength within said second characteristic wavelength band $\Delta\lambda_b$ and a polarization state equal to said second characteristic polarization state $P_2$, and each said second information value storage location recorded in said second information storage structure of said i-th information storage layer transmits spectral components that are incident thereto and have one of a wavelength outside of said second characteristic wavelength band $\Delta\lambda_b$ and a polarization state equal to said first characteristic polarization state $P_1$.

2. The information storage and retrieval system of claim 1, wherein each said first information value storage location stores a logical '1' and each said second information value storage location stores a logical '0'.

3. The information storage device of claim 1, wherein said spectral components are provided by a first laser beam having said prespecified wavelength $\lambda_i$ and said first characteristic polarization state $P_1$ when first and second information value storage locations are being read from said first information storage structure of said i-th information storage layer, and wherein said spectral components are provided by a second laser beam having said prespecified wavelength $\lambda_i$ and second characteristic polarization state $P_2$ when first and second information value storage locations are being read from said second information storage structure of said i-th information storage layer.

4. The information storage device of claim 1, wherein said first characteristic polarization state $P_1$ is a left-handed circularly polarized (LHCP) state and said second characteristic polarization state $P_2$ is a right-handed circularly polarized (RHCP) state.

5. The information storage device of claim of claim 1, wherein each first or second information value storage location recorded in said first and second information storage structures of each said i-th information storage layer is made from a cholesteric liquid crystal (CLC) material.

6. The information storage device of claim 5, wherein said CLC material comprises at least one material selected from the group consisting of the polymeric liquid crystals, such as polysiloxanes, di-acrylates, di-epoxides, di-vinylethers, and chiral nematic liquid crystals with chiral additives.

7. The information storage device of claim 1, wherein each said first or second information value storage location recorded in said first and second information storage structures of each said i-th information storage layer is realized from multiple layers of dielectric material.

8. The information storage device of claim 1, wherein each first or second information value storage location recorded in said first and second information storage structures is made from an artificial chiral film.

9. The information storage device of claim 1,
wherein said first plurality of first and second information value storage locations recorded in the first information storage structure of said i-th information storage layer is recorded along a first information storage track arrangement in said first information storage structure of said i-th information storage layer,
wherein said second plurality of first and second information value storage locations recorded in the second information storage structure of said i-th information storage layer is recorded along a first information storage track arrangement in said second information storage structure of said i-th information storage layer, and
wherein said first and second information storage track arrangements are registered so as to permit reading of information values along said first and second information storage tracks using a laser beam having first and second spectral components.

10. The information storage device of claim 1, made in the form of a disc.

11. The information storage device of claim 1, made in the form of tape.

12. The information storage device of claim 1, made in the form of a card.

13. The information storage device of claim 1, which further comprises one or more interlayers of material disposed between said first and second information storage structures of each said i-th information storage layers.

14. The information storage device of claim 1, which further comprises an optically transparent protective cover layer disposed over said first information storage structure of each said i-th information storage layer.

15. An information storage and retrieval system for reading information values recorded in an information storage device constructed from an optical based storage media, said information storage and retrieval system comprising:
light beam producing means for producing, during each information reading operation, a light beam consisting of at least one of
(i) a first spectral component having a prespecified wavelength $\lambda_i$ and a polarization state equal to a first characteristic polarization state P1; and
(ii) a second spectral component having said prespecified wavelength $\lambda_i$ and a polarization state equal to a second characteristic polarization state P2 which is orthogonal to said characteristic polarization state $P_1$;
supporting means for supporting, during each said information reading operation, an information storage device including a pair of first and second information storage structures arranged as a composite structure,
said first information storage structure having a first plurality of first and second information value storage locations recorded therein, wherein each said first information value storage location recorded in said first information storage structure is characterized by a first characteristic wavelength band $\Delta\lambda_a$ and said first characteristic polarization state $P_1$, and reflects spectral components that are incident thereto and have a wavelength within said first characteristic wavelength band $\Delta\lambda_a$ and a polarization state equal to said first characteristic polarization state $P_1$, and each said second information value storage location recorded in said first information storage structure transmits spectral components that are incident thereto and have one of (i) a wavelength outside of said first characteristic wavelength band $\Delta\lambda_a$ and (ii) a polarization state equal to said second characteristic polarization state $P_2$, and
said second information storage structure having a second plurality of first and second information value storage locations recorded therein, wherein each said first information value storage location recorded in said second information storage structure is characterized by and said second characteristic polarization state $P_2$ and a second characteristic wavelength band $\Delta\lambda_b$ overlapping at least a portion of said first characteristic wavelength band $\Delta\lambda_a$ located around said prespecified wavelength $\lambda_i$, and reflects spectral components that are incident thereto and have a wavelength within said second characteristic wavelength band $\Delta\lambda_b$ and a polarization state equal to said second characteristic polarization state $P_2$, and each said second information value storage location recorded in said second information storage structure transmits spectral components that are incident thereto and have either a wavelength outside of said second characteristic wavelength band $\Delta\lambda_b$ or a polarization state equal to said first characteristic polarization state $P_1$;
light focusing means for focusing said light beam during the reading of information values from at least one of said first and second information storage structures;

light detection means for detecting said first and second spectral components;

spectral component analyzing means for analyzing the spectral components detected by said light detection means, determining the information values recorded on said first information storage structure producing a first data stream representative thereof, for determining the information values recorded on said second information storage structure and producing a second data stream representative thereof; and information access control means for controlling the operation of said light beam producing means during each said information reading operation.

16. The information storage and retrieval system of claim 15, which further comprises
moving means for moving said information storage device relative to said focused laser beam so that,
during the reading of information from said first information storage structure, the first spectral component of said laser beam is reflected from one or more of said first plurality of first and second information value storage locations recorded in said first information storage structure, and
during the reading of information from said second information storage structure, the second spectral component of said focused laser beam is reflected from one or more of said first plurality of said information value storage locations recorded in said second information storage structure.

17. The information storage and retrieval system of claim 15, wherein said spectral component analyzing means comprises
a first spectral component analyzing means for analyzing said first spectral component of said focusing laser beam reflected off said first information storage structure and detected by said light detection means, and automatically determining the information values recorded on said first information storage structure, and producing a first data stream representative thereof, and
a second spectral component analyzing means for analyzing said second spectral component of said focused laser beam reflected off said second information storage structure and detected by said light detection means, automatically determining the information values recorded on said second information storage structure, and producing a second data stream representative thereof.

18. The information storage and retrieval system of claim 15, wherein said light beam is a laser beam.

19. The information storage and retrieval system of claim 15, which further comprises:
interface means for interfacing said information storage and retrieval system with a host computer system.

20. The information storage and retrieval system of claim 15, Which further comprises
address translation means for translating a logical address assigned to each said information value storage location in said first and second information storage structures, into a physical address specifying the physical location of said information value storage location in said information storage device.

21. The information storage and retrieval system of claim 15, wherein each said first information value storage location stores a logical '1' and each said second information value storage location stores a logical '0'.

22. The information storage and retrieval system of claim 15,
wherein when said first and second information value storage locations are being read from said first information storage structure, said light producing means produces under the control of said information access control means, a laser beam having said first spectral component, and
wherein when first and second information value storage locations are being read from said second information storage structure, said light producing means produces under the control of said information access control means, a laser beam having said second spectral component.

23. The information storage and retrieval system of claim 15, wherein each said first and second information value storage location recorded in said first and second information storage structures is made from a cholesteric liquid crystal (CLC) material.

24. The information storage and retrieval system of claim 15, wherein each first information value storage location recorded in said first and second information storage structures is realized from multiple layers of dielectric material.

25. The information storage device of claim 15, wherein each first or second information value storage location recorded in said first and second information storage structures is made from an artificial chiral film.

26. The information storage and retrieval system of claim 15, wherein said first characteristic polarization state $P_1$ is a left-handed circularly polarized (LHCP) state and said second characteristic polarization state $P_2$ is a right-handed circularly polarized (RHCP) state.

27. The information storage and retrieval system of claim 15, wherein said first characteristic polarization state $P_1$ is a left-handed circularly polarized (LHCP) state and said second characteristic polarization state $P_2$ is a right-handed circularly polarized (RHCP) state, and wherein said light beam comprises a linear polarized light beam comprising said first and second spectral components.

28. The information storage and retrieval system of claim 27, wherein said light detection means comprises
a first means for detecting spectral components having a wavelength within said first characteristic wavelength band $\Delta\lambda_a$ and a polarization state equal to said LHCP state, and
a second means for detecting spectral components having a wavelength within said second characteristic wavelength band $\Delta\lambda_b$ and a polarization state equal to said RHCP state.

29. The information storage and retrieval system of claim 15,
wherein said first plurality of first and second information value storage locations are recorded along a first information storage track arrangement in said first information storage structure, said second plurality of first and second information value storage locations are recorded along a first information storage track arrangement in said second information storage structure, and first and second information storage track arrangements are precisely registered between said first and second information storage structures, respectively;
wherein said light producing means produces during each information reading operation, a laser beam consisting of both said first spectral component and said second spectral component,
thereby permitting reading of information values recorded in said first and second information storage structures of said information storage device.

30. The information storage and retrieval system of claim 15, wherein said information storage device is realized in the form of a compact disc, and said support means comprises means for supporting and rotating said compact disc at a predetermined angular velocity.

31. The information storage and retrieval system of claim 15, wherein said information storage device is realized in the form of a compact card, and said support means comprises means for supporting said compact card.

32. An information storage and retrieval system for reading information values recorded in an information storage device constructed from multiple layers of optical storage media, said information storage and retrieval system comprising:

light beam producing means for producing a light beam including
  (i) a first spectral component having a prespecified wavelength $\lambda_i$ and a first characteristic polarization state P1, and
  (ii) a second spectral component having said prespecified wavelength $\lambda_i$ and a second characteristic polarization state P2 orthogonal to said first characteristic polarization state P1;

spectral component selection means for selecting the production of at least one of (i) said first spectral component and (ii) second spectral component during each information reading operation;

supporting means for supporting, during each said information reading operation, an information storage device constructed from a plurality of information storage layers of optical storage media, each said information storage layer being indexable as an i-th information storage layer wherein i=1,2,3, . . . , N, and collectively being stacked together to form a composite structure, wherein each said i-th information storage layer includes a first information storage structure disposed adjacent a second information storage structure, said first information storage structure having a first plurality of first and second information value storage locations recorded therein, wherein each said first information value storage location recorded in said first information storage structure of said i-th information storage layer is characterized by a first characteristic wavelength band $\Delta\lambda_a$ and said first characteristic polarization state $P_1$, and reflects spectral components that are incident thereto and have a wavelength within said first characteristic wavelength band $\Delta\lambda_a$ and a polarization state equal to said first characteristic polarization state $P_1$, and each said second information value storage location recorded in said first information storage structure of said i-th information storage layer transmits spectral components that are incident thereto and have either a wavelength outside of said first characteristic wavelength band $\Delta\lambda_a$ polarization state equal to said second characteristic polarization state $P_2$, and said second information storage structure of said i-th information storage layer having a second plurality of first and second information value storage locations recorded therein, wherein each said first information value storage location recorded in said second information storage structure of said i-th information storage layer is characterized by said second characteristic polarization state $P_2$ and a second characteristic wavelength band $\Delta\lambda_b$ overlapping at least a portion of said first characteristic wavelength band $\Delta\lambda_a$ about said prespecified wavelength $\lambda_i$, and reflects spectral components that are incident thereto and have a wavelength within said second characteristic wavelength band $\Delta\lambda_b$ and a polarization state equal to said second characteristic polarization state $P_2$, and each said second information value storage location recorded in said second information storage structure of said i-th information storage layer transmits spectral components that are incident thereto and have either a wavelength outside of said second characteristic wavelength band $\Delta\lambda_b$ or a polarization state equal to said first characteristic polarization state $P_1$;

light focusing means for focusing said light beam while reading said first and second information value storage locations from at least one of said first and second information storage structures in said i-th information storage layer;

light detection means for detecting said first and second spectral components;

spectral component analyzing means for analyzing the spectral components detected by said light detection means, determining the information values recorded on said first information storage structure of said i-th information storage layer and producing a first data stream representative thereof, and determining the information values recorded on said second information storage structure of said i-th information storage layer and producing a second data stream representative thereof; and information access control means for controlling the operation of said light beam producing means and said spectral component selection means during each said information reading operation.

33. The information storage and retrieval system of claim 32, which further comprises moving means for moving said information storage device relative to said focused laser beam so that,
  during the reading of information from said first information storage structure of said i-th information storage layer, the first spectral component of said laser beam is reflected from at least one of said first plurality of first and second information value storage locations recorded in said first information storage structure, and
  during the reading of information from said second information storage structure of said i-th information storage layer, the second spectral component of said focused laser beam is reflected from at least one of said first plurality of said information value storage locations recorded in said second information storage structure.

34. The information storage and retrieval system of claim 32, wherein said spectral component analyzing means comprises
  a first spectral component analyzing means for analyzing said first spectral component of said focusing laser beam reflected off said first information storage structure of said i-th information storage layer and detected by said light detection means, and automatically determining the information values recorded on said first information storage structure of said i-th information storage layer, and producing a first data stream representative thereof, and
  a second spectral component analyzing means for analyzing said second spectral component of said focused laser beam reflected off said second information storage structure of said i-th information storage layer and detected by said light detection means, automatically determining the information values recorded on said second information storage structure of said i-th information storage layer, and producing a second data stream representative thereof.

35. The information storage and retrieval system of claim 32, wherein said light beam is a laser beam.

36. The information storage and retrieval system of claim 32, which further comprises:
interface means for interfacing said information storage and retrieval system with a host computer system.

37. The information storage and retrieval system of claim 32, which further comprises
address translation means for translating a logical address assigned to each said information value storage location in said first and second information storage structures of said i-th information storage layer, into a physical address specifying the physical location of said information value storage location in said information storage device.

38. The information storage and retrieval system of claim 32, wherein each said first information value storage location stores a logical '1' and each said second information value storage location stores a logical '0'.

39. The information storage and retrieval system of claim 32,
wherein when said first and second information value storage locations are being read from said first information storage structure of said i-th information storage layer, said light producing means produces under the control of said information access control means, a laser beam having said first spectral component, and
wherein when first and second information value storage locations are being read from said second information storage structure of said i-th information storage layer, said light producing means produces under the control of said information access control means, a laser beam having said second spectral component.

40. The information storage and retrieval system of claim 32, wherein each said first or second information value storage location recorded in said first and second information storage structures of each said i-th information storage layer is made from a cholesteric liquid crystal (CLC) material.

41. The information storage device of claim 32, wherein each first or second information value storage location recorded in said first and second information storage structures of each said i-th information storage layer is made from an artificial chiral film.

42. The information storage and retrieval system of claim 32, wherein each said first or second information value storage location recorded in said first and second information storage structures of each said i-th information storage layer is realized from multiple layers of dielectric material.

43. The information storage and retrieval system of claim 32, wherein said first characteristic polarization state $P_1$ is a left-handed circularly polarized (LHCP) state and said second characteristic polarization state $P_2$ is a right-handed circularly polarized (RHCP) state.

44. The information storage and retrieval system of claim 32, wherein said first characteristic polarization state $P_1$ is a left-handed circularly polarized (LHCP) state and said second characteristic polarization state $P_2$ is a right-handed circularly polarized (RHCP) state, and wherein said light beam comprises a linear polarized light beam comprising said first and second spectral components.

45. The information storage and retrieval system of claim 44, wherein said light detection means comprises
a first means for detecting spectral components having a wavelength within said first characteristic wavelength band $\Delta\lambda_a$ and a polarization state equal to said LHCP state, and
a second means for detecting spectral components having a wavelength within said first characteristic wavelength band $\Delta\lambda$band a second polarization state equal to said RHCP state.

46. The information storage and retrieval system of claim 32,
wherein said first plurality of first and second information value storage locations are recorded along a first information storage track arrangement in said first information storage structure of said i-th information storage layer, said second plurality of first and second information value storage locations are recorded along a first information storage track arrangement in said second information storage structure of said i-th information storage layer, and said first and second information storage track arrangements are registered between said first and second information storage structures of said i-th information storage layer;
wherein said light producing means produces during each information reading operation, a light beam comprising said first and second spectral components, thereby permitting reading of information values recorded in said first and second information storage structures of said i-th information storage layer.

47. The information storage and retrieval system of claim 32, wherein said information storage device is realized in the form of a compact disc, and said support means comprises means for supporting and rotating said compact disc at a predetermined angular velocity.

48. The information storage and retrieval system of claim 32, said support means comprises means for supporting and transporting said tape at a predetermined velocity.

49. The information storage and retrieval system of claim 32, wherein said information storage device is realized in the form of a compact card, and said support means comprises means for supporting said compact card.

50. An information storage and retrieval system for reading information values recorded in an information storage device constructed from multiple layers of optical storage media, said information storage and retrieval system comprising:
light beam producing means for producing a light beam including at least one of
(i) a first spectral component having a prespecified wavelength $\lambda_i$ and a first characteristic polarization state P1, and
(ii) a second spectral component having said prespecified wavelength $\lambda_i$ and a second characteristic polarization state P2 orthogonal to said first characteristic polarization state P1;
spectral component selection means for selecting the production of at least one of said first spectral component and said second spectral component during each information reading operation;
supporting means for supporting, during each said information reading operation, a multi-decked information storage device constructed from a plurality of information storage decks of optical storage media, each said information storage deck being, indexable as an m-th information storage deck where m=1, 2, 3, . . . , M, and collectively being stacked together to form a composite structure, wherein each said information storage deck includes a plurality of information storage layers, each said i-th information storage layer being indexable as an i-th information storage layer where i=1,2,3, . . . , N, and collectively being stacked together to form a composite substructure of said composite structure, wherein each said i-th information storage layer in said m-th information storage deck includes a first information storage structure supported adjacent to a second information storage structure, said first information storage structure of each said i-th information storage layer in said m-th information storage deck having a first plurality of first and second information value storage locations recorded therein, wherein each said first information value storage location recorded in said first information storage structure of each said i-th information storage layer in said m-th information storage deck is characterized by a first characteristic wavelength band $\Delta\lambda_a$ and said first characteristic polarization state $P_1$, and reflects spectral components that are incident thereto and have a wavelength within said first characteristic wavelength band $\Delta\lambda_a$ and a polarization state equal to said first characteristic polarization state $P_1$, and each said second information value storage location recorded in said first information storage structure of each said i-th information storage layer in said m-th information storage deck transmits spectral components that are incident thereto and have either a wavelength outside of said first characteristic wavelength band $\Delta\lambda_a$ or a polarization state equal to said characteristic polarization state $P_2$, and said second information storage structure of each said i-th information storage layer in said m-th information storage deck having a second plurality of first and second information value storage locations recorded therein, wherein each said first information value storage location recorded in said second information storage structure of each said i-th information storage layer in said m-th information storage deck is characterized by said second characteristic polarization state $P_2$ and a second characteristic wavelength band $\Delta\lambda_b$ overlapping at least a portion of said first characteristic wavelength band $\Delta\lambda_a$ about said pre-specified wavelength $\lambda_i$, and reflects spectral components that are incident thereto and have a wavelength within said characteristic wavelength band $\Delta\lambda_b$ and a polarization state equal to said second characteristic polarization state $P_2$, and each said second information value storage location recorded in said second information storage structure of each said i-th information storage layer in said m-th information storage deck transmits spectral components that are incident thereto and have either a wavelength outside of said characteristic wavelength band $\Delta\lambda_b$ or a polarization state equal to said first characteristic polarization state $P_1$;

light focusing means for focusing said light beam onto a selected information storage layer in a selected one of said information storage decks while reading said first and second information value storage locations from at least one of said first and second information storage structures of said i-th information storage layer within said selected information storage deck;

light detection means for detecting said first and second spectral components;

spectral component analyzing means for analyzing the spectral components detected by said light detection means, determining the information values recorded on said first information storage structure of said i-th information storage layer in said selected information storage deck and producing a first data stream representative thereof, and determining the information values recorded on said second information storage structure of each said i-th information storage layer in said selected information storage deck and producing a second data stream representative thereof; and information access control means for controlling the operation of said light beam producing means and said spectral component selection means during each said information reading operation.

51. The information storage and retrieval system of claim 50, which further comprises moving means for moving said information storage device relative to said focused laser beam so that,
during the reading of information from said first information storage structure of said selected information storage layer in said selected information storage deck, the first spectral component of said laser beam is reflected from at least one of said first plurality of first and second information value storage locations recorded in said first information storage structure thereof, and
during the reading of information from said second information storage structure of said selected information storage layer in said selected information storage deck, the second spectral component of said focused laser beam is reflected from at least one of said first plurality of said information value storage locations recorded in said second information storage structure thereof.

52. The information storage and retrieval system of claim 50, wherein said spectral component analyzing means comprises a first spectral component analyzing means for analyzing said first spectral component of said focusing laser beam reflected off said first information storage structure of said selected information storage layer and detected by said light detection means, and automatically determining the information values recorded on said first information storage structure of said selected information storage layer, and producing a first data stream representative thereof, and a second spectral component analyzing means for analyzing said second spectral component of said focused laser beam reflected off said second information storage structure of said selected information storage layer and detected by said light detection means, automatically determining the information values recorded on said second information storage structure of said selected information storage layer, and producing a second data stream representative thereof.

53. The information storage and retrieval system of claim 50, wherein said light beam is a laser beam.

54. The information storage and retrieval system of claim 50, which further comprises address translation means for translating a logical address assigned to each said information value storage location in said first and second information storage structures of said selected information storage layer, into a physical address specifying the physical location of said information value storage location in said information storage device.

55. The information storage and retrieval system of claim 50, wherein each said first information value storage location stores a logical '1' and each said second information value storage location stores a logical '0'.

56. The information storage and retrieval system of claim 50,
wherein when said first and second information value storage locations are being read from said first information storage structure of said selected information storage layer, said light producing means produces under the control of said information access control means, a laser beam having said first spectral component, and
wherein when first and second information value storage locations are being read from said second information storage structure of said selected information storage layer, said light producing means produces under the control of said information access control means, a laser beam having said second spectral component.

57. The information storage and retrieval system of claim 50, wherein each first information value storage location recorded in said first and second information storage structures is made from a cholesteric liquid crystal (CLC) material.

58. The information storage device of claim 50, wherein each first or second information value storage location recorded in said first and second information storage structures is made from artificial chiral films.

59. The information storage and retrieval system of claim 50, wherein each first information value storage location recorded in said first and second information storage structures is realized from multiple layers of dielectric material.

60. The information storage and retrieval system of claim 50, wherein said first characteristic polarization state $P_1$ is a left-handed circularly polarized (LHCP) state and said second characteristic polarization state $P_2$ is a right-handed circularly polarized (RHCP) state.

61. The information storage and retrieval system of claim 50, wherein said first characteristic polarization state $P_1$ is a left-handed circularly polarized (LHCP) state and said second characteristic polarization state $P_2$ is a right-handed circularly polarized (RHCP) state, and wherein said light beam comprises a linear polarized light beam comprising said first and second spectral components.

62. The information storage and retrieval system of claim 61, wherein said light detection means comprises a first means for detecting spectral components having wavelengths located around said prespecified wavelength $\lambda_i$ and a polarization state equal to said LHCP state, and a second means for detecting spectral components having wavelengths about said prespecified wavelength $\lambda_i$ and a polarization state equal to said RHCP state.

63. The information storage and retrieval system of claim 61, wherein said LHCP state is realized using a left-handed cholesteric liquid crystal (CLC) material and said RHCP state is realized using a right-handed CLC material.

64. The information storage and retrieval system of claim 50,
wherein said first plurality of first and second information value storage locations are recorded along a first information storage track arrangement in said first information storage structure of said selected information storage layer, said second plurality of first and second information value storage locations are recorded along a first information storage track arrangement in said second information storage structure of said selected information storage layer, and said first and second information storage track arrangements are registered between said first and second information storage structures of said selected information storage layer;
wherein said light producing means produces during each information reading operation, a light beam comprising said first and second spectral components, thereby permitting reading of information values recorded in said first and second information storage structures of said selected information storage layer.

65. The information storage and retrieval system of claim 50, wherein said information storage device is realized in the form of a compact disc, and said support means comprises means for supporting and rotating said compact disc at a predetermined angular velocity.

66. The information storage and retrieval system of claim 50, said support means comprises means for supporting and transporting said tape at a predetermined velocity.

67. The information storage and retrieval system of claim 50, wherein said information storage device is realized in the form of a compact card, and said support means comprises means for supporting said compact card.

* * * * *